(12) United States Patent
Matsuno et al.

(10) Patent No.: US 12,518,830 B2
(45) Date of Patent: Jan. 6, 2026

(54) SEMICONDUCTOR MEMORY DEVICE

(71) Applicant: Kioxia Corporation, Tokyo (JP)

(72) Inventors: Junya Matsuno, Yokohama Kanagawa (JP); Yasuhiro Hirashima, Kawasaki Kanagawa (JP); Toshiyuki Kouchi, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 111 days.

(21) Appl. No.: 18/177,779

(22) Filed: Mar. 3, 2023

(65) Prior Publication Data

US 2023/0352093 A1 Nov. 2, 2023

(30) Foreign Application Priority Data

Apr. 28, 2022 (JP) .................. 2022-075218

(51) Int. Cl.
  *G11C 16/10* (2006.01)
  *G11C 16/04* (2006.01)
  *G11C 16/32* (2006.01)

(52) U.S. Cl.
  CPC .......... *G11C 16/10* (2013.01); *G11C 16/0483* (2013.01); *G11C 16/32* (2013.01)

(58) Field of Classification Search
  CPC ..................................................... G11C 16/10
  USPC .................................................. 365/185.18
  See application file for complete search history.

(56) References Cited

U.S. PATENT DOCUMENTS

| 5,889,828 | A | * | 3/1999 | Miyashita | ............... H03L 7/085 375/376 |
| 11,044,124 | B1 | | 6/2021 | Goyal | |
| 11,277,134 | B2 | | 3/2022 | Matsuno et al. | |
| 11,495,308 | B2 | | 11/2022 | Matsuno et al. | |
| 2005/0218937 | A1 | * | 10/2005 | Johnson | ............... H03D 13/004 327/2 |
| 2008/0094101 | A1 | * | 4/2008 | Balasubramanian | ........................ H03K 17/687 326/38 |
| 2009/0175328 | A1 | | 7/2009 | Kim et al. | |
| 2009/0290434 | A1 | | 11/2009 | Kurjanowicz | |
| 2011/0249774 | A1 | | 10/2011 | Thakkar et al. | |
| 2012/0063242 | A1 | | 3/2012 | Kim et al. | |
| 2012/0250423 | A1 | | 10/2012 | Koyanagi et al. | |
| 2013/0257483 | A1 | | 10/2013 | Bulzacchelli | |
| 2013/0335114 | A1 | * | 12/2013 | Chen | .................... G11C 29/025 716/100 |

(Continued)

FOREIGN PATENT DOCUMENTS

JP 5566941 B2 6/2014

*Primary Examiner* — Muna A Techane
(74) *Attorney, Agent, or Firm* — Holtz, Holtz & Volek PC

(57) ABSTRACT

According to one embodiment, a semiconductor memory device includes a first circuit configured to receive first bit data of an input signal, store, in a first latch circuit, first data based on the first bit data and a reference voltage, and output a first signal based on the first data, and a second circuit configured to receive second bit data of the input signal, store, in a second latch circuit, second data based on the second bit data and the reference voltage, and output a second signal based on the second data. The first circuit is configured to set the first latch circuit in a reset state based on the second signal. The second circuit is configured compare the second bit data and the reference voltage based on the first data and set the second latch circuit in a reset state based on the first signal.

10 Claims, 47 Drawing Sheets

(56) References Cited

U.S. PATENT DOCUMENTS

| | | | | |
|---|---|---|---|---|
| 2016/0294371 A1* | 10/2016 | Tomatsopoulos | ...... | H03K 3/037 |
| 2018/0314424 A1* | 11/2018 | Gillingham | .......... | G11C 7/1045 |
| 2019/0036743 A1 | 1/2019 | Dimitriu | | |
| 2019/0312757 A1* | 10/2019 | Sakai | ..................... | H03K 3/037 |
| 2022/0141054 A1 | 5/2022 | Seong et al. | | |
| 2022/0158639 A1 | 5/2022 | Matsuno et al. | | |
| 2023/0018613 A1 | 1/2023 | Matsuno et al. | | |

* cited by examiner

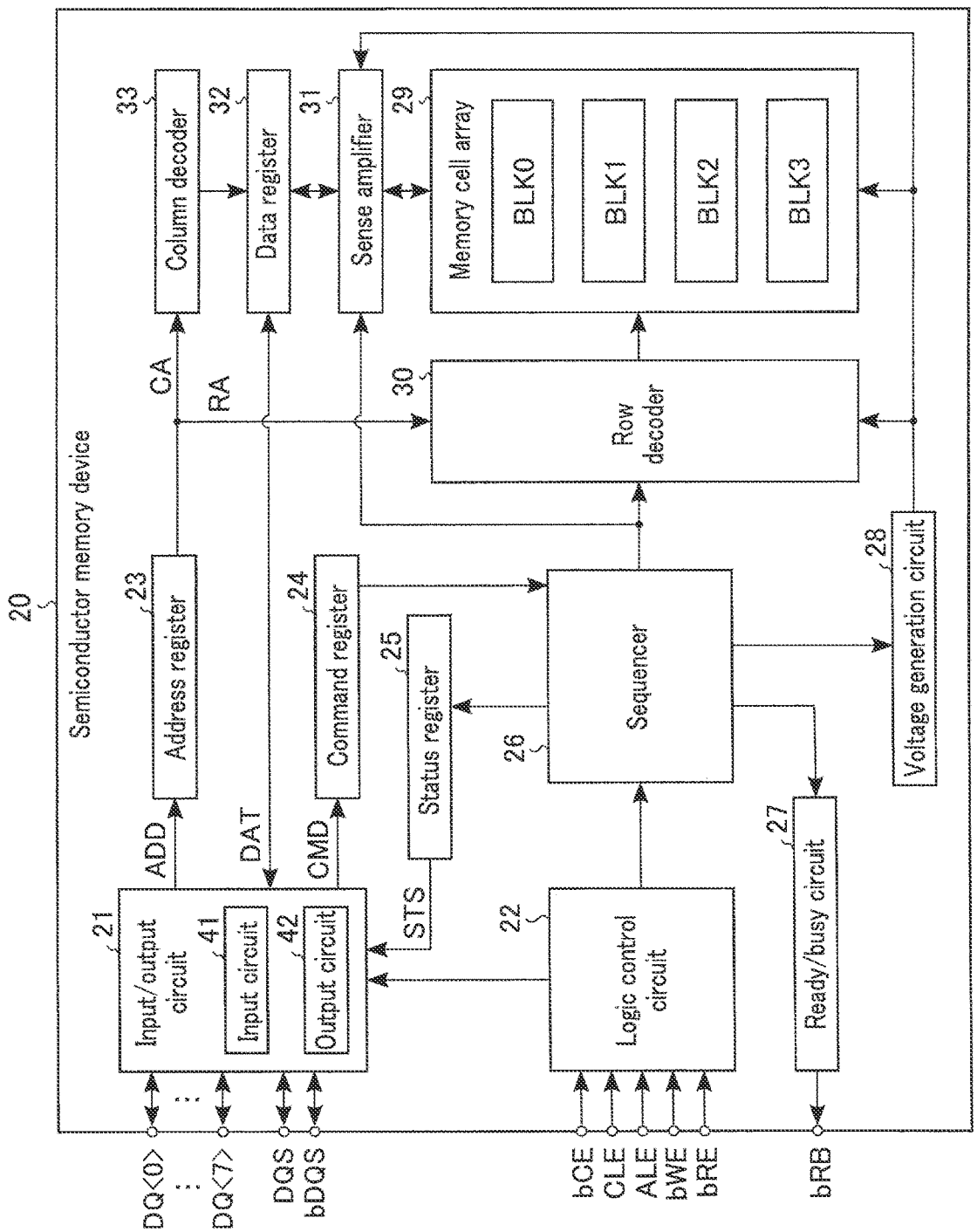
F I G. 2

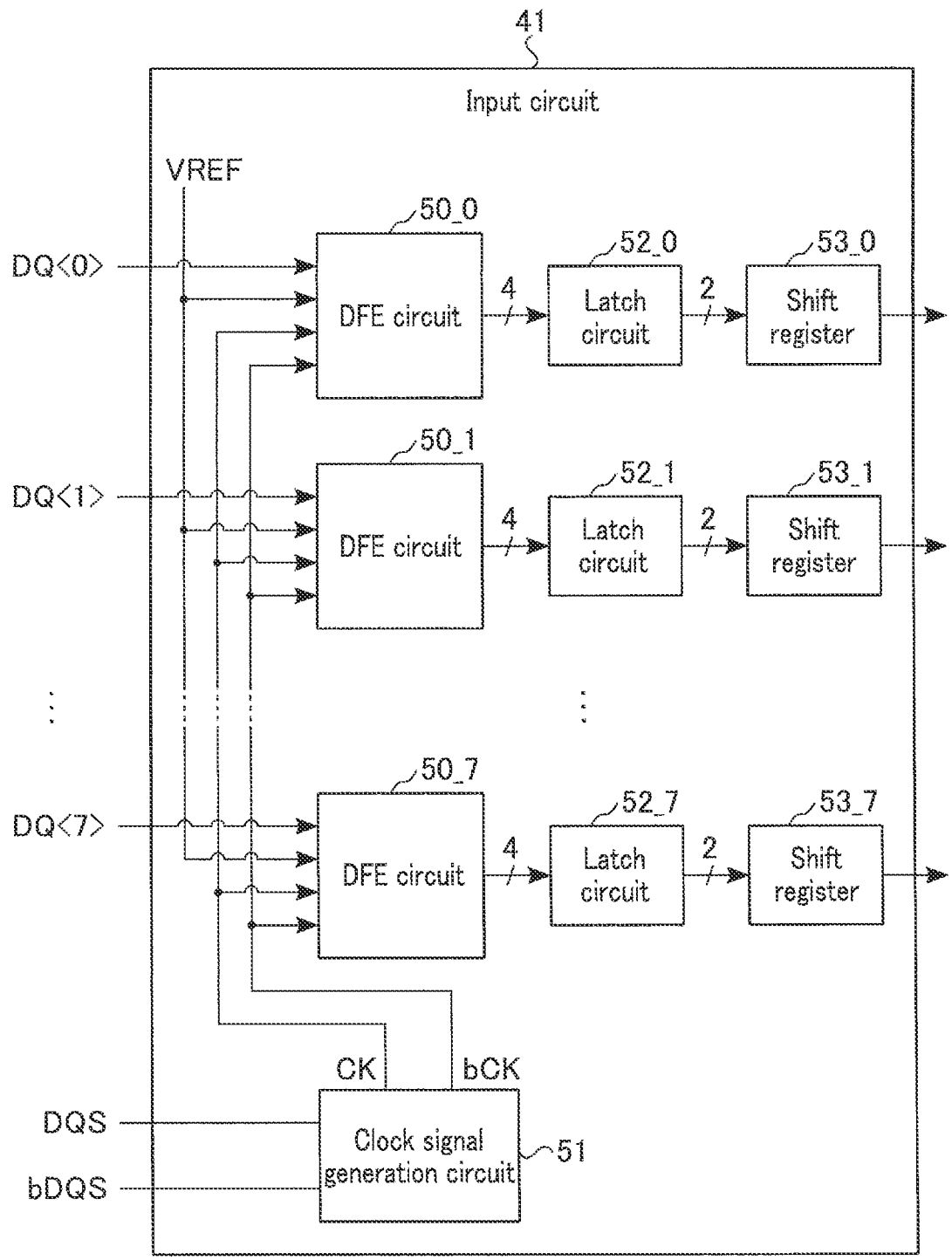
F I G. 4

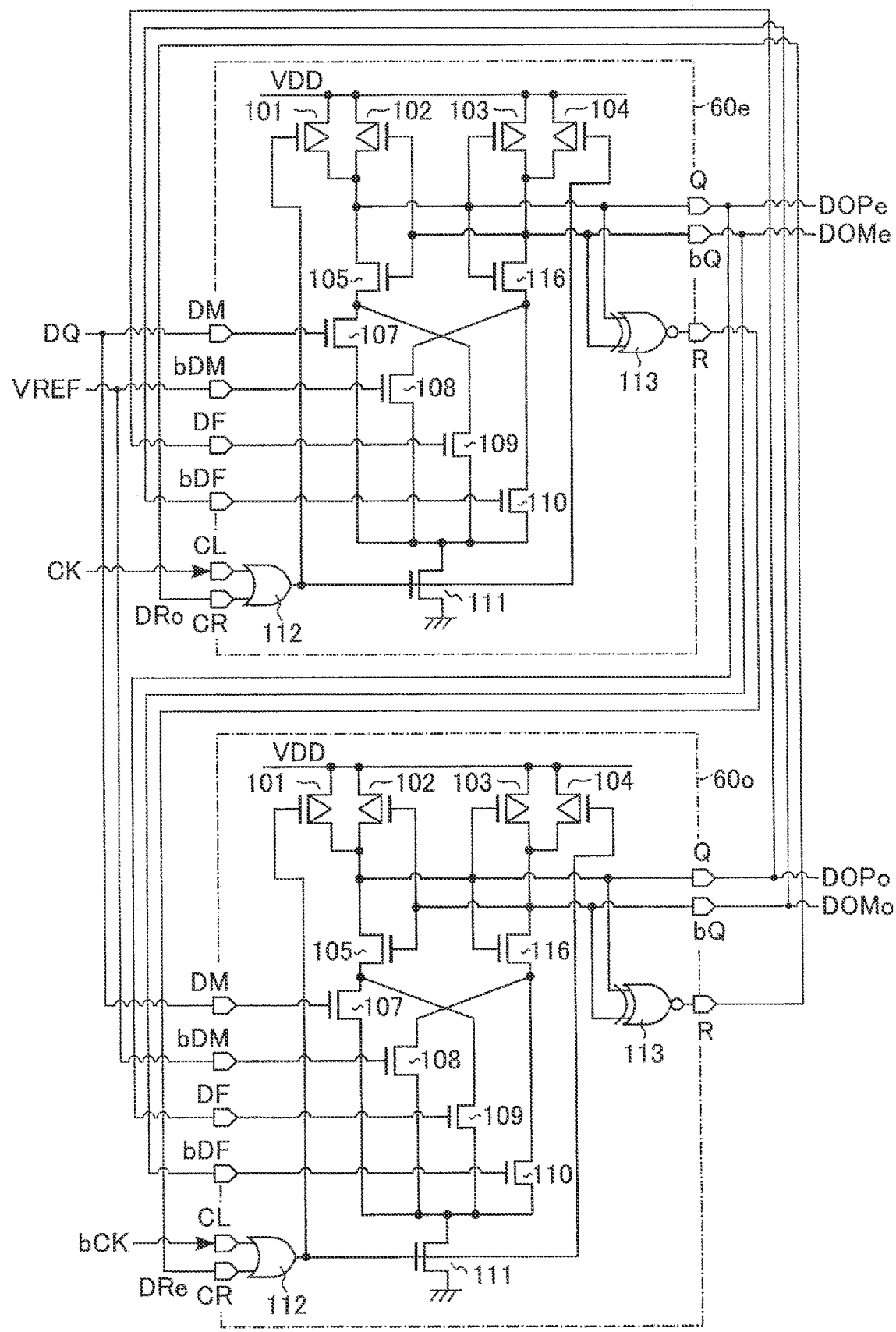
F I G. 6

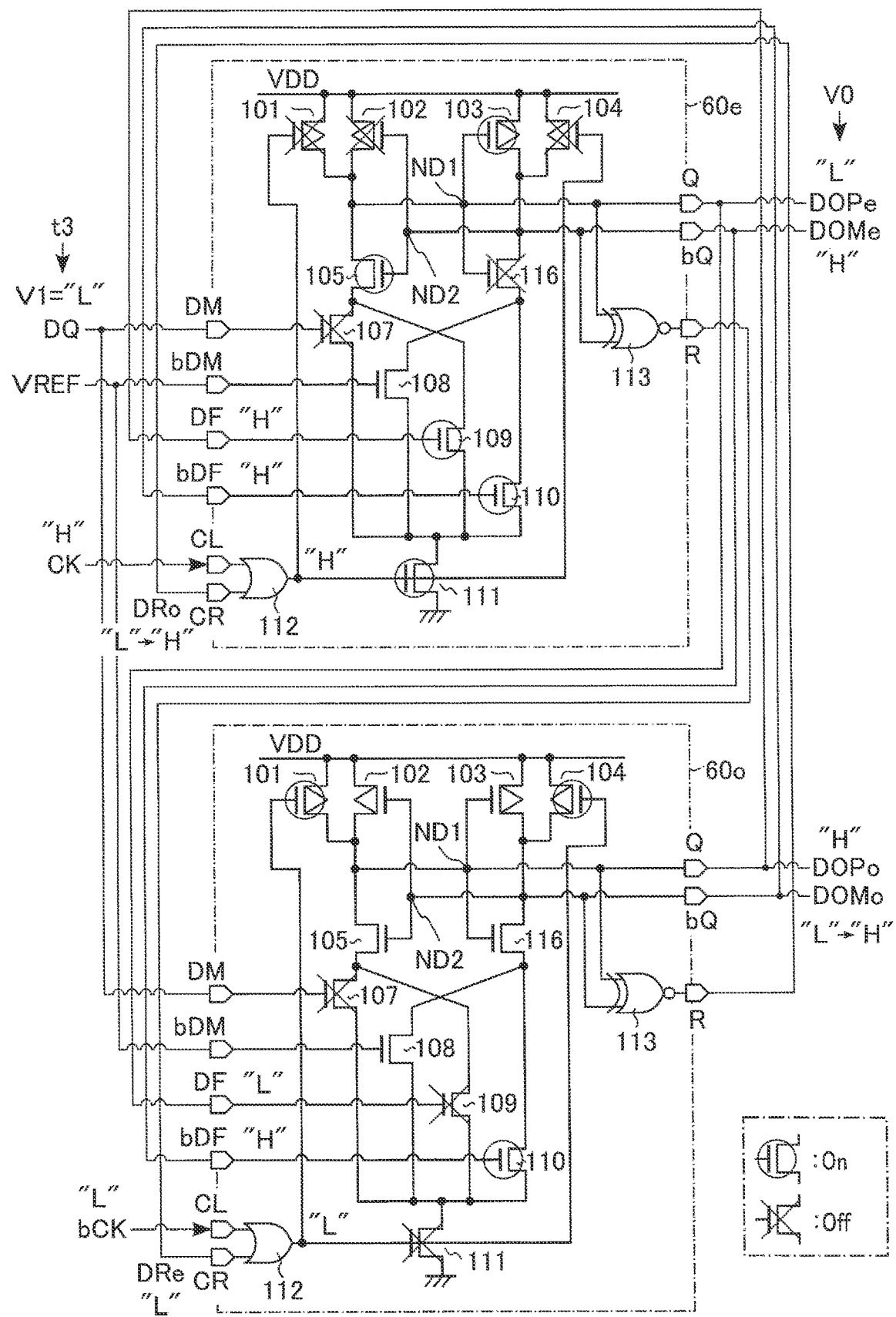
F I G. 12

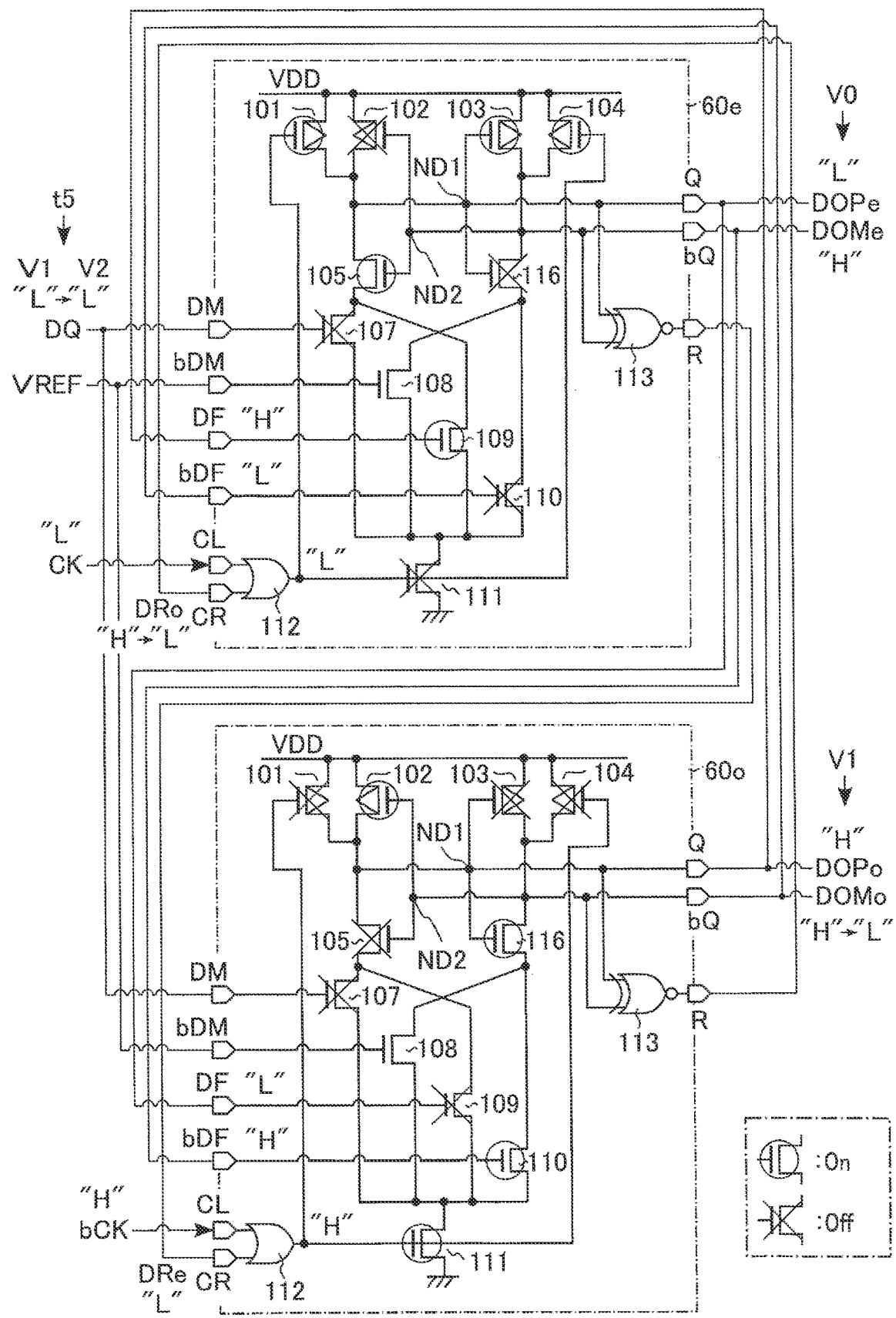
F I G. 14

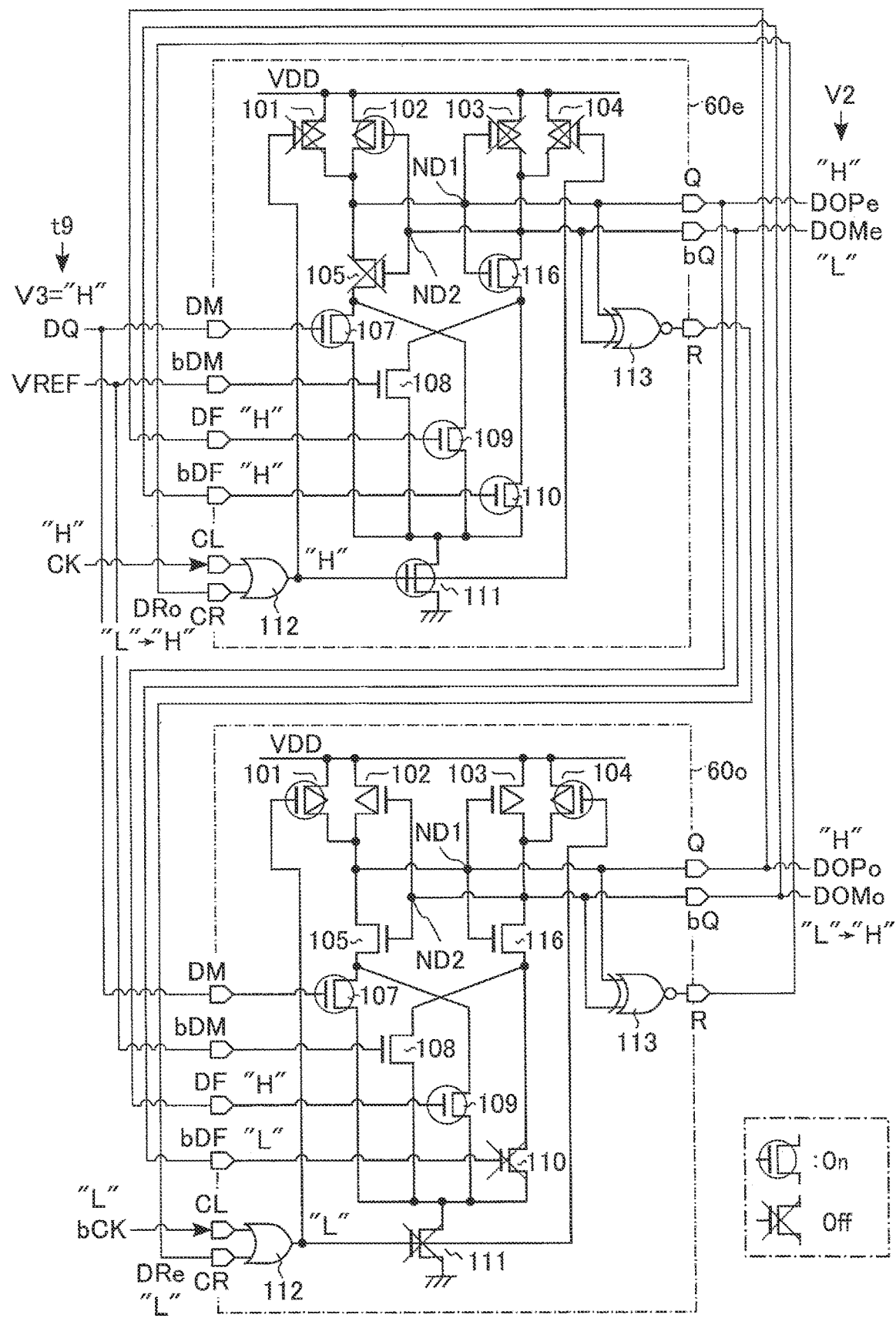
F I G. 18

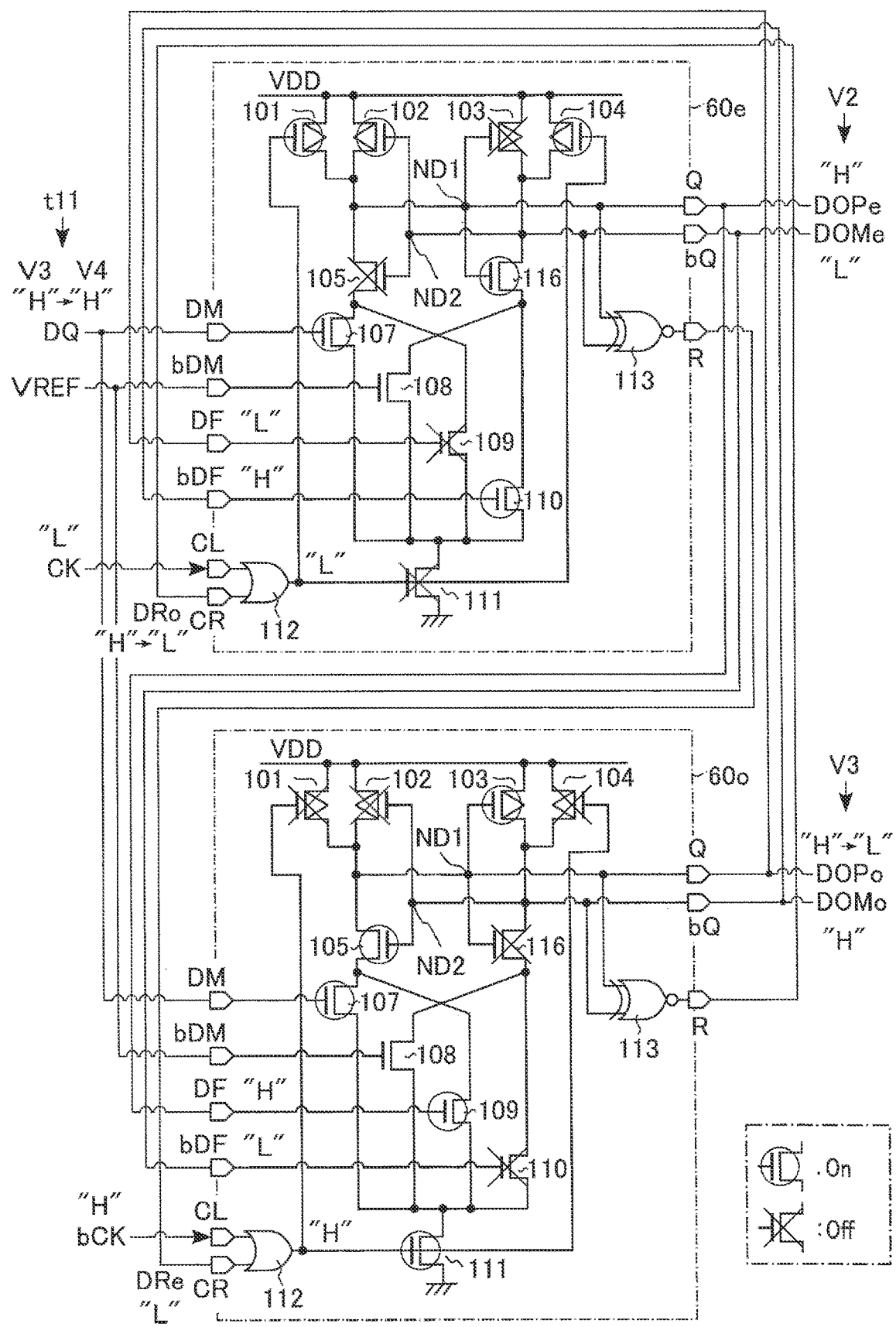
F I G. 20

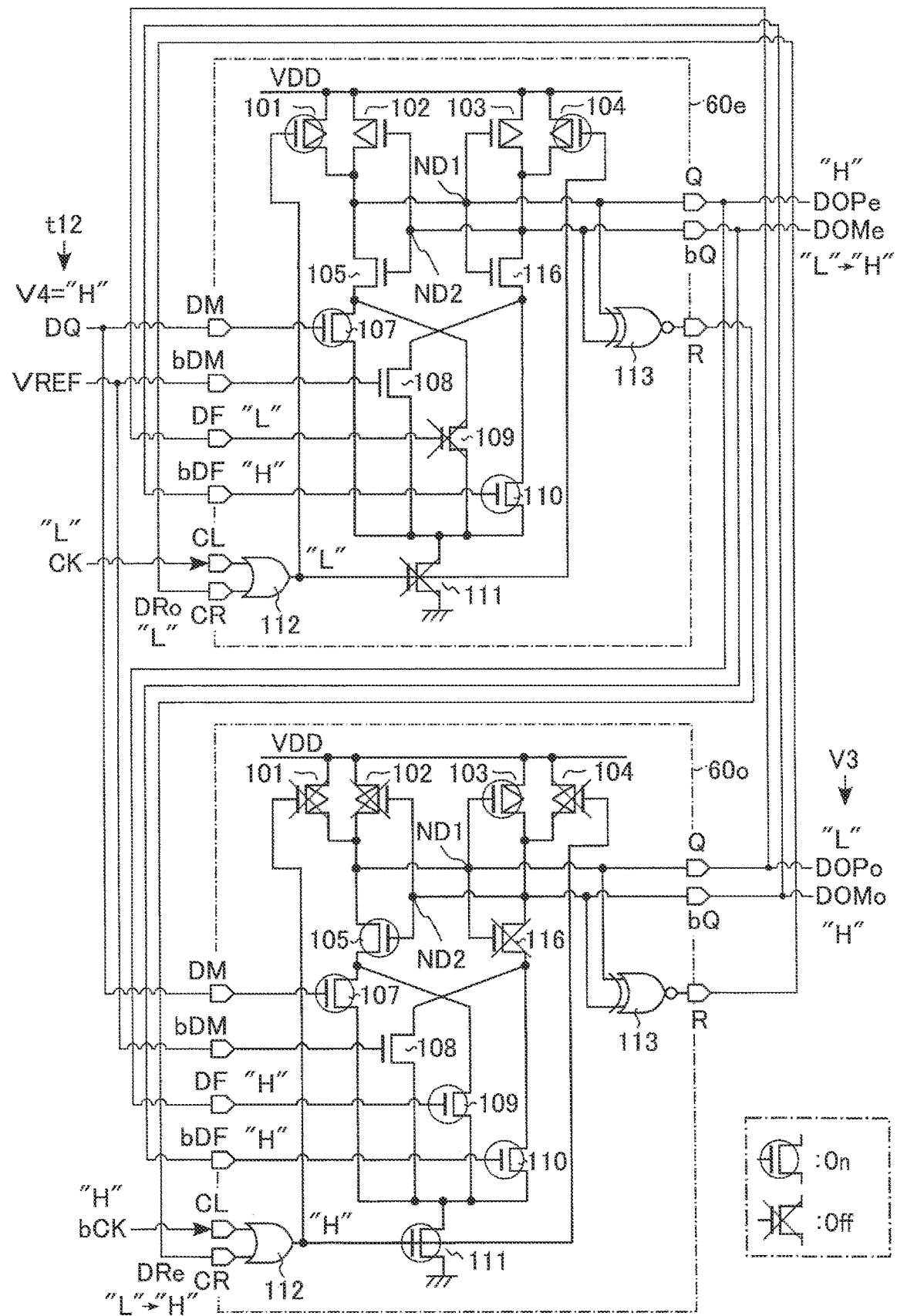
F I G. 21

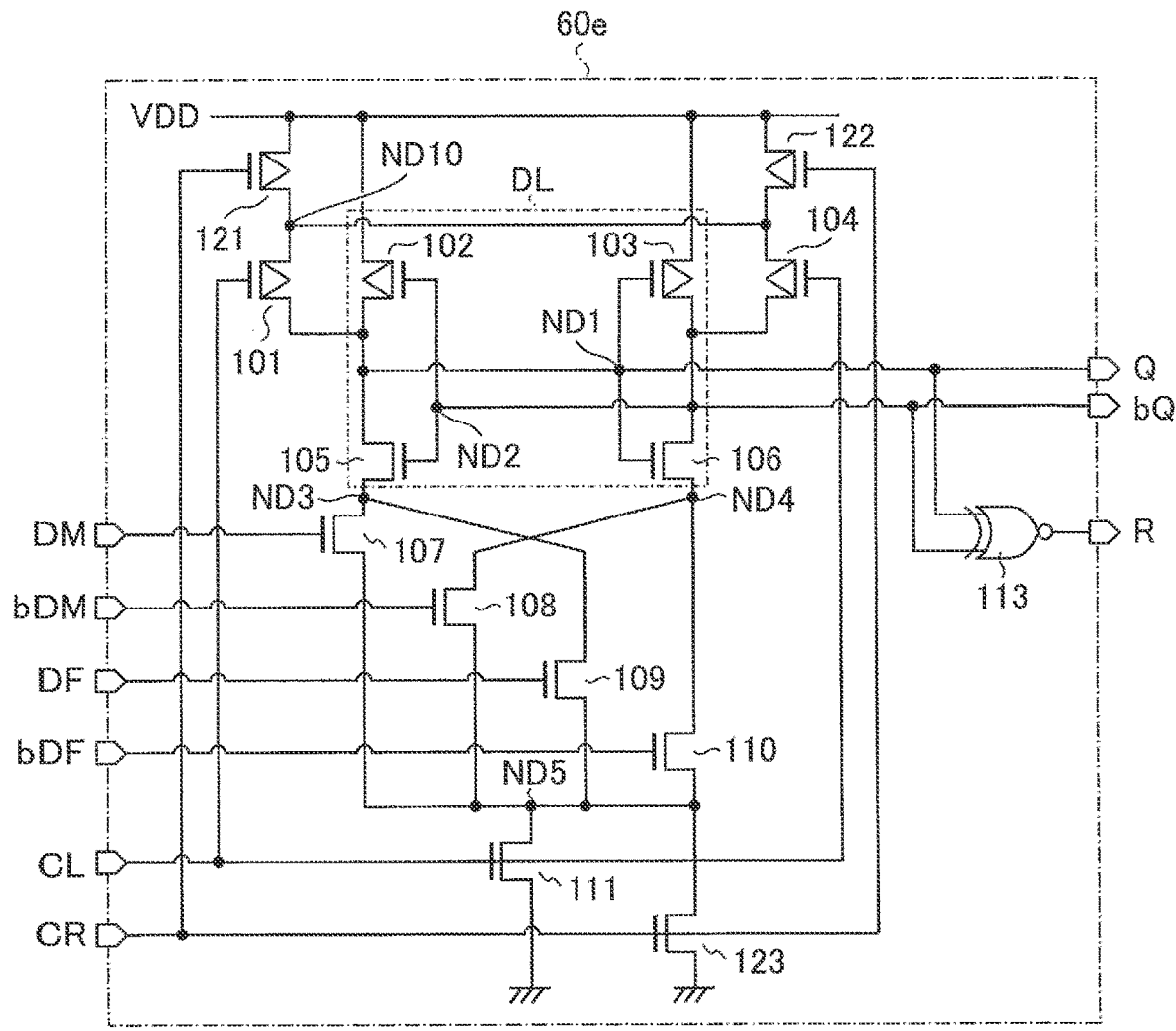
F I G. 23

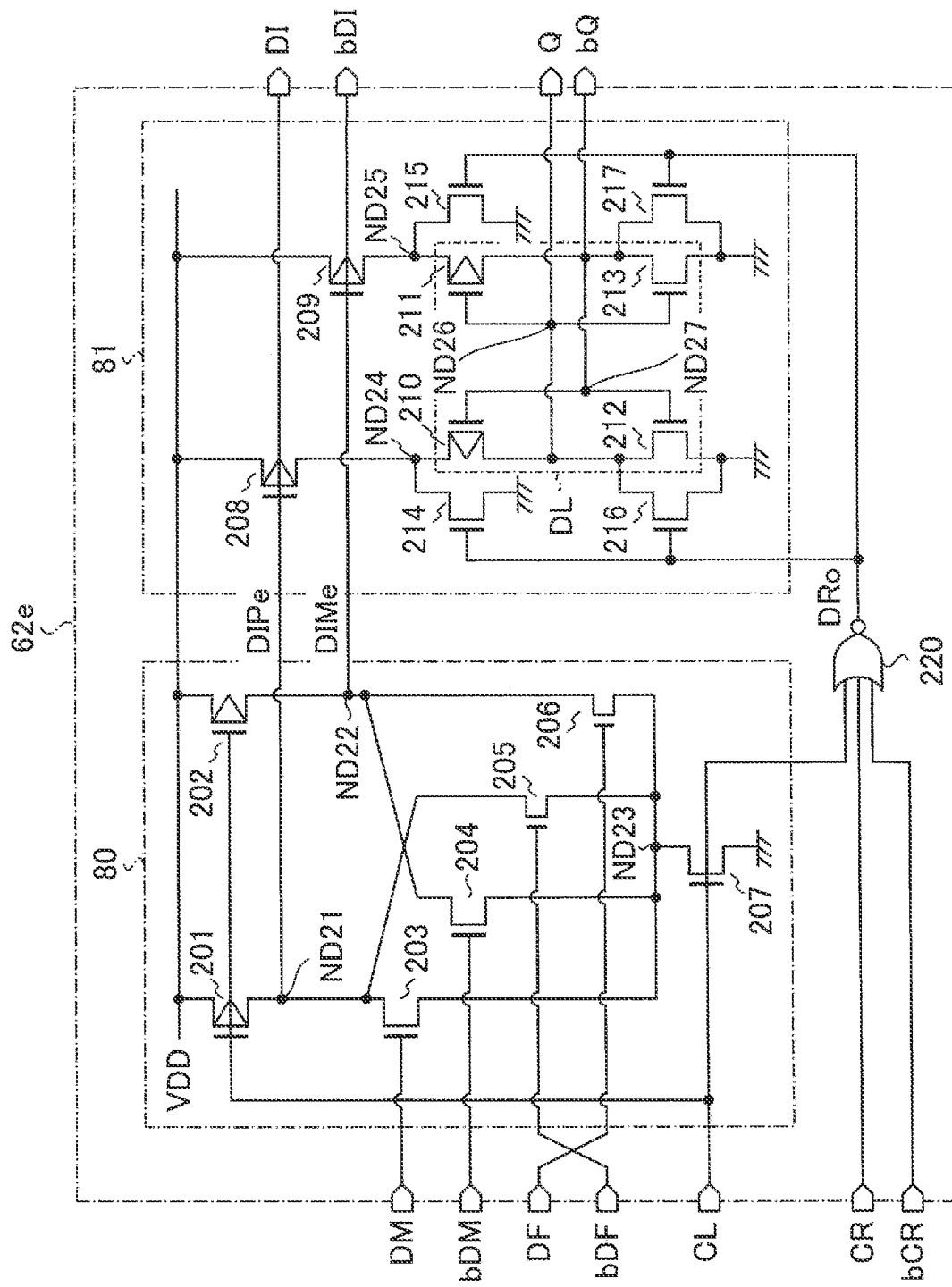
F I G. 26

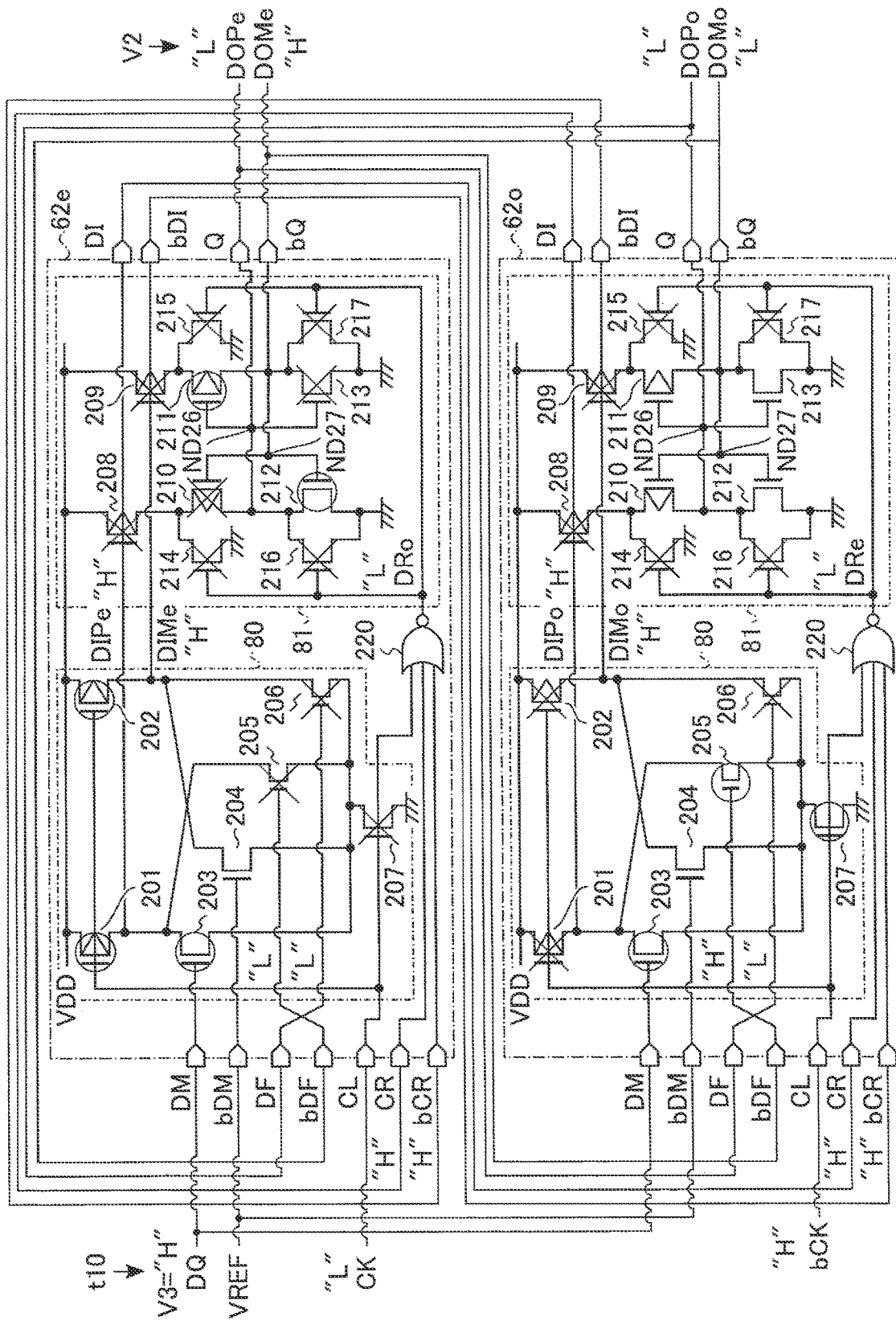
F I G. 38

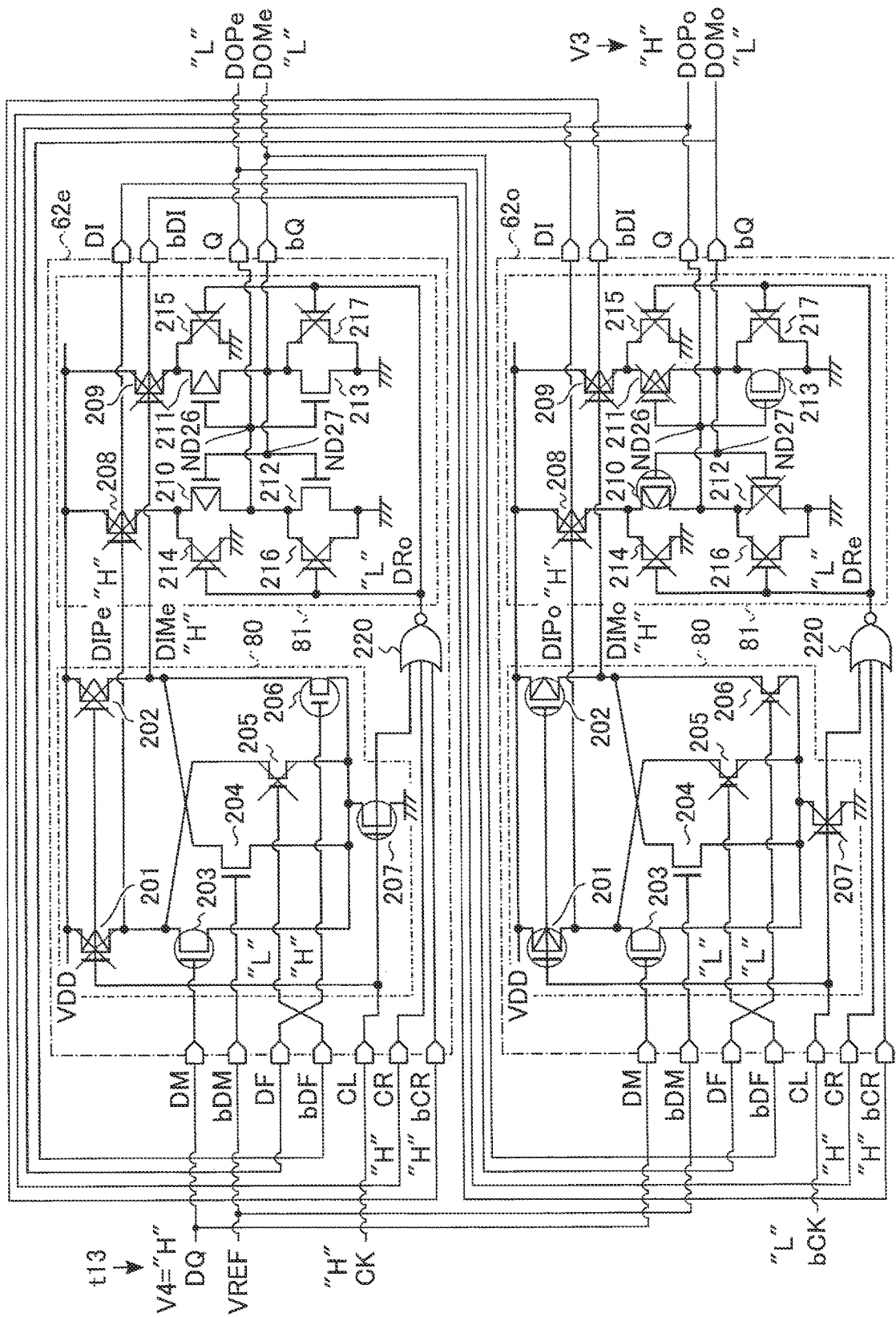
F I G. 41

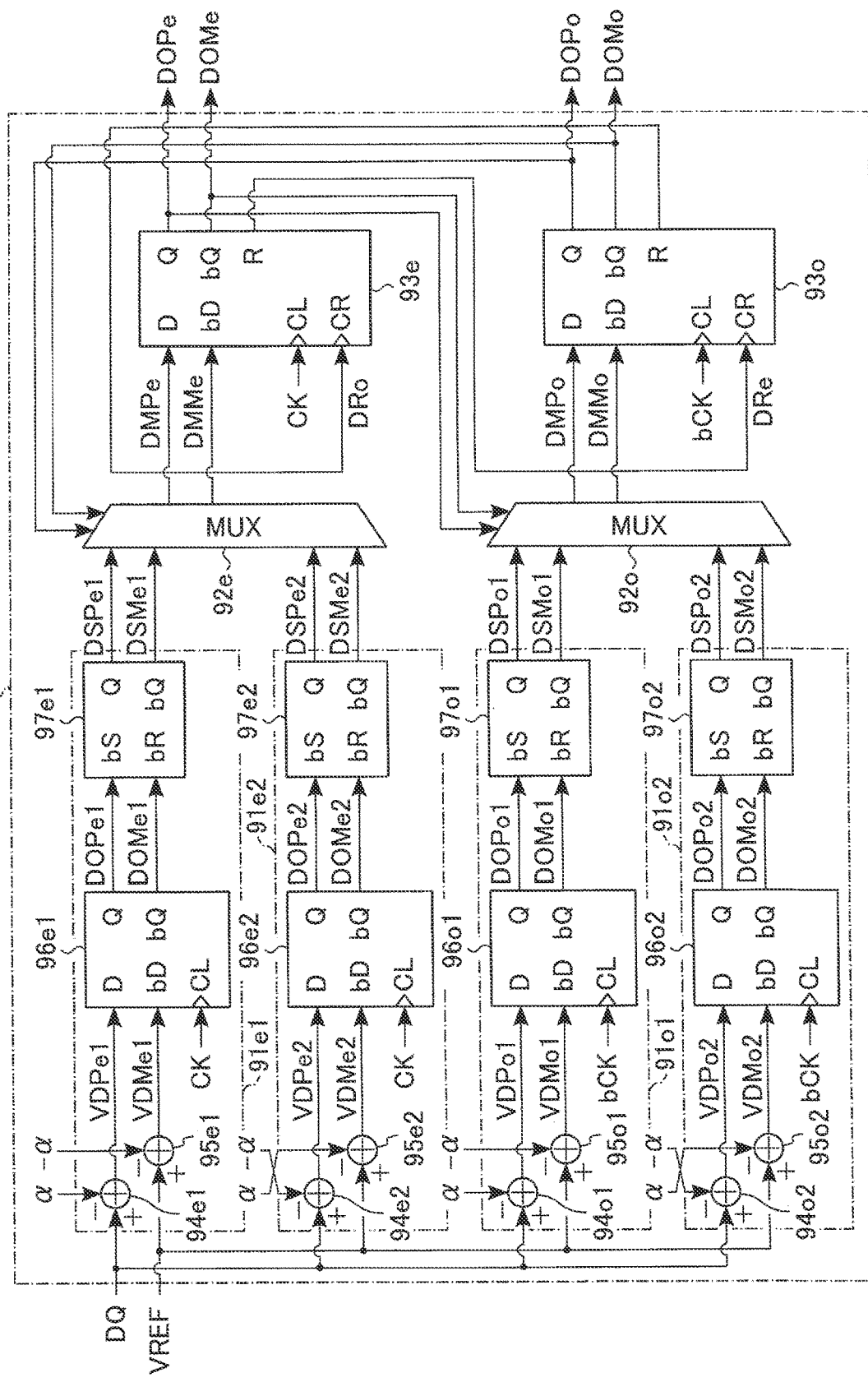
F I G. 44

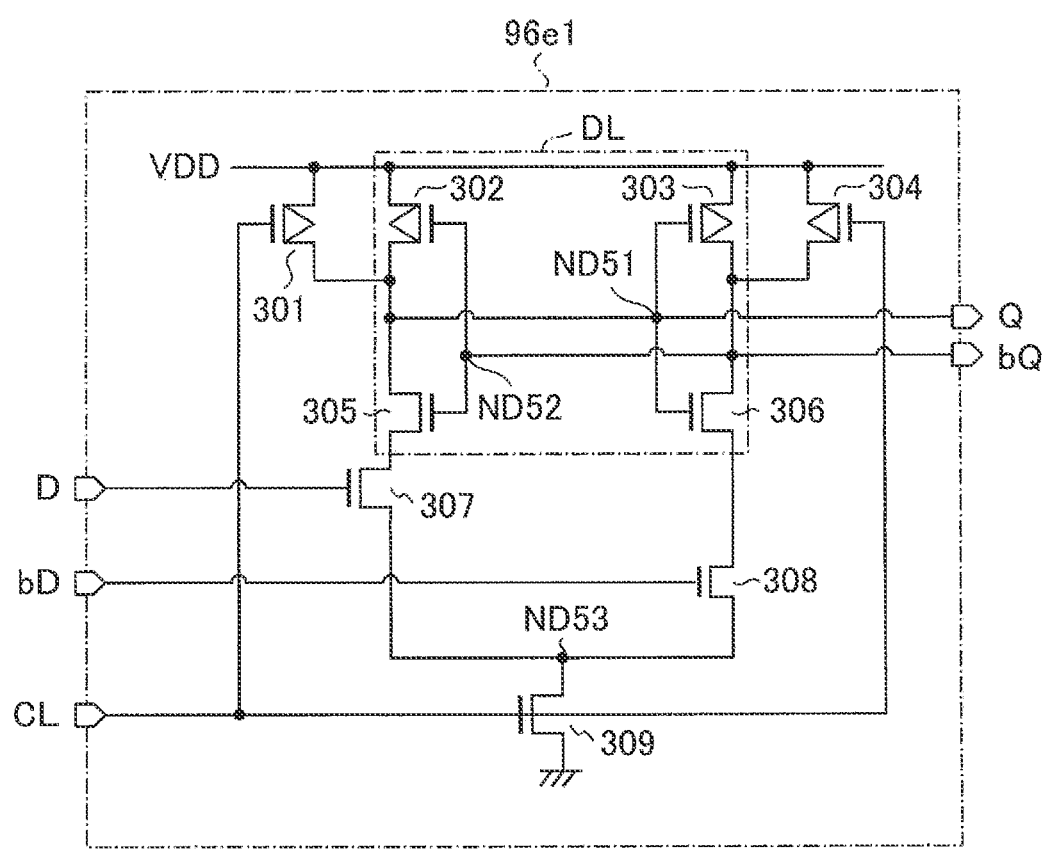
F I G. 45

SEMICONDUCTOR MEMORY DEVICE

CROSS-REFERENCE TO RELATED APPLICATIONS

This application is based upon and claims the benefit of priority from Japanese Patent Application No. 2022-075218, filed Apr. 28, 2022, the entire contents of which are incorporated herein by reference.

FIELD

Embodiments described herein relate generally to a semiconductor memory device.

BACKGROUND

A NAND flash memory is known as a semiconductor memory device.

BRIEF DESCRIPTION OF THE DRAWINGS

FIG. 2 is a block diagram of the semiconductor memory device according to the first embodiment.

FIG. 4 is a block diagram of an input circuit included in the semiconductor memory device according to the first embodiment.

FIG. 6 is a circuit diagram of the DFE circuit 50 included in the semiconductor memory device according to the first embodiment.

FIG. 12 is a state diagram of the DFE circuit 50 at time t3 in the timing chart shown in FIG. 8.

FIG. 14 is a state diagram of the DFE circuit 50 at time t5 in the timing chart shown in FIG. 8.

FIG. 18 is a state diagram of the DFE circuit 50 at time t9 in the timing chart shown in FIG. 8.

FIG. 20 is a state diagram of the DFE circuit 50 at time t11 in the timing chart shown in FIG. 8.

FIG. 21 is a state diagram of the DFE circuit 50 at time t12 in the timing chart shown in FIG. 8.

FIG. 23 is a circuit diagram of the amplifier 60e included in the semiconductor memory device according to a modification of the first embodiment.

FIG. 26 is a circuit diagram of an amplifier 62e included in the semiconductor memory device according to the second embodiment.

FIG. 38 is a state diagram of the DFE circuit 50 at time t10 in the timing chart shown in FIG. 27.

FIG. 41 is a state diagram of the DFE circuit 50 at time t13 in the timing chart shown in FIG. 27.

FIG. 44 is a block diagram of a DFE circuit 50 included in a semiconductor memory device according to a third embodiment.

FIG. 45 is a circuit diagram of an amplifier 96e1 included in the semiconductor memory device according to the third embodiment.

DETAILED DESCRIPTION

Figure 1:
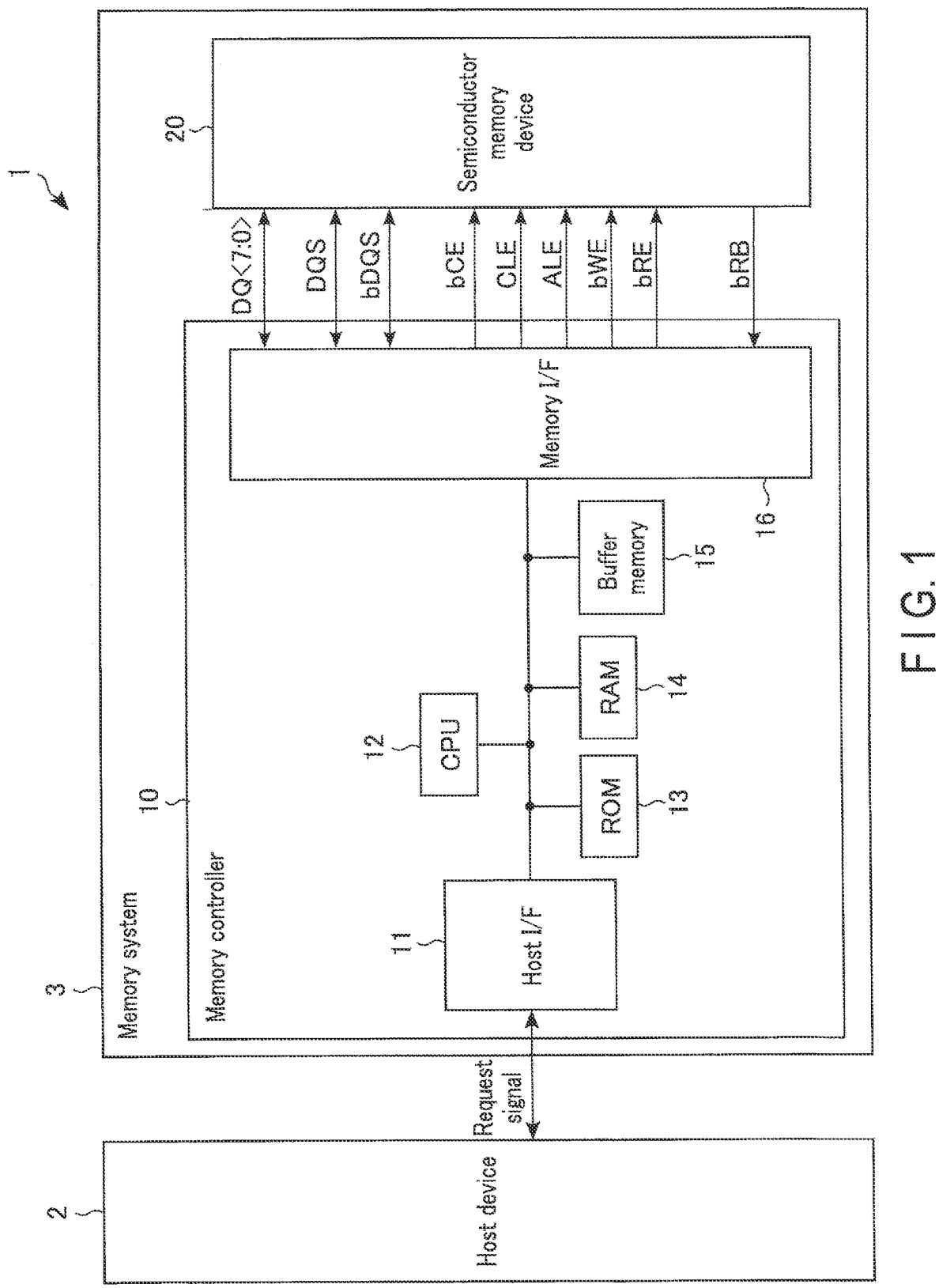
FIG. 1 is a block diagram showing the overall configuration of a data processing apparatus including a semiconductor memory device according to a first embodiment.

In general, according to one embodiment, a semiconductor memory device includes: a nonvolatile memory cell; a first circuit including a first latch circuit, and configured to receive first bit data of an input signal based on a first clock signal, store, in the first latch circuit, first data based on a result of comparison between the first bit data and a reference voltage, and output a first signal based on the first data; and a second circuit including a second latch circuit, and configured to receive second bit data of the input signal based on a second clock signal obtained by inverting the first clock signal, store, in the second latch circuit, second data based on a result of comparison between the second bit data and the reference voltage, and output a second signal based on the second data. The first circuit is configured to receive the second data and the second signal and set the first latch circuit in a reset state based on the second signal. The second circuit is configured to receive the first data and the first signal, compare the second bit data and the reference voltage based on the first data, and set the second latch circuit in a reset state based on the first signal.

Embodiments will now be described with reference to accompanying drawings. Each embodiment illustrates an apparatus and method that embody the technical concept of the invention. The drawings are schematic or conceptual, and dimensions, ratios, and the like in each drawing do not necessarily match the actuality. All statements made about one embodiment also apply as statements made to another embodiment, unless expressly or explicitly excluded. The technical concept of the present invention is not specified by the shapes, structures, arrangements, and the like of constituent elements.

Note that in the following description, the same reference numerals denote constituent elements having almost the same functions and configurations. Numbers following letters constituting the reference numerals are used to distinguish between constituent elements referred to by the reference numerals containing the same letters and have similar configurations. In a case in which constituent elements denoted by reference numerals containing the same letters need not be distinguished from each other, these constituent elements are referred to by the reference numerals containing the letters alone.

1. First Embodiment 1.1 Configurations
1.1.1 Configuration of Data Processing Apparatus First, with reference to FIG. 1, an example of the configuration of a data processing apparatus 1 will be described. FIG. 1 is a block diagram showing the overall configuration of the data processing apparatus 1. Note that in the example shown in FIG. 1, some couplings between constituent elements are represented by arrows, but couplings between constituent elements are not limited to them.

As shown in FIG. 1, the data processing apparatus 1 includes a host device 2 and a memory system 3. Note that a plurality of the memory systems 3 may be coupled to the host device 2.

The host device 2 is an information processing apparatus (computing device) that accesses the memory system 3. The host device 2 controls the memory system 3. More specifically, for example, the host device 2 requests (orders) the memory system 3 to execute a write operation or a data operation.

The memory system 3 is, for example, a solid state drive (SSD). The memory system 3 is coupled to the host device 2.

1.1.2 Configuration of Memory System

Continuing reference to FIG. 1, an example of the configuration of the memory system 3 will be described.

As shown in FIG. 1, the memory system 3 includes a memory controller 10 and a semiconductor memory device 20. Note that the memory system 3 may include a plurality of the semiconductor memory devices 20.

In response to the requests (orders) from the host device 2, the memory controller 10 orders the semiconductor memory device 20 to execute a read operation, a write operation, an erase operation, and the like. Further, the memory controller 10 manages the memory space of the semiconductor memory device 20.

The semiconductor memory device 20 is, for example, a NAND flash memory. The NAND flash memory includes a plurality of memory cell transistors (to be also referred to as "memory cells" hereinafter) each of which nonvolatilely stores data.

The internal configuration of the memory controller 10 will be described next. The memory controller 10 includes a host interface circuit (host I/F) 11, a central processing unit (CPU) 12, a read only memory (ROM) 13, a random access memory (RAM) 14, a buffer memory 15, and a memory interface circuit (memory I/F) 16. These circuits are coupled to each other via, for example, an internal bus. Note that each function of the memory controller 10 may be implemented by a dedicated circuit, or may be implemented by the CPU 12 executing firmware (or a program).

The host interface circuit 11 is a hardware interface circuit coupled to the host device 2. The host interface circuit 11 executes communication complying with the interface standard between the host device 2 and the memory controller 10. The host interface circuit 11 transmits the request and data received from the hot device 2 to the CPU 12 and the buffer memory 15, respectively. Further, the host interface circuit 11 transmits data stored in the buffer memory 15 to the host device 2.

The CPU 12 is a processor. The CPU 12 controls the overall operation of the memory controller 10. For example, the CPU 12 orders the semiconductor memory device 20 to execute a write operation, a read operation, and an erase operation based on the requests received from the host device 2. Further, the CPU 12 manages the memory area of the semiconductor memory device 20.

The ROM 13 is a nonvolatile memory. For example, the ROM 13 is an electrically erasable programmable read-only memory (EEPROM™). The ROM 13 is a non-transitory storage medium storing firmware and programs. For example, the operation of the memory controller 10 to be described later is implemented by the CPU 12 executing the firmware stored in the ROM 13.

The RAM 14 is a volatile memory. For example, the ROM 14 is a dynamic random access memory (DRAM) or a static random access memory (SRAM). The RAM 14 is used as the work area of the CPU 12. The RAM 14 holds firmware for managing the semiconductor memory device 20, various kinds of management tables, and the like.

The buffer memory 15 is a volatile memory. For example, the buffer memory 15 is a DRAM or an SRAM. The buffer memory 15 temporarily stores data read out from the semiconductor memory device 20 by the memory controller 10, data received from the host device 2, and the like.

The memory interface circuit 16 is a hardware interface circuit coupled to the semiconductor memory device 20. The memory interface circuit 16 transmits/receives data and various kinds of control signals to/from the semiconductor memory device 20. More specifically, the memory interface circuit 16 transmits/receives 8-bit signals DQ<7:0> and clock signals DQS and bDQS to/from the semiconductor memory device 20. The signals DQ<7:0> are, for example, data, an address, and a command. In the following description, if the description is not limited to either of the signals DQ<7:0>, they are referred to as the signals DQ. The clock signals DQS and bDQS are clock signals used in data input/output. The clock signal bDQS is an inverted signal of the clock signal DQS.

Further, the memory interface circuit 16 transmits, as control signals, for example, a chip enable signal bCE, a command latch enable signal CLE, an address latch enable signal ALE, a write enable signal bWE, and a read enable signal bRE to the semiconductor memory device 20. The memory interface circuit 16 receives a ready/busy signal bRB from the semiconductor memory device 20.

The chip enable signal bCE is a signal for enabling the semiconductor memory device 20. The signal bCE is asserted, for example, in low ("L") level.

The command latch enable signal CLE is a signal indicating that the signal DQ is a command. The signal CLE is asserted, for example, in high ("H") level.

The address latch enable signal ALE is a signal indicating that the signal DQ is an address. The signal ALE is asserted, for example, in "H" level.

The write enable signal bWE is a signal for taking the received signal into the semiconductor memory device 20. The write enable signal bWE is asserted, for example, in "L" level at the timing at which the semiconductor memory device 20 takes in a command and an address. Accordingly, each time the signal bWE is toggled, the command and address are taken into the semiconductor memory device 20.

The read enable signal bRE is a signal for the memory controller 10 reading data from the semiconductor memory device 20. For example, upon outputting data, the semiconductor memory device 20 generates the signals DQS and bDQS based on the signal bRE.

The ready/busy signal bRB is a signal indicating whether the semiconductor memory device 20 is in a state capable of receiving the signal DQ from the memory controller 10. The ready/busy signal bRB is set in "L" level if the semiconductor memory device 20 is in a busy state.

1.1.3 Configuration of Semiconductor Memory Device

Next, an example of the configuration of the semiconductor memory device 20 will be described with reference to FIG. 2. FIG. 2 is a block diagram of the semiconductor memory device. Note that in the example shown in FIG. 2, some couplings between constituent elements are represented by arrows. However, couplings between constituent elements are not limited to them.

As shown in FIG. 2, the semiconductor memory device 20 includes an input/output circuit 21, a logic control circuit 22, an address register 23, a command register 24, a status register 25, a sequencer 26, a ready/busy circuit 27, a voltage generation circuit 28, a memory cell array 29, a row decoder 30, a sense amplifier 31, a data register 32, and a column decoder 33.

The input/output circuit 21 is a circuit that inputs/outputs the signal DQ and the clock signals DQS and bDQS from/to the memory controller 10. The input/output circuit 21 is coupled to the memory interface circuit 16 of the memory controller 10. The input/output circuit 21 is also coupled to the logic control circuit 22, the address register 23, the command register 24, the status register 25, and the data register 32.

The input/output circuit 21 includes an input circuit 41 and an output circuit 42.

The input circuit 41 is a circuit that receives the input signal DQ from the memory controller 10. If the input signal DQ is data DAT, the input circuit 41 receives the input signal DQ based on the clock signals DQS and bDQS. Then, the input circuit 41 transmits the data DAT to the data register 32. If the input signal DQ is an address ADD, the input circuit 41 receives the input signal DQ based on the signal bWE. Then, the input circuit 41 transmits the address ADD to the address register 23. If the input signal DQ is a command CMD, the input circuit 41 receives the input signal DQ based on the signal bWE. Then, the input circuit 41 transmits the command CMD to the command register 24.

The output circuit 42 is a circuit that transmits the output signal DQ to the memory controller 10. The output circuit 42 transmits, to the memory controller 10, the output signal DQ together with the clock signals DQS and bDQS.

The logic control circuit 22 is a circuit that performs logic control of the semiconductor memory device 20. The logic control circuit 22 receives, for example, the signals bCE, CLE, ALE, bWE, and bRE from the memory controller 10. The logic control circuit 22 is coupled to the input/output circuit 21 and the sequencer 26. The logic control circuit 22 controls the input/output circuit 21 and the sequencer 26 based on the received signal.

The address register 23 is a register that temporarily stores the address ADD. The address register 23 is coupled to the input/output circuit 21, the row decoder 30, and the column decoder 33. The address ADD includes a row address RA and a column address CA. The address register 23 transmits the row address RA to the row decoder 30. Further, the address register 23 transmits the column address CA to the column decoder 33.

The command register 24 is a register that temporarily stores the command CMD. The command register 24 is coupled to the input/output circuit 21 and the sequencer 26. The command register 24 transmits the command CMD to the sequencer 26.

The status register 25 is a register that temporarily stores status information STS. For example, the status information STS includes information regarding the results of the write operation, the read operation, the erase operation, and the like. The status register 25 is coupled to the sequencer 26. For example, the status information STS is transmitted to the memory controller 10 as the output signal DQ.

The sequencer 26 is a circuit that controls the overall operation of the semiconductor memory device 20. The sequencer 26 is coupled to the logic control circuit 22, the address register 23, the command register 24, the status register 25, the ready/busy circuit 27, the voltage generation circuit 28, the row decoder 30, the sense amplifier 31, and the like. The sequencer 26 controls the status register 25, the ready/busy circuit 27, the voltage generation circuit 28, the row decoder 30, the sense amplifier 31, and the like. The sequencer 26 executes the write operation, the read operation, and the erase operation based on the commands CMD.

The ready/busy circuit 27 is a circuit that generates the ready/busy signal bRB. The ready/busy circuit 27 is coupled to the sequencer 26. The ready/busy circuit 27 generates the ready/busy signal bRB based on the control by the sequencer 26. The ready/busy circuit 27 transmits the ready/busy signal bRB to the memory controller 10.

The voltage generation circuit 28 generates, based on the control by the sequencer 26, various voltages used for the write operation, the read operation, and the erase operation. The voltage generation circuit 28 supplies the various voltages to the memory cell array 29, the row decoder 30, the sense amplifier 31, and the like.

The memory cell array 29 is a set of a plurality of arrayed memory cell transistors. The memory cell array 29 includes a plurality of blocks BLK. The block BLK is a set of multiple memory cell transistors where data are erased collectively. In the example shown in FIG. 2, the memory cell array 29 includes four blocks BLK0, BLK1, BLK2, and BLK3. Note that the number of blocks BLK included in the memory cell array 29 is arbitrary.

The row decoder 30 is a decoding circuit for the row address RA. The row decoder 30 is coupled to the address register 23, the sequencer 26, the voltage generation circuit 28, and the memory cell array 29. The row decoder 30 selects either of the blocks BLK based on the decoding result of the row address RA. The row decoder 30 applies voltages to the row interconnects (word lines and selection gate lines to be described later) of the selected block BLK.

The sense amplifier 31 is a circuit that writes and reads out the data DAT. The sense amplifier 31 is coupled to the sequencer 26, the voltage generation circuit 28, the memory cell array 29, and the data register 32. During the read operation, the sense amplifier 31 reads out the data DAT from the memory cell array 29. During the write operation, the sense amplifier 31 supplies voltages corresponding to the write data DAT to the memory cell array 29.

The data register 32 is a register that temporarily stores the data DAT. The data register 32 is coupled to the input/output circuit 21, the sequencer 26, the sense amplifier 31, and the column decoder 33. The data register 32 includes a plurality of latch circuits. Each latch circuit temporarily stores write data or read data.

The column decoder 33 is a circuit that decodes the column address CA. The column decoder 33 is coupled to the address register 23, the sequencer 26, and the data register 32. The column decoder 33 receives the column address CA from the address register 23. The column decoder 33 selects the latch circuits in the data register 32 based on the decoding result of the column address CA.

1.1.4 Circuit Configuration of Memory Cell Array

Figure 3:
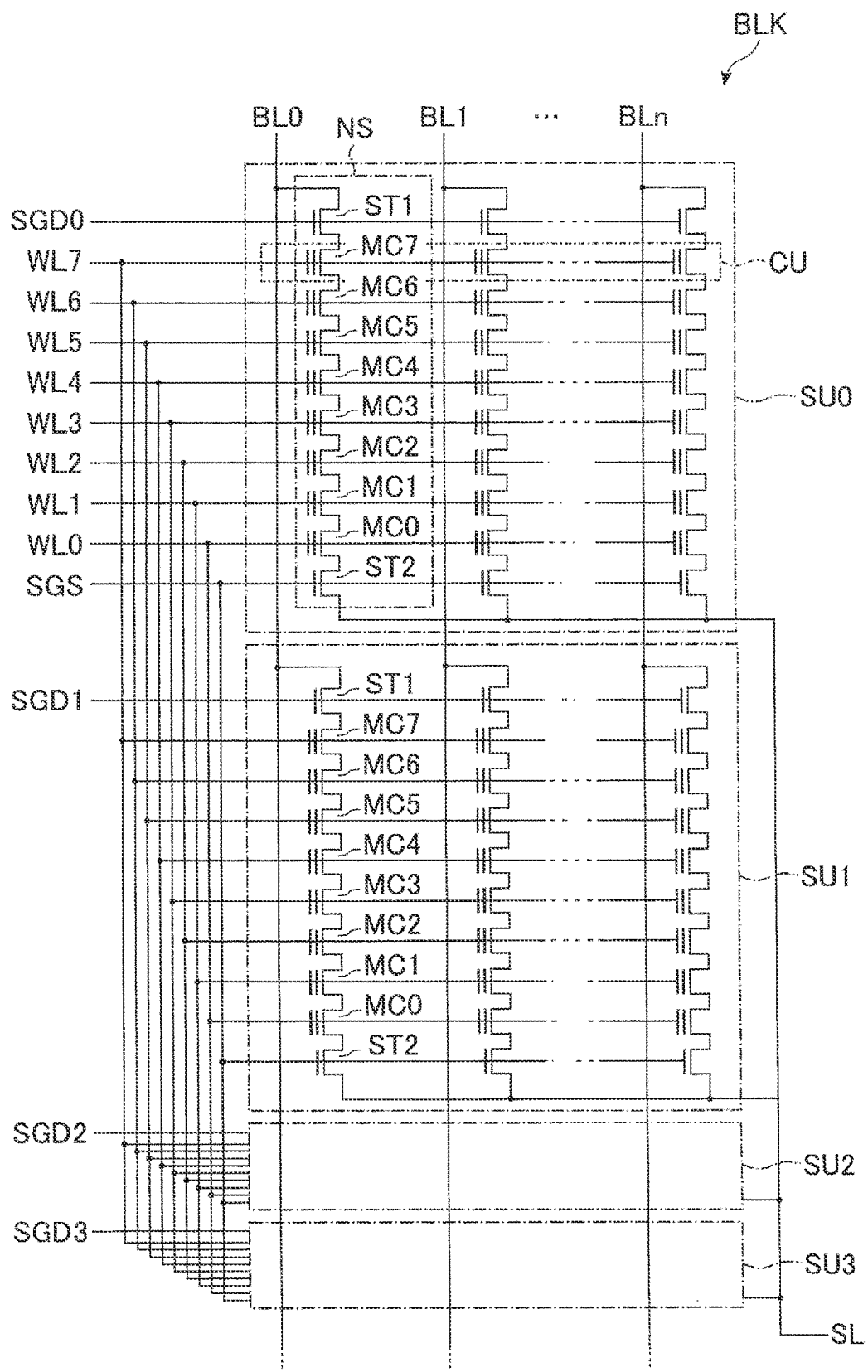
FIG. 3 is a circuit diagram of a memory cell array included in the semiconductor memory device according to the first embodiment.

Next, an example of the circuit configuration of the memory cell array 29 will be described with reference to FIG. 3. FIG. 3 is a circuit diagram of the memory cell array 29. Note that the example in FIG. 3 shows the circuit configuration of one block BLK.

As shown in FIG. 3, the block BLK includes a plurality of string units SU. The string unit SU is, for example, a set of multiple NAND strings NS to be collectively selected in the write operation or the read operation. In the example shown in FIG. 3, the block BLK includes four string units SU0 to SU3. Note that the number of the string units SU included in the block BLK is arbitrary.

Next, the internal configuration of the string unit SU will be described. The string unit SU includes the multiple NAND strings NS. The NAND string NS is a set of multiple memory cell transistors coupled in series. For example, the n+1 (n is an integer of 1 or more) NAND strings NS in the string unit SU are coupled to n+1 bit lines BL0 to BLn, respectively.

Next, the internal configuration of the NAND string NS will be described. Each NAND string NS includes multiple memory cell transistors MS and selection transistors ST1 and ST2. In the example shown in FIG. 3, the NAND string NS includes eight memory cell transistors MC0 to MC7. Note that the number of the memory cell transistors MC in the NAND string NS is arbitrary.

The memory cell transistor MC nonvolatilely stores data. The memory cell transistor MC includes a control gate and a charge storage layer. The memory cell transistor MC may be of a metal-oxide-nitride-oxide-silicon (MONOS) type or a floating gate (FG) type. The MONOS type uses an insulating layer as the charge storage layer. The FG type uses a conductor layer as the charge storage layer.

The selection transistors ST1 and ST2 are used to select the string unit SU during the various operations. The number of the selection transistors ST1 and ST2 is arbitrary in the NAND string NS. It is only required that one or more selection transistors ST1 and one or more selection transistors ST2 are included in the NAND string NS.

The current paths of the memory cell transistor MC and the selection transistors ST1 and ST2 are coupled in series in each NAND string NS. More specifically, the current paths are coupled in series in the order of the selection transistor ST2, the memory cell transistors MC0 to MC7, and the selection transistor ST1. The drain of the selection transistor ST1 is coupled to either one of the bit lines BL. The source of the selection transistor ST2 is coupled to a source line SL.

The control gates of the memory cell transistors MC0 to MC7 in the same block BLK are commonly coupled to word lines WL0 to WL7, respectively. More specifically, for example, the block BLK includes four string units SU0 to SU3. Each of the string units SU0 to SU3 includes a plurality of memory cell transistors MC0. The control gates of the memory cell transistors MC0 in the block BLK are commonly coupled to one word line WL0. This also applies to the memory cell transistors MC1 to MC7.

The gates of the selection transistors ST1 in the string unit SU are commonly coupled to one selection gate line SGD. More specifically, the string unit SU0 includes a plurality of selection transistors ST1. The gates of the selection transistors ST1 in the string unit SU0 are commonly coupled to a selection gate line SGD0. Similarly, the gates of the selection transistors ST1 in the string unit SU1 are commonly coupled to a selection gate line SGD1. The gates of the selection transistors ST1 in the string unit SU2 are commonly coupled to a selection gate line SGD2. The gates of the selection transistors ST1 in the string unit SU3 are commonly coupled to a selection gate line SGD3.

The gates of the selection transistors ST2 in the same block BLK are commonly coupled to one selection gate line SGS. More specifically, for example, the block BLK includes four string units SU0 to SU3. Each of the string units SU0 to SU3 includes a plurality of selection transistors ST2. The gates of the selection transistors ST2 in the block BLK are commonly coupled to one selection gate line SGS. Note that, like the selection gate lines SGD, different selection gate lines SGS may be provided for the respective string units SU.

Each of the word lines WL0 to WL7, the selection gate lines SGD0 to SGD3, and the selection gate line SGS is coupled to the row decoder 30.

The bit line BL is commonly coupled to one NAND string NS in each string unit SU of each block BLK. The same column address CA is assigned to the plurality of NAND strings NS coupled to one bit line BL. Each bit line BL is coupled to the sense amplifier 31.

The source line SL is shared by, for example, the plurality of blocks BLK.

In one string unit SU, a set of the plurality of memory cell transistors MC coupled to one word line WL is referred to as a "cell unit CU". For example, if the memory cell transistor MC stores 1-bit data, the storage capacity of the cell unit CU is defined as "1-page data". Based on the number of bits of data stored in the memory transistor MC, the cell unit CU can have a storage capacity of 2-page data or more.

1.1.5 Configuration of Input Circuit

Next, an example of the configuration of the input circuit 41 will be described with reference to FIG. 4. FIG. 4 is a block diagram of the input circuit 41.

As shown in FIG. 4, the input circuit 41 includes eight decision feedback equalizer (DFE) circuits 50_0 to 50_7, a clock signal generation circuit 51, eight latch circuits 52_0 to 52_7, and eight shift registers 53_0 to 53_7.

In the following description, if the description is not limited to either of the DFE circuits 50_0 to 50_7, they are referred to as the DFE circuits 50. If the description is not limited to either of the latch circuits 52_0 to 52_7, they are referred to as the latch circuits 52. If the description is not limited to either of the shift registers 53_0 to 53_7, they are referred to as the shift registers 53.

The DFE circuit 50 is a signal compensation circuit applied with the DFE technique. The DFE technique is one of digital signal compensation techniques. The DFE circuits 50_0 to 50_7 correspond to the signals DQ<0> to DQ<7>, respectively. The DFE circuit 50 determines the logic level (high ("H") level or low ("L") level) of the bit data of the input signal (signal DQ). The DFE circuit 50 feeds back the bit data with the logic level determined to the input of the next bit data, thereby compensating the input signal.

For example, there is a case where the input circuit 41 cannot receive the signal DQ in a full swing state due to the influence of the transmission path between the memory controller 10 and the semiconductor memory device 20 or high-speed communication. That is, there is a case where the input circuit 41 receives the signal DQ whose amplitude is smaller than in the state upon being output from the memory controller 10. The input circuit 41 determines the logic level of the signal DQ by comparing the signal DQ with a reference voltage VREF. Accordingly, if the signal DQ is not in the full swing state, the voltage difference between the signal DQ and the voltage VREF becomes small, and the logic level of the signal DQ is more likely to be determined incorrectly. In such a case, the DFE circuit 50 improves the waveform of the input signal DQ.

The corresponding signal DQ, the voltage VREF, and clock signals CK and bCK are input to the DFE circuit 50. The voltage VREF is used to determine the logic level of the signal DQ. The clock signals CK and bCK are used to control the timing of taking in the signal DQ. The signal bCK is an inverted signal of the signal CK. For example, at the timing of rising of each of the signals CK and bCK, the DFE circuit 50 takes in (receives) the signal DQ.

The DFE circuit 50 includes a reception path corresponding to even-numbered bit data of the signal DQ, and a reception path corresponding to odd-numbered bit data of the signal DQ. Therefore, the DFE circuit 50 includes two output terminals corresponding to the even-numbered bit data of the signal DQ, and two output terminals corresponding to the odd-numbered bit data of the signal DQ. The four output terminals of the DFE circuit 50 are coupled to four input terminals of the corresponding latch circuit 52. More specifically, the DFE circuits 50_0 to 50_7 are coupled to the latch circuits 52_0 to 52_7, respectively.

The clock signal generation circuit 51 is a circuit that generates the signals CK and bCK. The clock signal generation circuit 51 is coupled to the DFE circuits 50_0 to 50_7. The clock signal generation circuit 51 transmits the signals CK and bCK to each DFE circuit 50. The clock signal generation circuit 51 receives the signals DQS and bDQS. For example, if the signal DQ is data, the clock signal generation circuit 51 outputs the signal DQS as the signal CK, and outputs the signal bDQS as the signal bCK. If the signal DQ is a command or an address, the clock signal generation circuit 51 generates the signals CK and bCK based on the signal bWE received from the logic control circuit 22.

The latch circuit 52 is a circuit that temporarily stores the output signal of the corresponding DFE circuit 50. The latch circuit 52 receives, as the output signal of the DFE circuit 50, each of the even-numbered bit data and odd-numbered bit data of the signal DQ with the logic level determined. The latch circuit 52 includes an output terminal corresponding to the even-numbered bit data of the signal DQ and an output terminal corresponding to the odd-numbered bit data of the signal DQ. The two output terminals of the latch circuit 52 are coupled to two input terminals of the corresponding shift register 53, respectively. More specifically, the latch circuits 52_0 to 52_7 are coupled to the shift registers 53_0 to 53_7, respectively.

The shift register 53 is a circuit that temporarily stores the output signal of the corresponding latch circuit 52. For example, the shift register 53 includes a plurality of flip-flop circuits corresponding to the even-numbered bit data of the signal DQ, and a plurality of flip-flop circuits corresponding to the odd-numbered bit data of the signal DQ. The shift register 53 can output the signal DQ while converting the degree of parallelism of the signal DQ from 2-parallel data of the even-numbered bit data and the odd-numbered bit data. For example, the shift register 53 may output serial data in which the even-numbered bit data and the odd-numbered bit data are alternately arranged, or may output 8-parallel parallel data composed of 4-parallel even-numbered bit data and 4-parallel odd-numbered bit data. If the signal DQ is data, the shift register 53 transmits the signal DQ to the data register 32. If the signal DQ is an address, the shift register 53 transmits the signal DQ to the address register 23. If the signal DQ is a command, the shift register 53 transmits the signal DQ to the command register 24.

1.1.6 Configurations of DFE Circuit and Latch Circuit

Figure 5:
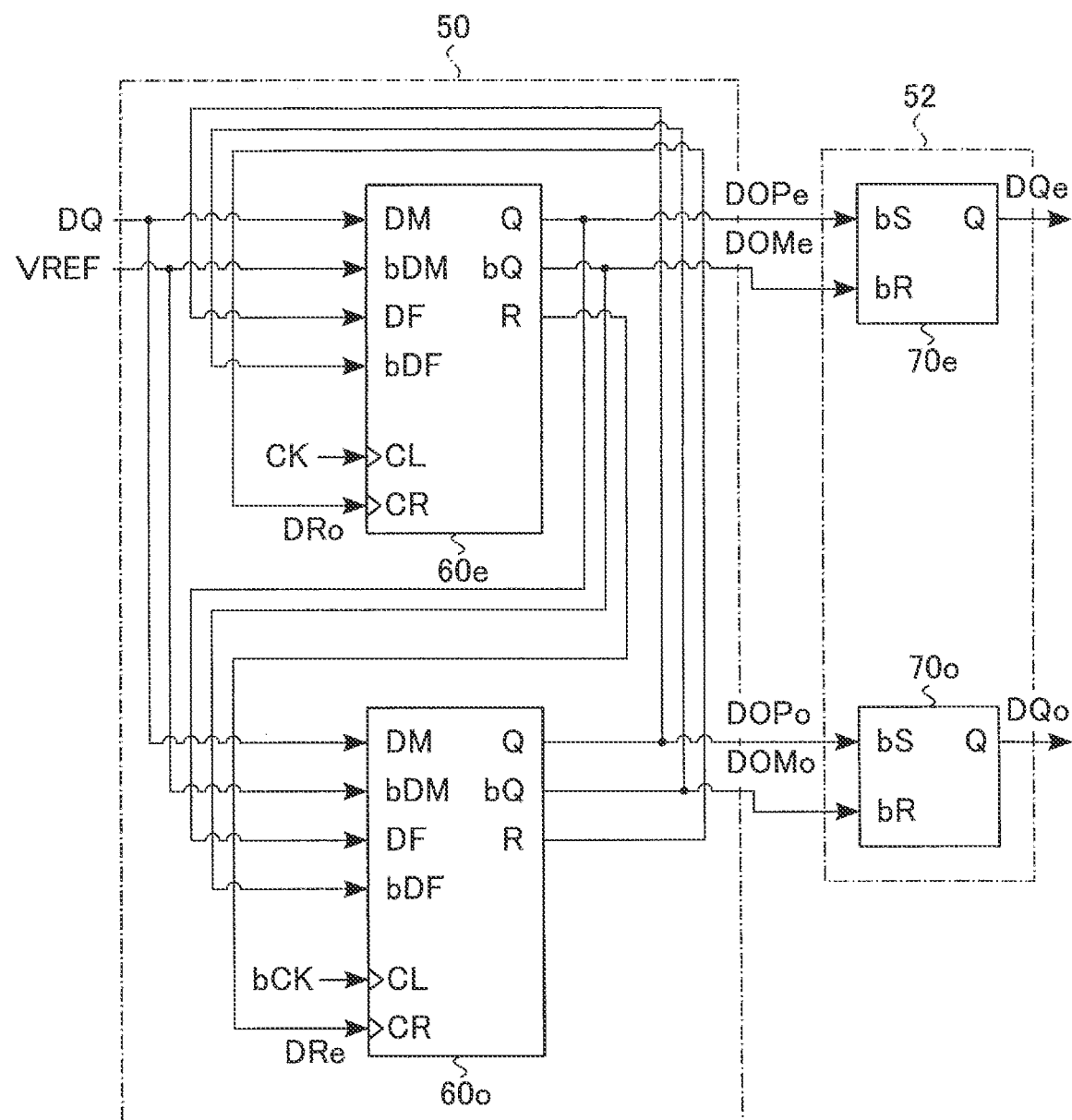
FIG. 5 shows block diagrams of a DFE circuit 50 and a latch circuit 52 included in the semiconductor memory device according to the first embodiment.

Next, an example of the configurations of the DFE circuit 50 and the latch circuit 52 will be described with reference to FIG. 5. FIG. 5 shows a block diagram of the DFE circuit 50 and a block diagram of the latch circuit 52.

As shown in FIG. 5, the DFE circuit 50 includes two amplifiers 60e and 60o. The amplifiers 60e and 60o have the same configuration. The DFE circuit 50 supports 2 time-interleave (2TI) that divides the reception path into two phases. For example, the amplifier 60e corresponds to the reception path for even-numbered bit data of the signal DQ. The amplifier 60o corresponds to the reception path for odd-numbered bit data of the signal DQ. In the following description, if the description is not limited to either of the amplifiers 60e and 60o, they are referred to as the amplifiers 60.

The amplifier 60 is a latch-type voltage sense amplifier (LT-SA) circuit including data input terminals DM and bDM, feedback input terminals DF and bDF, a latch control clock input terminal CL, a reset control clock input terminal CR, data output terminals Q and bQ, and a latch completion output terminal R. The LT-SA circuit is a differential amplifier including a latch circuit that stores output data.

The signal DQ is input to the terminal DM. The voltage VREF is input to the terminal bDM.

To the terminals DF and bDF of one amplifier 60, the output signals of the other amplifier 60 are input (fed back). For example, if one amplifier 60 is the amplifier 60e, the other amplifier 60 is the amplifier 60o. If one amplifier 60 is the amplifier 60o, the other amplifier 60 is the amplifier 60e. More specifically, for example, if the amplifier 60e receives the kth (k is an arbitrary even number) bit data of the signal DQ, output signals DOPo and DOMo corresponding to the (k−1)th bit data of the signal DQ received by the amplifier 60o at the immediately preceding timing are fed back to the terminals DF and bDF of the amplifier 60e, respectively. The terminals DF and bDF of one amplifier 60 are coupled to the terminals Q and bQ of the other amplifier 60, respectively. More specifically, the signal DOPo is input from the terminal Q of the amplifier 60o to the terminal DF of the amplifier 60e. The signal DOMo is input from the terminal bQ of the amplifier 60o to the terminal bDF of the amplifier 60e. A signal DOPe is input from the terminal Q of the amplifier 60e to the terminal DF of the amplifier 60o. A signal DOMe is input from the terminal bQ of the amplifier 60e to the terminal bDF of the amplifier 60o.

The signal CK is input to the terminal CL of the amplifier 60e. The signal bCK is input to the terminal CL of the amplifier 60o.

To the terminal CR of one amplifier 60, a reset control clock signal output from the terminal R of the other amplifier 60 is input. The reset control clock signal is a signal that notifies the state (latch state or reset state) of the latch circuit in the amplifier 60. The amplifier 60 sets the latch circuit in the reset state based on the reset control clock signal. In other words, after the logic level of the signal DQ is determined in the latch circuit of the other amplifier 60, the latch circuit of one amplifier 60 is set in the reset state. The terminal CR of one amplifier 60 is coupled to the terminal R of the other amplifier 60. More specifically, the terminal CR of the amplifier 60e is coupled to the terminal R of the amplifier 60o. The terminal CR of the amplifier 60o is coupled to the terminal R of the amplifier 60e. Hereinafter, the reset control clock signal of the amplifier 60o to be input to the terminal CR of the amplifier 60e is referred to as a signal DRo. The reset control clock signal of the amplifier 60e to be input to the terminal CR of the amplifier 60o is referred to as a signal DRe.

The amplifier 60 outputs inverted signals of the signal DQ from the terminals Q and bQ. More specifically, if even-numbered bit data in "H" level is input to the terminal DM of the amplifier 60e, the amplifier 60e outputs the signal DOPe in "L" level from the terminal Q, and outputs the signal DOMe in "H" level from the terminal bQ. If even-numbered bit data in "L" level is input to the terminal DM of the amplifier 60e, the amplifier 60e outputs the signal DOPe in "H" level from the terminal Q, and outputs the signal DOMe in "L" level from the terminal bQ. Similarly, if odd-numbered bit data in "H" level is input to the terminal DM of the amplifier 60o, the amplifier 60o outputs the signal DOPo in "L" level from the terminal Q, and outputs the signal DOMo in "H" level from the terminal bQ. If odd-numbered bit data in "L" level is input to the terminal DM of the amplifier 60o, the amplifier 60o outputs the signal DOPo in "H" level from the terminal Q, and outputs the signal DOMo in "L" level from the terminal bQ.

The amplifier 60 outputs the reset control clock signal from the terminal R. If the latch circuit is in the reset state, the amplifier 60 outputs the reset completion signal in "H" level. If the latch circuit is in the latch state, the amplifier 60 outputs the reset completion signal in "L" level. More specifically, for example, in the amplifier 60e, if the logic level of the signal DOPe and the logic level of the signal DOMe are the same, that is, if the latch circuit is in the reset state, the reset control clock signal is set in "H" level. On the other hand, if the logic level of the signal DOPe is different from the logic level of the signal DOMe, that is, if the latch circuit is in the latch state, the reset control clock signal is set in "L" level. Similarly, in the amplifier 60o, if the logic level of the signal DOPo and the logic level of the signal DOMo are the same, the reset control clock signal is set in "H" level. On the other hand, if the logic level of the signal DOPo is different from the logic level of the signal DOMo, the reset control clock signal is set in "L" level.

Next, the latch circuit 52 will be described. The latch circuit 52 includes two bSR latch circuits 70e and 70o. The bSR latch circuits 70e and 70o have the same configuration. In the following description, if the description is not limited to either of the bSR latch circuits 70e and 70o, they are referred to as bSR latch circuits 70.

The bSR latch circuit 70e temporarily stores the output signal of the amplifier 60e. The bSR latch circuit 70o temporarily stores the output signal of the amplifier 60o.

The bSR latch circuit 70 includes a signal input terminal bS, a reset signal input terminal bR, and the output terminal Q. Note that the bSR latch circuit 70 may include the inverting output terminal bQ.

If a signal in "L" level is input to the terminal bS and a signal in "H" level is input to the terminal bR, the bSR latch circuit 70 outputs a signal in "H" level from the terminal Q. If a signal in "H" level is input to the terminal bS and a signal in "L" level is input to the terminal bR, the bSR latch circuit 70 outputs a signal in "L" level from the terminal Q. During a period in which the signals in "H" level are input to the terminals bS and bR, the bSR latch circuit 70 maintains the previous output state.

The signal DOPe of the amplifier 60e is input to the terminal bS of the bSR latch circuit 70e. The signal DOMe of the amplifier 60e is input to the terminal bR of the bSR latch circuit 70e. The bSR latch circuit 70e outputs, from the terminal Q, a signal DQe which is the even-numbered bit data of the signal DQ.

The signal DOPo of the amplifier 60o is input to the terminal bS of the bSR latch circuit 70o. The signal DOMo of the amplifier 60o is input to the terminal bR of the bSR latch circuit 70o. The bSR latch circuit 70o outputs, from the terminal Q, a signal DQo which is the odd-numbered bit data of the signal DQ.

1.1.7 Circuit Diagram of DFE Circuit

Figure 7:
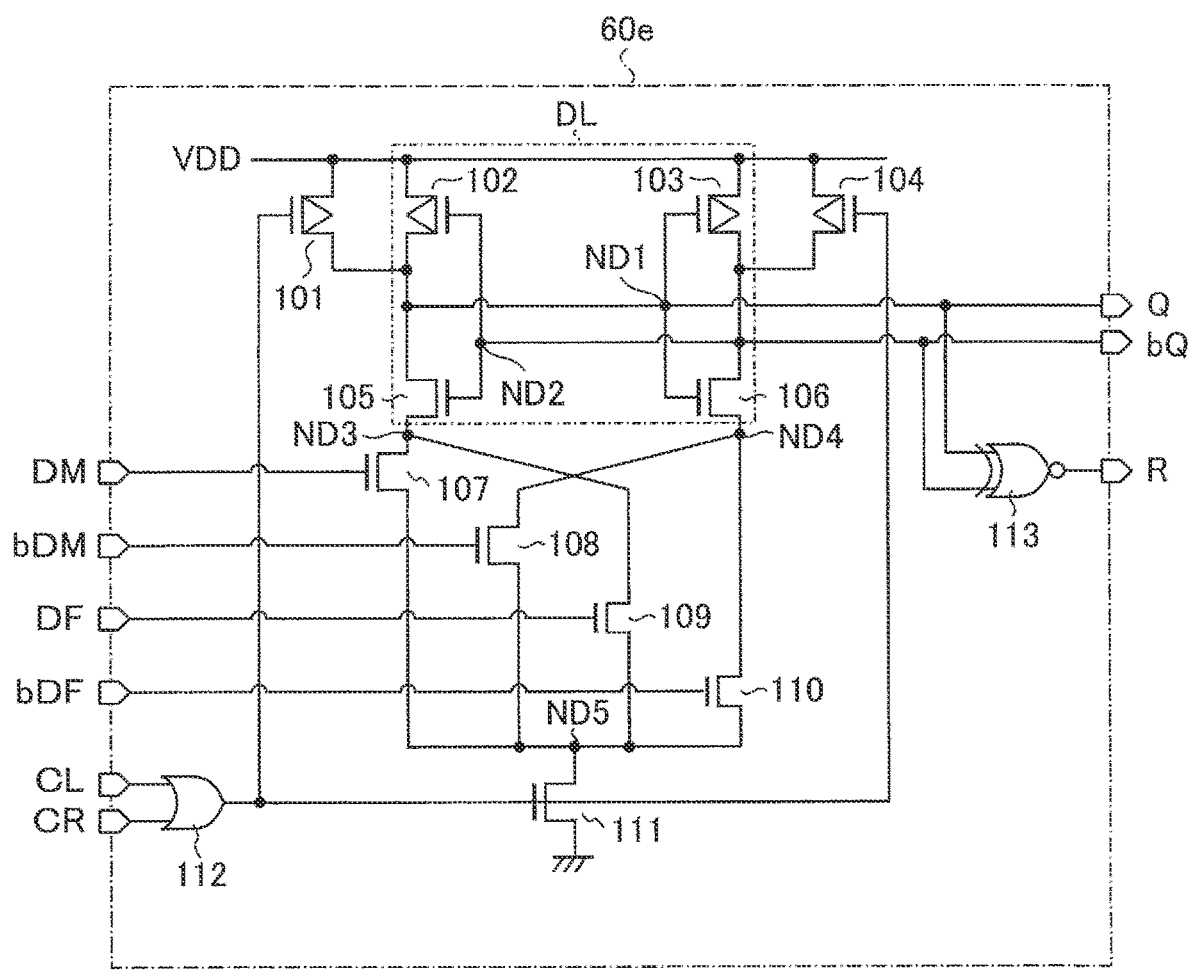
FIG. 7 is a circuit diagram of an amplifier 60e included in the semiconductor memory device according to the first embodiment.

Next, an example of a circuit diagram of the DFE circuit 50 will be described with reference to FIGS. 6 and 7. FIG. 6 is a circuit diagram of the DFE circuit 50. FIG. 7 is a circuit diagram of the amplifier 60e.

As shown in FIG. 6, the amplifiers 60e and 60o have the same circuit configuration. A description will be provided below by paying attention to the amplifier 60e. Note that in the following description, one of the source and drain of a transistor is referred to as one end of the transistor. The other one of the source and drain of the transistor is referred to as the other end of the transistor.

As shown in FIG. 7, the amplifier 60e includes p-channel metal oxide semiconductor field effect transistors (MOSFETs) (to be also referred to as "PMOS transistors" or "transistors" hereinafter) 101 to 104, n-channel MOSFETs (to be also referred to as "NMOS transistors" or "transistors"

hereinafter) 105 to 111, an OR operation circuit (OR circuit) 112, and an exclusive NOR operation circuit (XNOR circuit) 113.

A power supply voltage VDD is applied to one end of the transistor 101. In other words, one end of the transistor 101 is coupled to a power supply voltage line. The other end of the transistor 101 is coupled to a node ND1. The gate of the transistor 101 is coupled to the output terminal of the OR circuit 112.

The power supply voltage VDD is applied to one end of the transistor 102. The other end of the transistor 102 is coupled to the node ND1. The gate of the transistor 102 is coupled to a node ND2.

The power supply voltage VDD is applied to one end of the transistor 103. The other end of the transistor 103 is coupled to the node ND2. The gate of the transistor 103 is coupled to the node ND1.

The power supply voltage VDD is applied to one end of the transistor 104. The other end of the transistor 104 is coupled to the node ND2. The gate of the transistor 104 is coupled to the output terminal of the OR circuit 112.

One end of the transistor 105 is coupled to the node ND1. The other end of the transistor 105 is coupled to a node ND3. The gate of the transistor 105 is coupled to the node ND2.

One end of the transistor 106 is coupled to the node ND2. The other end of the transistor 106 is coupled to a node ND4. The gate of the transistor 106 is coupled to the node ND1.

The transistors 102, 103, 105, and 106 form a latch circuit DL. More specifically, the transistors 102 and 105 form the first inverter. The transistors 103 and 106 form the second inverter. An output of the first inverter and an input of the second inverter (node ND1) are coupled to the terminal Q. An input of the first inverter and an output of the second inverter (node ND2) are coupled to the terminal bQ.

The transistors 101 and 104 function as a reset circuit of the latch circuit DL. For example, if the output signal of the OR circuit 112 is set in "L" level, the transistors 101 and 104 are set in the ON state. With this, the nodes ND1 and ND2 are charged to "H" level. That is, the latch circuit DL is set in the reset state.

One end of the transistor 107 is coupled to the node ND3. The other end of the transistor 107 is coupled to a node ND5. The gate of the transistor 107 is coupled to the terminal DM.

One end of the transistor 108 is coupled to the node ND4. The other end of the transistor 108 is coupled to the node ND5. The gate of the transistor 108 is coupled to the terminal bDM.

One end of the transistor 109 is coupled to the node ND3. The other end of the transistor 109 is coupled to the node ND5. The gate of the transistor 109 is coupled to the terminal DF.

The transistor 109 is coupled in parallel with the transistor 107. The drive capacity of the transistor 109 is lower than the drive capacity of the transistor 107. For example, if the transistors 107 and 109 are in the ON state, the current flowing through the transistor 109 is less than the current flowing through the transistor 107. For example, the transistor 107 has a structure in which a plurality of (for example, ten) transistors each having the same size as the transistor 109 are coupled in parallel.

One end of the transistor 110 is coupled to the node ND4. The other end of the transistor 110 is coupled to the node ND5. The gate of the transistor 110 is coupled to the terminal bDF.

The transistor 110 is coupled in parallel with the transistor 108. The drive capacity of the transistor 110 is lower than the drive capacity of the transistor 108. For example, if the transistors 108 and 110 are in the ON state, the current flowing through the transistor 110 is less than the current flowing through the transistor 108. For example, the transistor 108 has a structure in which a plurality of (for example, ten) transistors each having the same size as the transistor 110 are coupled in parallel.

The transistors 109 and 110 play a role of feeding back, to an input signal of one amplifier 60, an output signal of the other amplifier 60. Operations of the transistors 109 and 110 produce an effect similar to the effect produced in a case where the voltage value of the voltage VREF fluctuates with respect to the voltage value of the signal DQ. For example, the state in which the transistor 109 is in the ON state and the transistor 110 is in the OFF state is similar to the state in which the voltage value of the voltage VREF relatively drops with respect to the voltage value of the signal DQ. On the other hand, the state in which the transistor 109 is in the OFF state and the transistor 110 is in the ON state is similar to the state in which the voltage value of the voltage VREF relatively rises with respect to the voltage value of the signal DQ.

More specifically, for example, if the bit data of the signal DQ received by the amplifier 60o at the immediately preceding timing is in "L" level, the amplifier 60o outputs the signal DOPo in "H" level and the signal DOMo in "L" level. Accordingly, the signal DOPo in "H" level is input to the terminal DF of the amplifier 60e, and the signal DOMo in "L" level is input to the terminal bDF. In this case, the transistor 109 is set in the ON state, and the transistor 110 is set in the OFF state. In this state, for example, if the bit data of the signal DQ in "H" level is input to the terminal DM, the transistors 107 and 109 are set in the ON state. This state is similar to the state in which the voltage value in "H" level of the signal DQ rises so that the transistor 107 is set in a stronger ON state. Therefore, this produces the same effect as in a case where the voltage value of the voltage VREF drops with respect to the voltage value of the signal DQ. Such the state is described as "the voltage VREF drops" hereinafter.

Further, for example, if the bit data of the signal DQ received by the amplifier 60o at the immediately preceding timing is in "H" level, the amplifier 60o outputs the signal DOPo in "L" level and the signal DOMo in "H" level. Accordingly, the signal in "L" level is input to the terminal DF of the amplifier 60e, and the signal in "H" level is input to the terminal bDF. In this case, the transistor 109 is set in the OFF state, and the transistor 110 is set in the ON state. In this state, for example, if the bit data of the signal DQ in "L" level is input to the terminal DM, the transistors 108 and 110 are set in the ON state. This state is similar to the state in which the voltage value of the voltage VREF rises so that the transistor 108 is set in a relatively strong ON state. Therefore, this produces the same effect as in a case where the voltage value of the voltage VREF rises with respect to the voltage value of the signal DQ. Such the state is described as "the voltage VREF rises" hereinafter.

That is, if the bit data of the immediately preceding signal DQ is in "L" level, the voltage VREF drops in the amplifier 60 due to feedback. If the bit data of the immediately preceding signal DQ is in "H" level, the voltage VREF rises in the amplifier 60 due to feedback.

One end of the transistor 111 is coupled to the node ND5. The other end of the transistor 111 is grounded. In other words, the other end of the transistor 111 is coupled to a ground voltage line. The gate of the transistor 111 is coupled to the output terminal of the OR circuit 112.

Two input terminals of the OR circuit 112 are coupled to the terminal CL and the terminal CR, respectively. If at least one of the clock signal input from the terminal CL and the reset control clock signal input from the terminal CR is in "H" level, the OR circuit 112 outputs a signal in "H" level.

Two input terminals of the XNOR circuit 113 are coupled to the node ND1 (terminal Q) and the node ND2 (terminal bQ), respectively. If one of the node ND1 and the node ND2 is in "H" level and the other is in "L" level, the XNOR circuit 113 outputs a completion signal in "L" level. In other words, if the logic level of the taken-in signal DQ has been determined in the latch circuit DL, the XNOR circuit 113 outputs a reset control clock signal in "L" level. More specifically, if one of the signals DOPe and DOMe is in "L" level and the other is in "H" level, the XNOR circuit 113 of the amplifier 60e outputs the signal DRe in "L" level. Similarly, if one of the signals DOPo and DOMo is in "L" level and the other is in "H" level, the XNOR circuit 113 of the amplifier 60o outputs the signal DRo in "L" level.

The operation of the amplifier 60e will be described briefly. While the OR circuit 112 outputs the signal in "L" level, the latch circuit DL of the amplifier 60e is set in the reset state. More specifically, if the signal CK input from the terminal CL and the signal DRo input from the terminal CR are in "L" level, the OR circuit 112 outputs a signal in "L" level. In this case, the transistors 101 and 104 are set in the ON state, and the transistor 111 is set in the OFF state. With this, a voltage in "H" level is applied to the nodes ND1 and ND2. Accordingly, the amplifier 60e outputs the signals DOPe and DOMe in "H" level. At the timing at which the output signal of the OR circuit 112 rises from "L" level to "H" level, the amplifier 60e stores, in the latch circuit DL, the result of taking in the even-numbered bit data of the signal DQ from the terminal DM. At this time, the output signals DOPo and DOMo of the amplifier 60o are input to the terminals DF and bDF, respectively. Based on the result stored in the latch circuit DL, the logic levels of the signals DOPe and DOMe are determined. While one of the signals DOPe and DOMe is in "H" level and the other is in "L" level, the XNOR circuit 113 outputs a signal in "L" level. Then, at the timing at which the output signal from the OR circuit 112 falls from "H" level to "L" level, the amplifier 60e is set in the reset state. More specifically, once the logic level of the odd-numbered bit data of the signal DQ at the next timing is determined in the amplifier 60o, the signal DRo is set in "L" level. At this time, since the signal CK is in "L" level, the amplifier 60e is set in the reset state based on the signal DRo.

1.2 Operation Example of DFE Circuit

Figure 8:
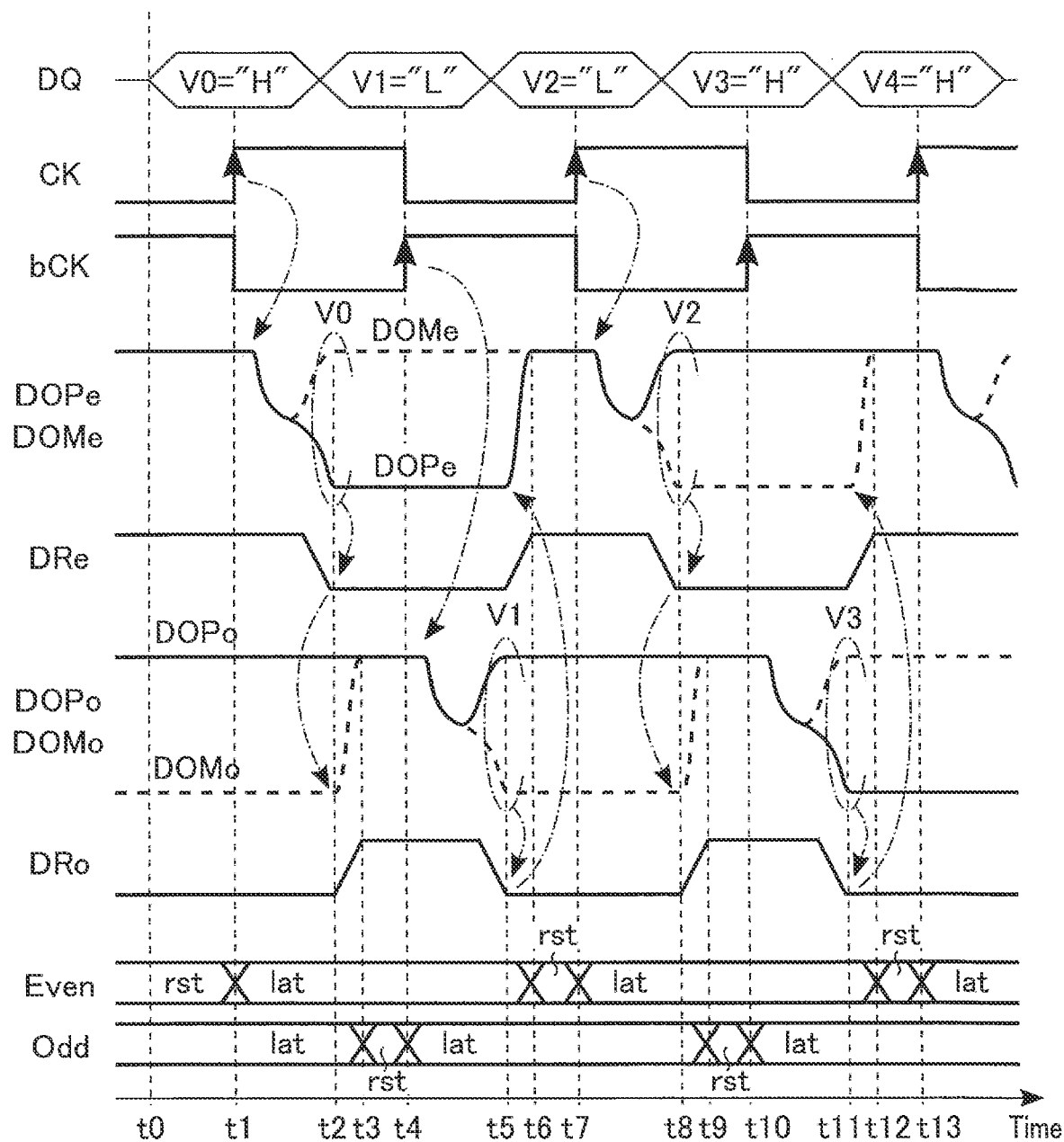
FIG. 8 is a timing chart of various signals in the DFE circuit 50 included in the semiconductor memory device according to the first embodiment.

Next, an example of the operation of the DFE circuit 50 will be described with reference to FIGS. 8, 9, 10, 11, 12, 13, 14, 15, 16, 17, 18, 19, 20, 21, and 22. FIG. 8 is a timing chart of various signals in the DFE circuit 50. FIGS. 9, 10, 11, 12, 13, 14, 15, 16, 17, 18, 19, 20, 21, and 22 are state diagrams of the DFE circuit 50 at respective times in the timing chart shown in FIG. 8. In this example, a case where the input signal DQ is data will be described. Note that in the following description, a description will be provided by paying attention to the parts where the states of the signals and the transistors change at the respective times in the timing chart.

<Time t0>

As shown in FIG. 8, at time t0 before the signal DQ is input, the signal CK is set in "L" level and the signal bCK is set in "H" level. The amplifier 60e outputs the signals DOPe and DOMe in "H" level. Accordingly, the signal DRe is set in "H" level. For example, the amplifier 60o outputs the signal DOPo in "H" level and the signal DOMo in "L" level. Accordingly, the signal DRo is set in "L" level.

The signal CK in "L" level and the signal DRo in "L" level are input to the amplifier 60e. Accordingly, the latch circuit DL (reference sign "Even" shown in FIG. 8) of the amplifier 60e is set in the reset state (reference sign "rst" shown in FIG. 8). Further, the signal bCK in "H" level and the signal DRe in "H" are input to the amplifier 60o. Accordingly, the latch circuit DL (reference sign "Odd" shown in FIG. 8) of the amplifier 60o is set in the latch state (reference sign "lat" shown in FIG. 8).

Figure 9:
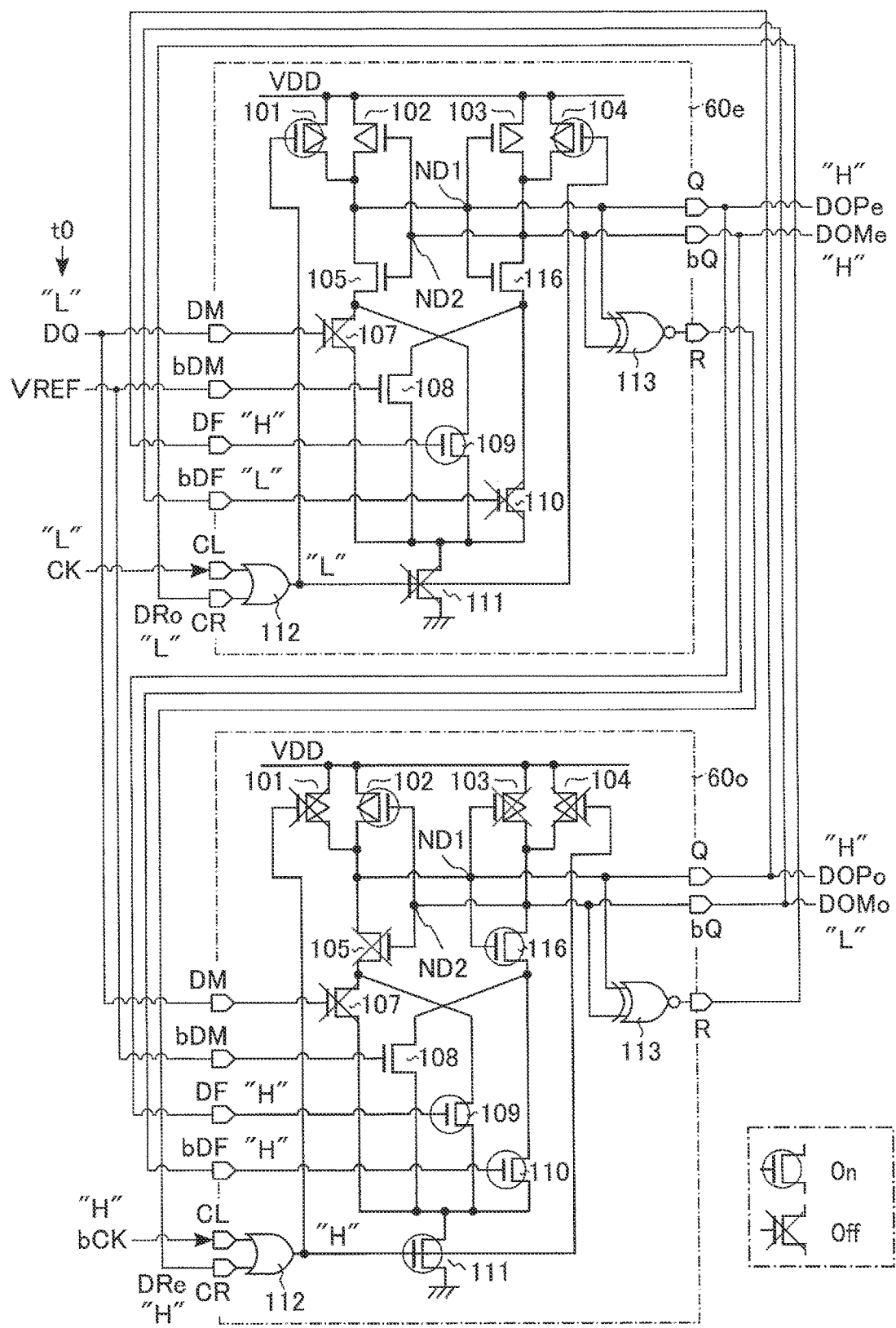
FIG. 9 is a state diagram of the DFE circuit 50 at time t0 in the timing chart shown in FIG. 8.

As shown in FIG. 9, since the signal DQ is in "L" level, the transistors 107 of the amplifiers 60e and 60o are set in the OFF state. The transistors 108 of the amplifiers 60e and 60o are set in a relatively weak ON state clamped by the voltage VREF.

The signal DOPo in "H" level is input to the terminal DF of the amplifier 60e. Accordingly, the transistor 109 is set in the ON state. The signal DOMo in "L" level is input to the terminal bDF of the amplifier 60e. Accordingly, the transistor 110 is set in the OFF state. Hence, in the amplifier 60e, the voltage VREF drops. The signals CK and DRo in "L" level are input to the OR circuit 112 of the amplifier 60e. Accordingly, the OR circuit 112 outputs a signal in "L" level. The transistors 101 and 104 of the amplifier 60e are set in the ON state, and the transistor 111 is set in the OFF state. With this, the latch circuit DL is set in the reset state. The amplifier 60e outputs the signals DOPe and DOMe in "H" level.

The signal DOPe in "H" level is input to the terminal DF of the amplifier 60o. Accordingly, the transistor 109 is set in the ON state. The signal DOMe in "H" level is input to the terminal bDF of the amplifier 60o. Accordingly, the transistor 110 is set in the ON state. The signals bCK and DRe in "H" level are input to the OR circuit 112 of the amplifier 60o. Accordingly, the OR circuit 112 outputs a signal in "H" level. The transistors 101 and 104 of the amplifier 60o are set in the OFF state, and the transistor 111 is set in the ON state. With this, the latch circuit DL is set in the latch state. Since the signal DQ is in "L" level, the amplifier 60o outputs the signal DOPo in "H" level and the signal DOMo in "L" level.

<Time t1>

As shown in FIG. 8, for example, assume that even-numbered bit data V0 of the signal DQ is in "H" level. At time t1, the signal CK rises from "L" level to "H" level, and the signal bCK falls from "H" level to "L" level. Based on the rising of the signal CK, the latch circuit DL of the amplifier 60e is set in the latch state ("lat"), and takes in the even-numbered bit data V0 in "H" level. Based on the even-numbered bit data V0, the signals DOPe and DOMe start to transition.

Figure 10:
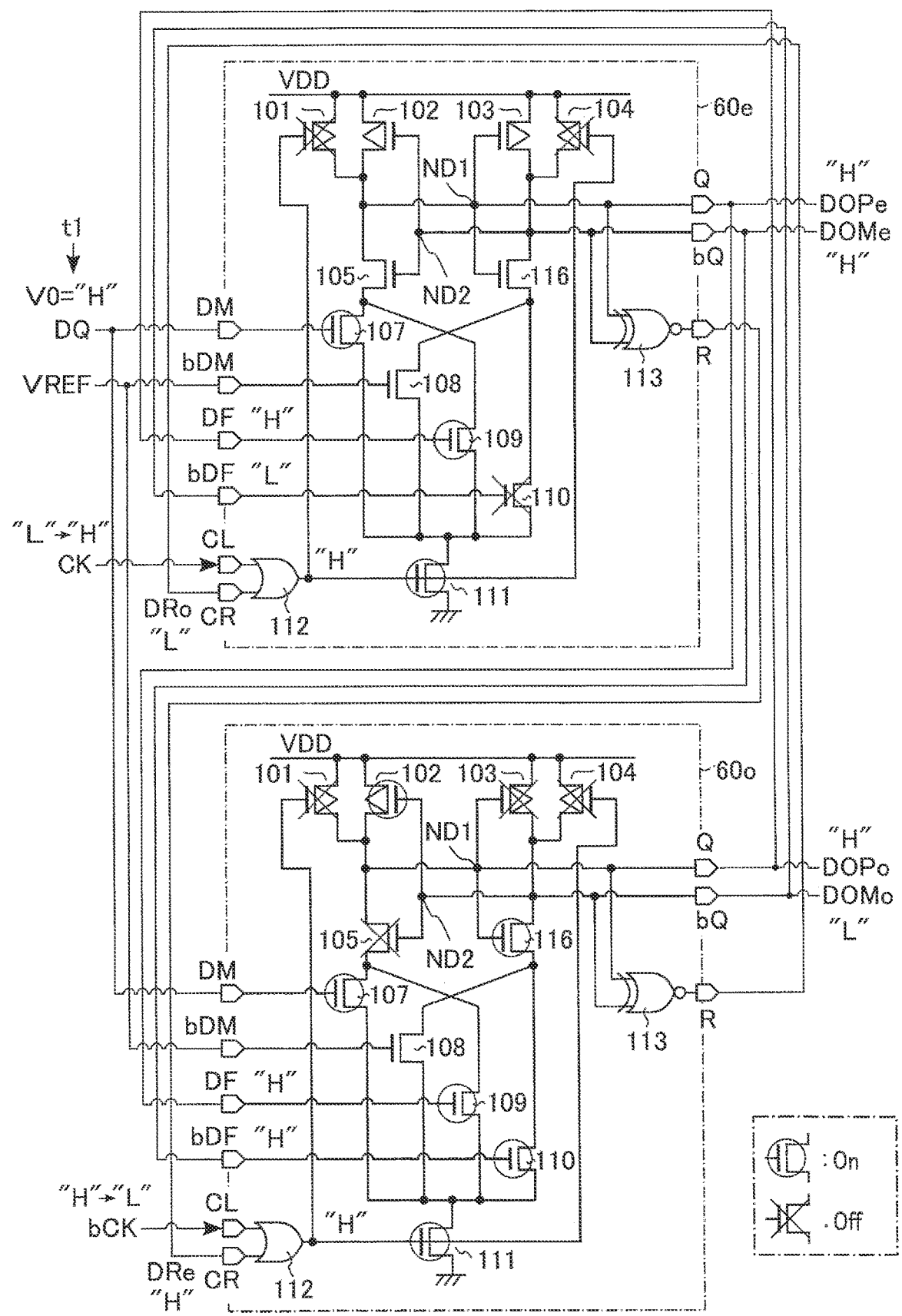
FIG. 10 is a state diagram of the DFE circuit 50 at time t1 in the timing chart shown in FIG. 8.

As shown in FIG. 10, since the even-numbered bit data V0 of the signal DQ is in "H" level, the transistors 107 of the amplifiers 60e and 60o are set in the ON state.

The signal CK in "H" level is input to the OR circuit 112 of the amplifier 60e. Accordingly, the OR circuit 112 outputs a signal in "H" level. The transistors 101 and 104 of the amplifier 60e are set in the OFF state, and the transistor 111 is set in the ON state. With this, the latch circuit DL of the amplifier 60e is set in the latch state. The amplifier 60e takes in the even-numbered bit data V0.

The signal bCK in "L" level is input to the OR circuit 112 of the amplifier 60o. Since the signal DRe is in "H" level, the OR circuit 112 continues to output the signal in "H" level.

<Time t2>

As shown in FIG. 8, for example, assume that odd-numbered bit data V1 of the signal DQ is in "L" level. At time t2, the logic levels of the signals DOPe and DOMe of the amplifier 60e are determined. In other words, the logic level of the even-numbered bit data V0 is determined. Since the even-numbered bit data V0 is in "H" level, the signal DOPe is set in "L" level, and the signal DOMe is set in "H" level. Accordingly, the signal DRe is set in "L" level. Since the signals DRe and bCK are in "L" level, the reset operation of the latch circuit DL is started in the amplifier 60o.

Figure 11:
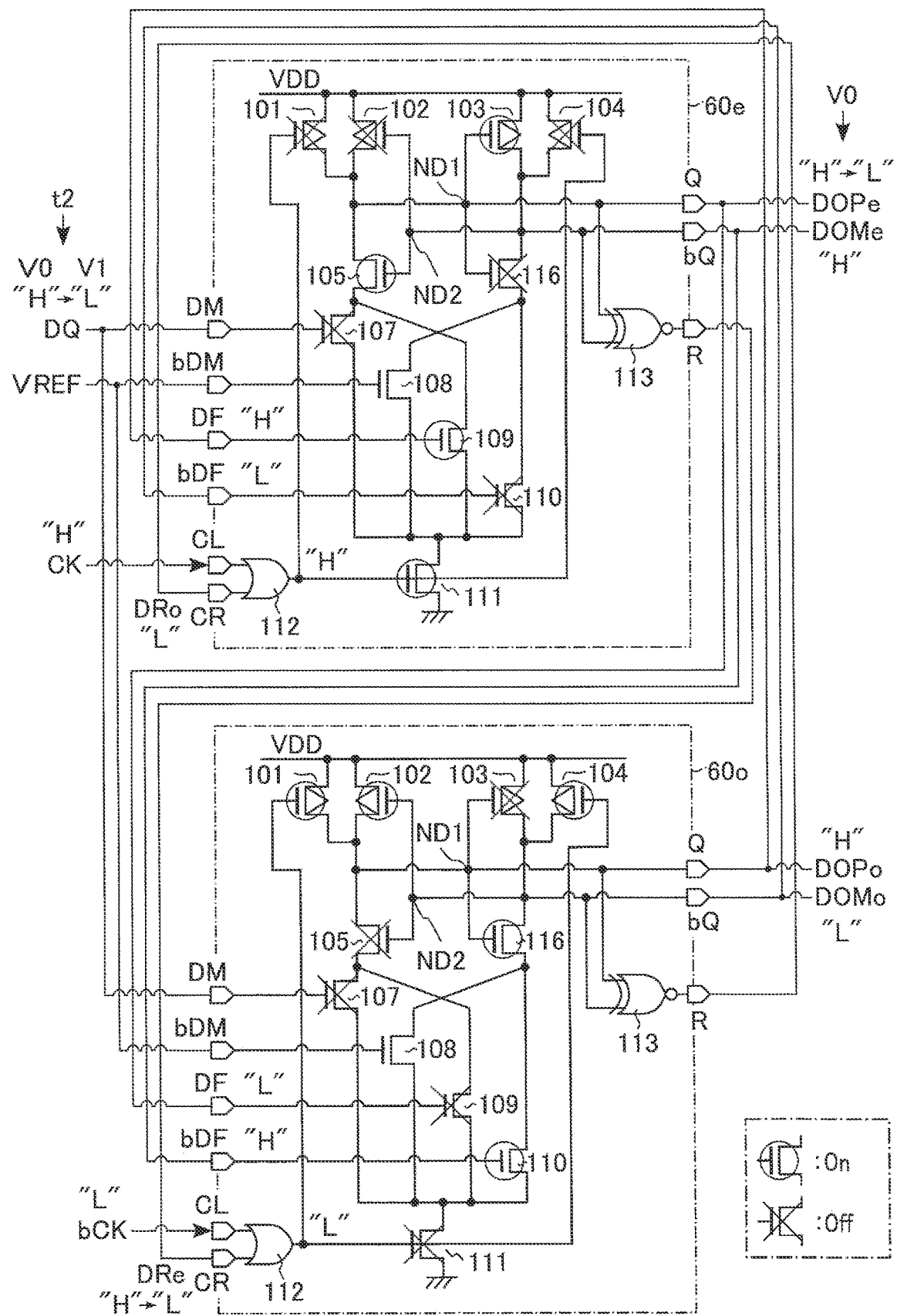
FIG. 11 is a state diagram of the DFE circuit 50 at time t2 in the timing chart shown in FIG. 8.

As shown in FIG. 11, since the odd-numbered bit data V1 of the signal DQ is in "L" level, the transistors 107 of the amplifiers 60e and 60o are set in the OFF state.

In the amplifier 60e, as a result of taking in the even-numbered bit data V0 in "H" level, the voltage of the node ND1 drops faster than the voltage of the node ND2. Accordingly, in the latch circuit DL, the node ND1 is set in "L" level, and the node ND2 is set in "H" level. Therefore, the signal DOPe is set in "L" level. On the other hand, the signal DOMe is maintained in "H" level. Therefore, the amplifier 60e outputs the signal DRe in "L" level from the terminal R.

The result of taking in the even-numbered bit data V0 by the amplifier 60e is fed back to the amplifier 60o. More specifically, the signal DOPe in "L" level is input to the terminal DF of the amplifier 60o. Accordingly, the transistor 109 is set in the OFF state. The signal DOMe in "H" level is input to the terminal bDF of the amplifier 60o. Accordingly, the transistor 110 is set in the ON state. Hence, in the amplifier 60o, the voltage VREF rises. Further, in the amplifier 60o, since the signal DRe in "L" level is input, the OR circuit 112 outputs a signal in "L" level. Accordingly, the transistors 101 and 104 of the amplifier 60o are set in the ON state, and the transistor 111 is set in the OFF state. With this, the amplifier 60o starts the reset operation of the latch circuit DL. That is, a voltage in "H" level is applied to the node ND1 and the node ND2. However, at time t2, since the reset operation of the latch circuit DL is incomplete, the signal DOPo is maintained in "H" level, and the signal DOMo is maintained in "L" level. Therefore, the signal DRo is maintained in "L" level.

<Time t3>

As shown in FIG. 8, at time t3, the reset operation of the latch circuit DL is complete in the amplifier 60o, and the latch circuit DL is set in the reset state ("rst"). Therefore, the signals DOPo and DOMo are set in "H" level. Accordingly, the signal DRo is set in "H" level.

As shown in FIG. 12, in the amplifier 60o, the reset operation of the latch circuit DL is complete, and the node ND1 and the node ND2 are charged to "H" level. That is, the signals DOPo and DOMo are set in "H" level. Thus, the amplifier 60o outputs the signal DRo in "H" level from the terminal R.

The signal DOPo in "H" level is input to the terminal DF of the amplifier 60e. Accordingly, the transistor 109 is set in the ON state. The signal DOMo in "H" level is input to the terminal bDF of the amplifier 60e. Accordingly, the transistor 110 is set in the ON state. The signal DRo in "H" level is input to the OR circuit 112 of the amplifier 60e. The OR circuit 112 continues to output the signal in "H" level.

<Time t4>

As shown in FIG. 8, at time t4, the signal CK falls from "H" level to "L" level, and the signal bCK rises from "L" level to "H" level. Based on the rising of the signal bCK, the latch circuit DL of the amplifier 60o is set in the latch state ("lat"), and takes in the odd-numbered bit data V1 in "L" level. Based on the odd-numbered bit data V1, the signals DOPo and DOMo start to transition.

Figure 13:
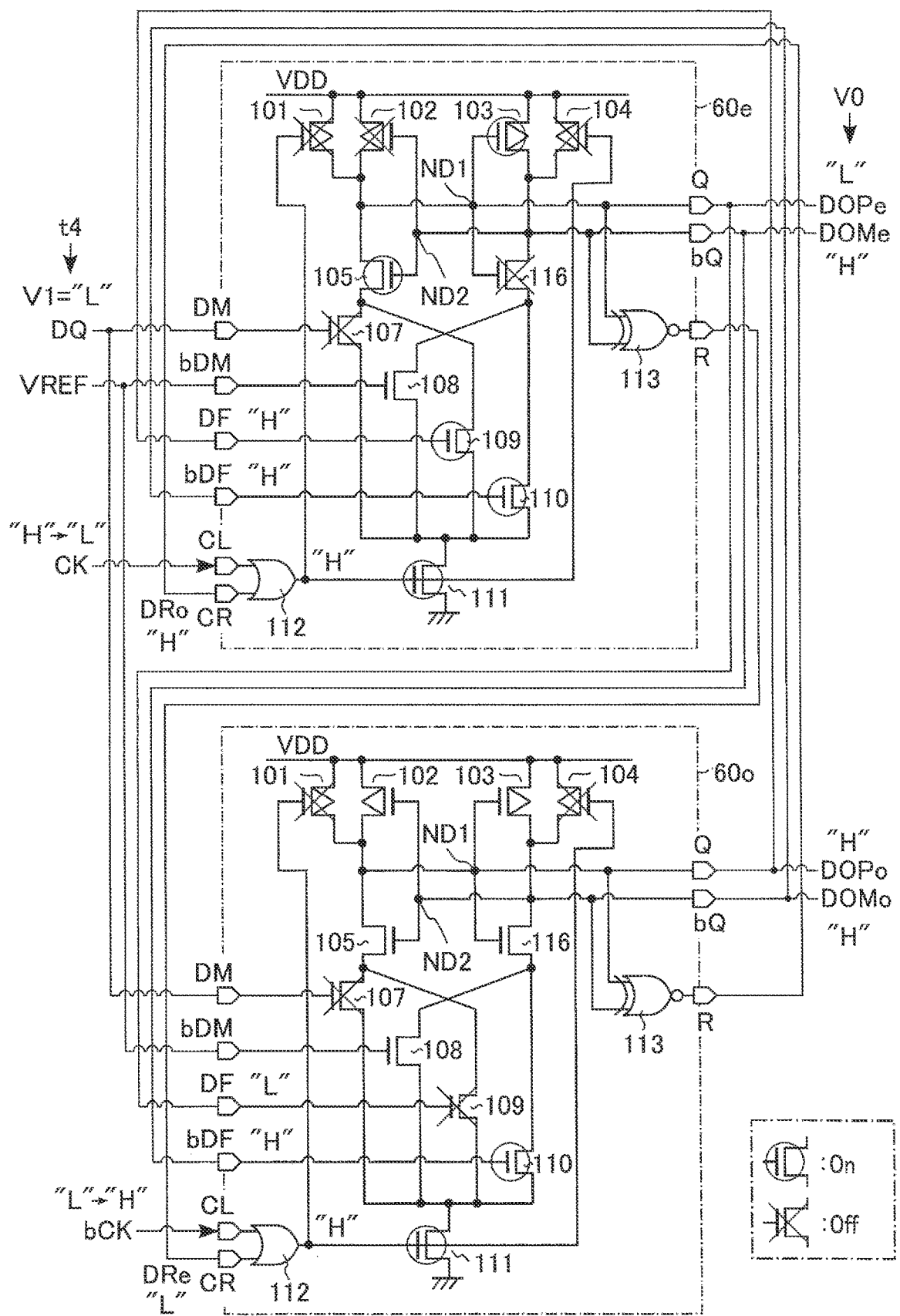
FIG. 13 is a state diagram of the DFE circuit 50 at time t4 in the timing chart shown in FIG. 8.

As shown in FIG. 13, the signal bCK in "H" level is input to the OR circuit 112 of the amplifier 60o. Accordingly, the OR circuit 112 outputs a signal in "H" level. The transistors 101 and 104 of the amplifier 60o are set in the OFF state, and the transistor 111 is set in the ON state. With this, the latch circuit DL of the amplifier 60o is set in the latch state. The amplifier 60o takes in the odd-numbered bit data V1.

The signal CK in "L" level is input to the OR circuit 112 of the amplifier 60e. Since the signal DRo is in "H" level, the OR circuit 112 continues to output the signal in "H" level.

<Time t5>

As shown in FIG. 8, for example, assume that even-numbered bit data V2 of the signal DQ is in "L" level. At time t5, the logic levels of the signals DOPo and DOMo of the amplifier 60o are determined. In other words, the logic level of the odd-numbered bit data V1 is determined. Since the odd-numbered bit data V1 is in "L" level, the signal DOPo is set in "H" level, and the signal DOMo is set in "L" level. Accordingly, the signal DRo is set in "L" level. Since the signals DRo and CK are in "L" level, the reset operation of the latch circuit DL is started in the amplifier 60e.

As shown in FIG. 14, since the even-numbered bit data V2 of the signal DQ is in "L" level, the transistors 107 of the amplifiers 60e and 60o are set in the OFF state.

In the amplifier 60o, as a result of taking in the odd-numbered bit data V1 in "L" level, the voltage of the node ND2 drops faster than the voltage of the node ND1. Accordingly, in the latch circuit DL, the node ND1 is set in "H" level, and the node ND2 is set in "L" level. Therefore, the signal DOPo is maintained in "H" level. On the other hand, the signal DOMo is set in "L" level. Thus, the amplifier 60o outputs the signal DRo in "L" level from the terminal R.

The result of taking in the odd-numbered bit data V1 by the amplifier 60o is fed back to the amplifier 60e. More specifically, the signal DOPo in "H" level is input to the terminal DF of the amplifier 60e. Accordingly, the transistor 109 is set in the ON state. The signal DOMo in "L" level is input to the terminal bDF of the amplifier 60e. Accordingly, the transistor 110 is set in the OFF state. Hence, in the amplifier 60e, the voltage VREF drops. Further, in the amplifier 60e, since the signal DRo in "L" level is input, the OR circuit 112 outputs a signal in "L" level. Accordingly, the transistors 101 and 104 of the amplifier 60e are set in the ON state, and the transistor 111 is set in the OFF state. Thus, the amplifier 60e starts the reset operation of the latch circuit DL. That is, a voltage in "H" level is applied to the node ND1 and the node ND2. However, at time t5, since the reset operation of the latch circuit DL is incomplete, the signal DOPe is maintained in "L" level, and the signal DOMe is maintained in "H" level. Therefore, the signal DRe is maintained in "L" level.

<Time t6>

As shown in FIG. 8, at time t6, the reset operation of the latch circuit DL is complete in the amplifier 60e, and the latch circuit DL is set in the reset state ("rst"). Therefore, the signals DOPe and DOMe are set in "H" level. Accordingly, the signal DRe is set in "H" level.

Figure 15:
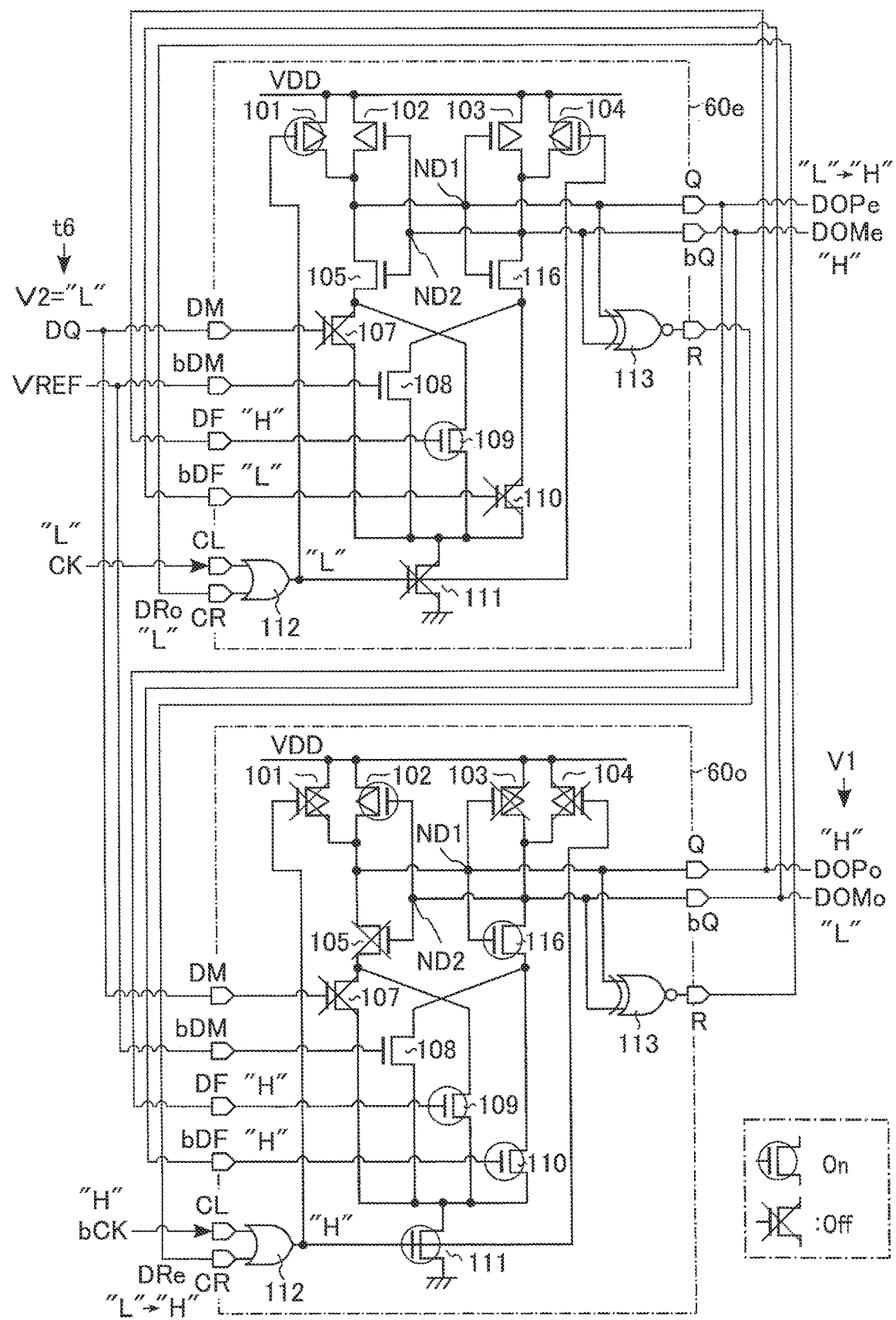
FIG. 15 is a state diagram of the DFE circuit 50 at time t6 in the timing chart shown in FIG. 8.

As shown in FIG. 15, in the amplifier 60e, the reset operation of the latch circuit DL is complete, and the node ND1 and the node ND2 are charged to "H" level. That is, the signals DOPe and DOMe are set in "H" level. Therefore, the amplifier 60e outputs the signal DRe in "H" level from the terminal R.

The signal DOPe in "H" level is input to the terminal DF of the amplifier 60o. Accordingly, the transistor 109 is set in the ON state. The signal DOMe in "H" level is input to the terminal bDF of the amplifier 60o. Accordingly, the transistor 110 is set in the ON state. The signal DRe in "H" level is input to the OR circuit 112 of the amplifier 60*o*. The OR circuit 112 continues to output the signal in "H" level.

<Time t7>

As shown in FIG. 8, at time t7, the signal CK rises from "L" level to "H" level, and the signal bCK falls from "H" level to "L" level. Based on the rising of the signal CK, the latch circuit DL of the amplifier 60*e* is set in the latch state ("lat"), and takes in the even-numbered bit data V2 in "L" level. Based on the even-numbered bit data V2, the signals DOPe and DOMe start to transition.

Figure 16:
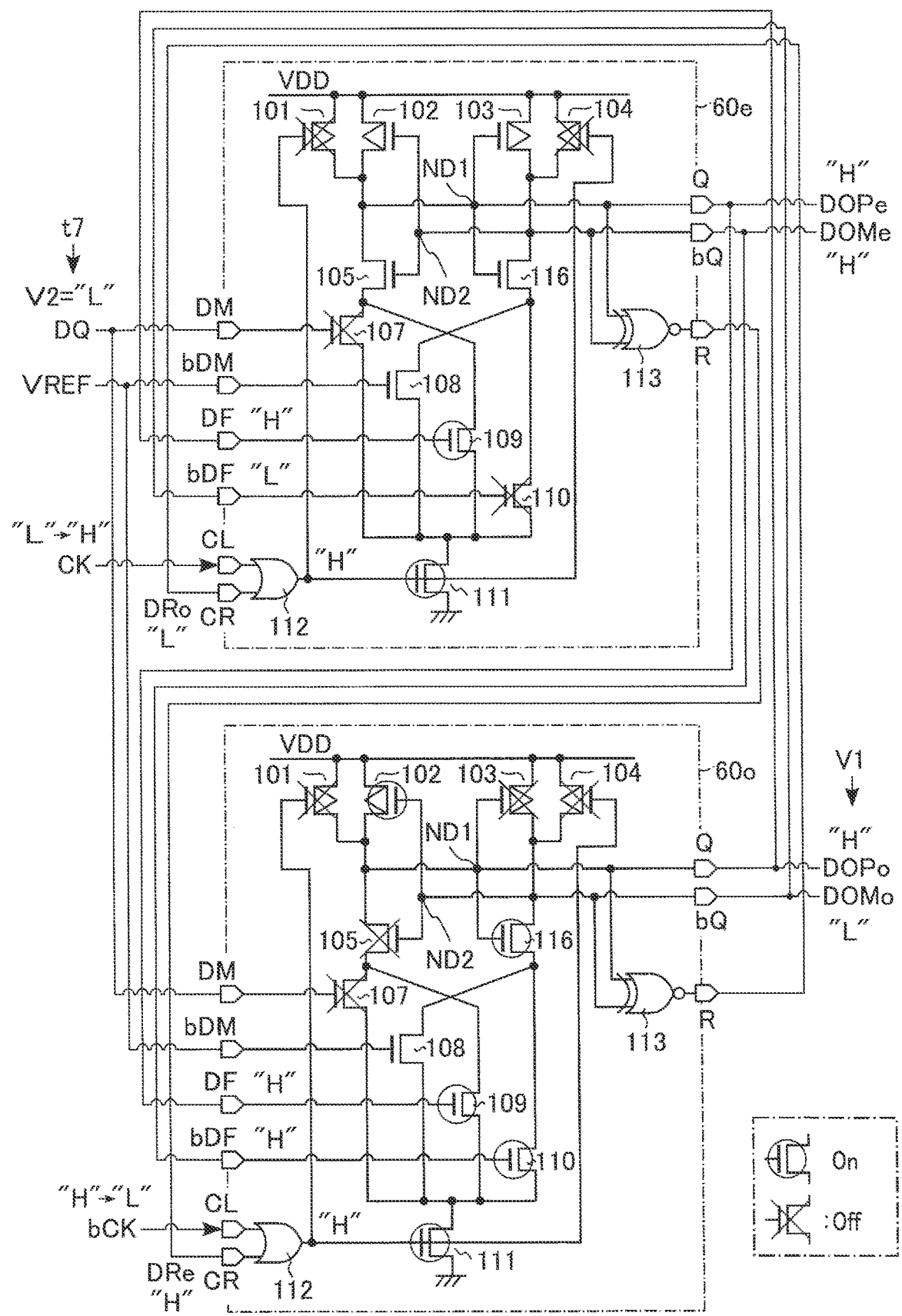
FIG. 16 is a state diagram of the DFE circuit 50 at time t7 in the timing chart shown in FIG. 8.

As shown in FIG. 16, the signal CK in "H" level is input to the OR circuit 112 of the amplifier 60*e*. Accordingly, the OR circuit 112 outputs a signal in "H" level. The transistors 101 and 104 of the amplifier 60*e* are set in the OFF state, and the transistor 111 is set in the ON state. With this, the latch circuit DL of the amplifier 60*e* is set in the latch state. The amplifier 60*e* takes in the even-numbered bit data V2.

The signal bCK in "L" level is input to the OR circuit 112 of the amplifier 60*o*. Since the signal DRe is in "H" level, the OR circuit 112 continues to output the signal in "H" level.

<Time t8>

As shown in FIG. 8, for example, assume that odd-numbered bit data V3 of the signal DQ is in "H" level. At time t8, the logic levels of the signals DOPe and DOMe of the amplifier 60*e* are determined. In other words, the logic level of the even-numbered bit data V2 is determined. Since the even-numbered bit data V2 is in "L" level, the signal DOPe is set in "H" level, and the signal DOMe is set in "L" level. Accordingly, the signal DRe is set in "L" level. Since the signals DRe and bCK are in "L" level, the reset operation of the latch circuit DL is started in the amplifier 60*o*.

Figure 17:
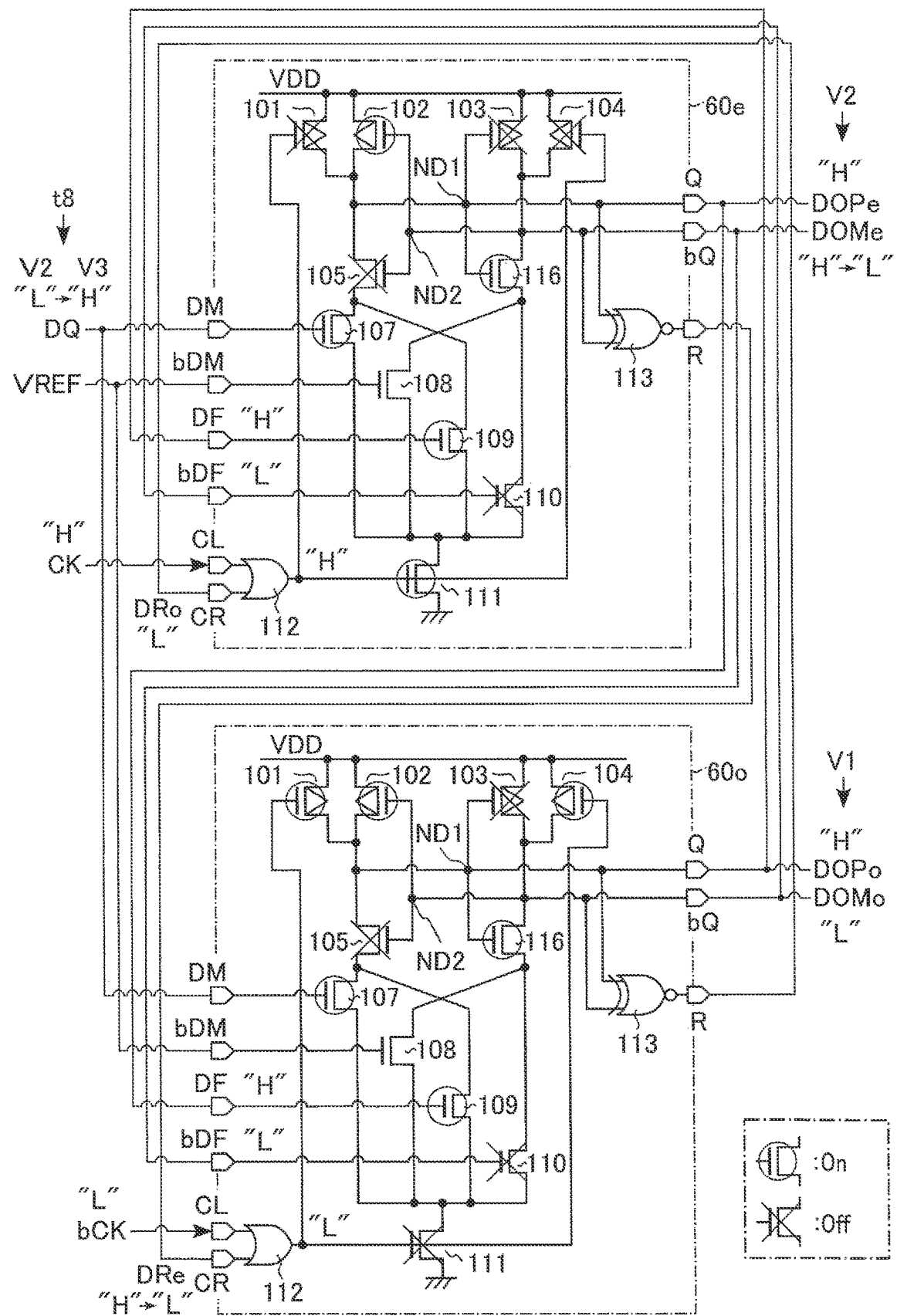
FIG. 17 is a state diagram of the DFE circuit 50 at time t8 in the timing chart shown in FIG. 8.

As shown in FIG. 17, since the odd-numbered bit data V3 of the signal DQ is in "H" level, the transistors 107 of the amplifiers 60*e* and 60*o* are set in the ON state.

In the amplifier 60*e*, as a result of taking in the even-numbered bit data V2 in "L" level, the voltage of the node ND2 drops faster than the voltage of the node ND1. Accordingly, in the latch circuit DL, the node ND1 is set in "H" level, and the node ND2 is set in "L" level. Therefore, the signal DOPe is maintained in "H" level. On the other hand, the signal DOMe is set in "L" level. Therefore, the amplifier 60*e* outputs the signal DRe in "L" level from the terminal R.

The result of taking in the even-numbered bit data V2 by the amplifier 60*e* is fed back to the amplifier 60*o*. More specifically, the signal DOPe in "H" level is input to the terminal DF of the amplifier 60*o*. Accordingly, the transistor 109 is set in the ON state. The signal DOMe in "L" level is input to the terminal bDF of the amplifier 60*o*. Accordingly, the transistor 110 is set in the OFF state. Hence, in the amplifier 60*o*, the voltage VREF drops. Further, in the amplifier 60*o*, since the signal DRe in "L" level is input, the OR circuit 112 outputs a signal in "L" level. Accordingly, the transistors 101 and 104 of the amplifier 60*o* are set in the ON state, and the transistor 111 is set in the OFF state. With this, the amplifier 60*o* starts the reset operation of the latch circuit DL. That is, a voltage in "H" level is applied to the node ND1 and the node ND2. However, at time t8, since the reset operation of the latch circuit DL is incomplete, the signal DOPo is maintained in "H" level, and the signal DOMo is maintained in "L" level. Therefore, the signal DRo is maintained in "L" level.

<Time t9>

As shown in FIG. 8, at time t9, the reset operation of the latch circuit DL is complete in the amplifier 60*o*, and the latch circuit DL is set in the reset state ("rst"). Therefore, the signals DOPo and DOMo are set in "H" level. Accordingly, the signal DRo is set in "H" level.

As shown in FIG. 18, in the amplifier 60*o*, the reset operation of the latch circuit DL is complete, and the node ND1 and the node ND2 are charged to "H" level. That is, the signals DOPo and DOMo are set in "H" level. Thus, the amplifier 60*o* outputs the signal DRo in "H" level from the terminal R.

The signal DOPo in "H" level is input to the terminal DF of the amplifier 60*e*. Accordingly, the transistor 109 is set in the ON state. The signal DOMo in "H" level is input to the terminal bDF of the amplifier 60*e*. Accordingly, the transistor 110 is set in the ON state. The signal DRo in "H" level is input to the OR circuit 112 of the amplifier 60*e*. The OR circuit 112 continues to output the signal in "H" level.

<Time t10>

As shown in FIG. 8, at time t10, the signal CK falls from "H" level to "L" level, and the signal bCK rises from "L" level to "H" level. Based on the rising of the signal bCK, the latch circuit DL of the amplifier 60*o* is set in the latch state ("lat"), and takes in the odd-numbered bit data V3 in "H" level. Based on the odd-numbered bit data V3, the signals DOPo and DOMo start to transition.

Figure 19:
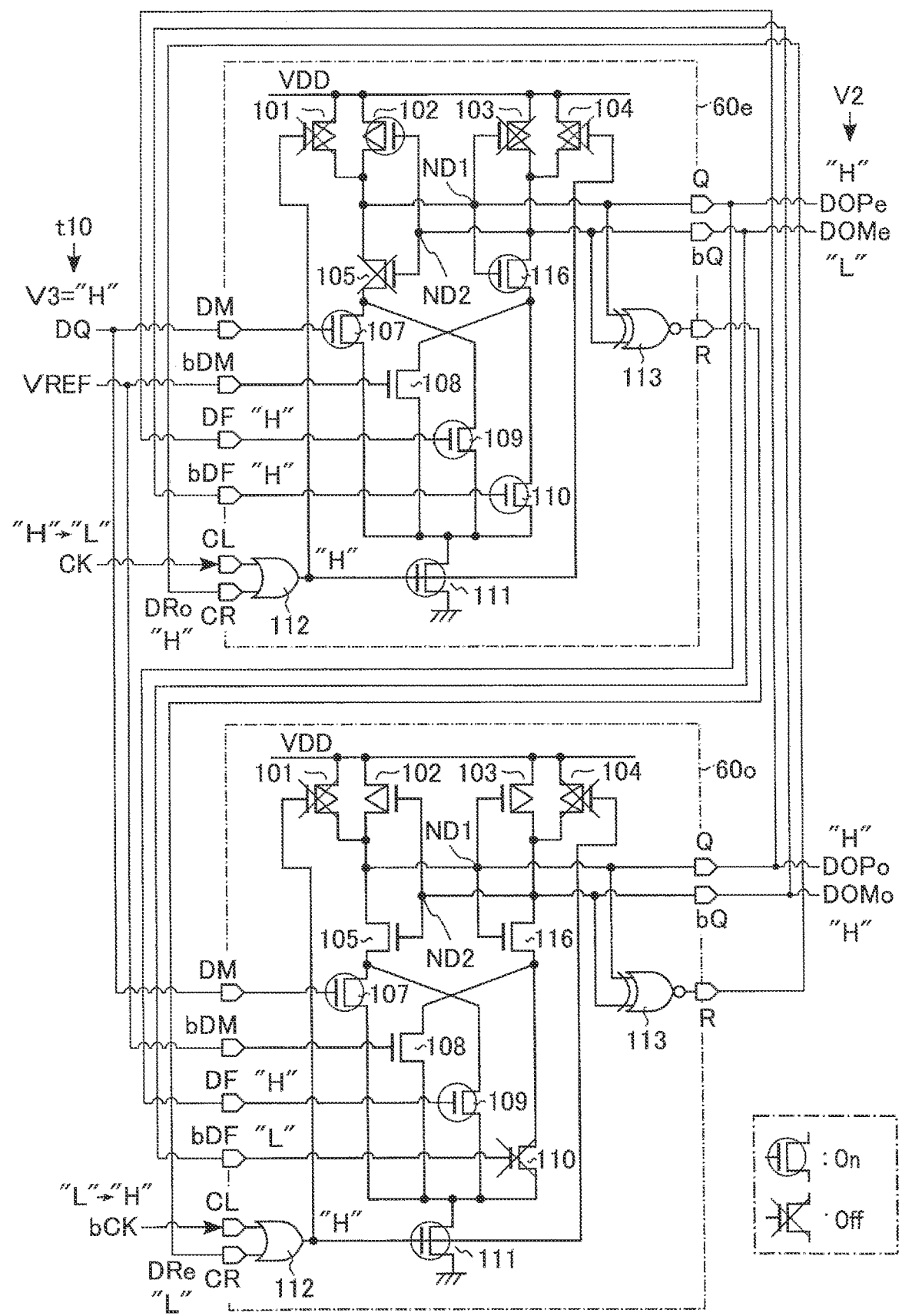
FIG. 19 is a state diagram of the DFE circuit 50 at time t10 in the timing chart shown in FIG. 8.

As shown in FIG. 19, the signal bCK in "H" level is input to the OR circuit 112 of the amplifier 60*o*. Accordingly, the OR circuit 112 outputs a signal in "H" level. The transistors 101 and 104 of the amplifier 60*o* are set in the OFF state, and the transistor 111 is set in the ON state. With this, the latch circuit DL of the amplifier 60*o* is set in the latch state. The amplifier 60*o* takes in the odd-numbered bit data V3.

The signal CK in "L" level is input to the OR circuit 112 of the amplifier 60*e*. Since the signal DRo is in "H" level, the OR circuit 112 continues to output the signal in "H" level.

<Time t11>

As shown in FIG. 8, for example, assume that even-numbered bit data V4 of the signal DQ is in "H" level. At time t11, the logic levels of the signals DOPo and DOMo of the amplifier 60*o* are determined. In other words, the logic level of the odd-numbered bit data V3 is determined. Since the odd-numbered bit data V3 is in "H" level, the signal DOPo is set in "L" level, and the signal DOMo is set in "H" level. Accordingly, the signal DRo is set in "L" level. Since the signals DRo and CK are in "L" level, the reset operation of the latch circuit DL is started in the amplifier 60*e*.

As shown in FIG. 20, since the even-numbered bit data V4 of the signal DQ is in "H" level, the transistors 107 of the amplifiers 60*e* and 60*o* are set in the ON state.

In the amplifier 60*o*, as a result of taking in the odd-numbered bit data V3 in "H" level, the voltage of the node ND1 drops faster than the voltage of the node ND2. Accordingly, in the latch circuit DL, the node ND1 is set in "L" level, and the node ND2 is set in "H" level. Therefore, the signal DOPo is changed from "H" level to "L" level. On the other hand, the signal DOMo is maintained in "H" level. Thus, the amplifier 60*o* outputs the signal DRo in "H" level from the terminal R.

The result of taking in the odd-numbered bit data V3 by the amplifier 60*o* is fed back to the amplifier 60*e*. More specifically, since the signal DOPo in "L" level is input to the terminal DF of the amplifier 60*e*, the transistor 109 is set in the OFF state. Since the signal DOMo in "H" level is input to the terminal bDF of the amplifier 60*e*, the transistor 110 is set in the ON state. Hence, in the amplifier 60*o*, the voltage VREF rises. Further, in the amplifier 60*e*, since the signal DRo in "L" level is input, the OR circuit 112 outputs a signal in "L" level. Accordingly, the transistors 101 and 104 of the amplifier 60*e* are set in the ON state, and the transistor 111 is set in the OFF state. Thus, the amplifier 60*e* starts the reset operation of the latch circuit DL. That is, a voltage in "H" level is applied to the node ND1 and the node ND2. However, at time t11, since the reset operation of the latch circuit DL is incomplete, the signal DOPe is maintained in "H" level, and the signal DOMe is maintained in "L" level. Therefore, the signal DRe is maintained in "L" level.

<Time t12>

As shown in FIG. 8, at time t12, the reset operation of the latch circuit DL is complete in the amplifier 60e, and the latch circuit DL is set in the reset state ("rst"). Therefore, the signals DOPe and DOMe are set in "H" level. Accordingly, the signal DRe is set in "H" level.

As shown in FIG. 21, in the amplifier 60e, the reset operation of the latch circuit DL is complete, and the node ND1 and the node ND2 are charged to "H" level. That is, the signals DOPe and DOMe are set in "H" level. Therefore, the amplifier 60e outputs the signal DRe in "H" level from the terminal R.

The signal DOPe in "H" level is input to the terminal DF of the amplifier 60o. Accordingly, the transistor 109 is set in the ON state. The signal DOMe in "H" level is input to the terminal bDF of the amplifier 60o. Accordingly, the transistor 110 is set in the ON state. The signal DRe in "H" level is input to the OR circuit 112 of the amplifier 60o. The OR circuit 112 continues to output the signal in "H" level.

<Time t13>

As shown in FIG. 8, at time t13, the signal CK rises from "L" level to "H" level, and the signal bCK falls from "H" level to "L" level. Based on the rising of the signal CK, the latch circuit DL of the amplifier 60e is set in the latch state ("lat"), and takes in the even-numbered bit data V4 in "H" level. Based on the even-numbered bit data V4, the signals DOPe and DOMe start to transition.

Figure 22:
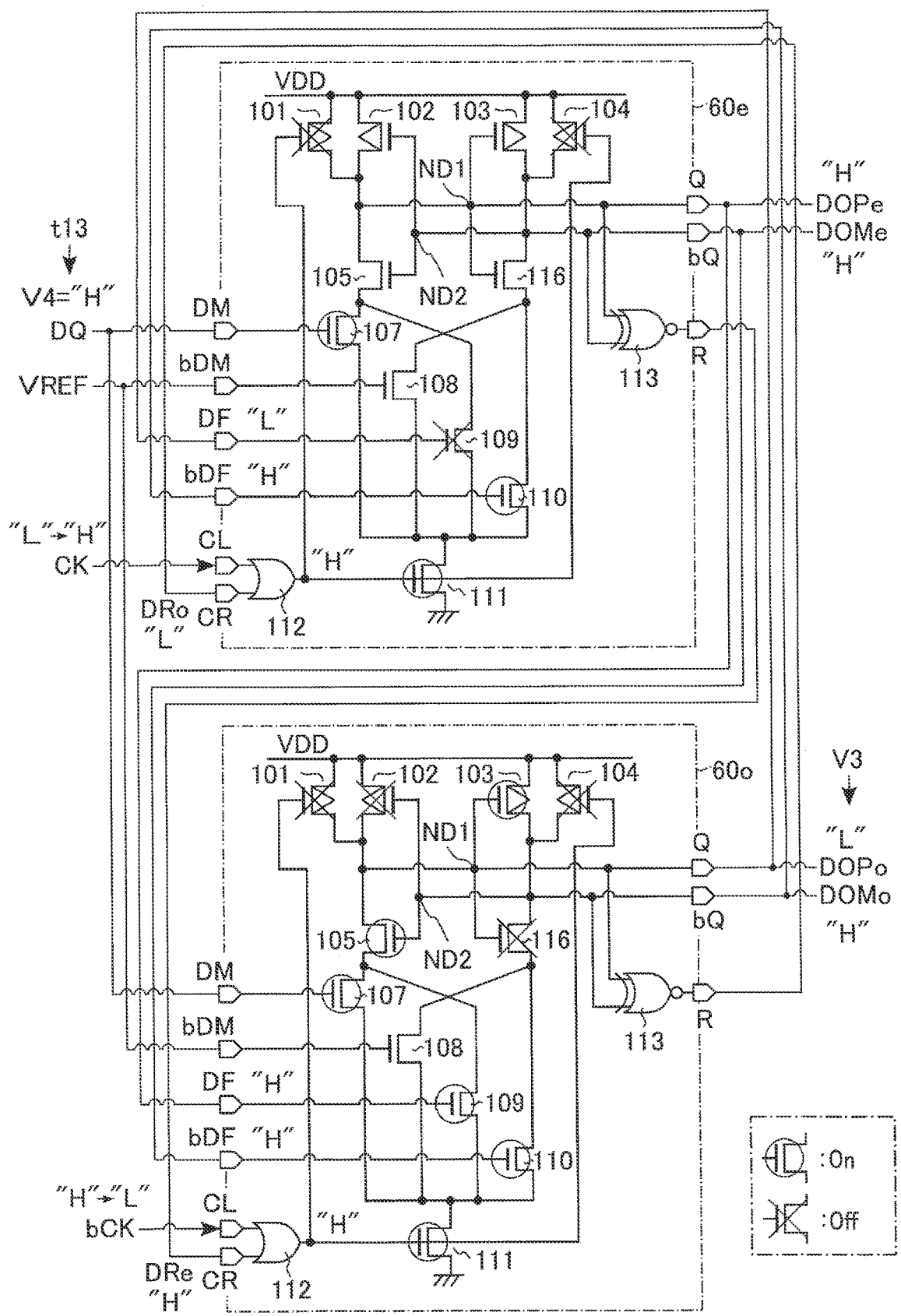
FIG. 22 is a state diagram of the DFE circuit 50 at time t13 in the timing chart shown in FIG. 8.

As shown in FIG. 22, the signal CK in "H" level is input to the OR circuit 112 of the amplifier 60e. Accordingly, the OR circuit 112 outputs a signal in "H" level. The transistors 101 and 104 of the amplifier 60e are set in the OFF state, and the transistor 111 is set in the ON state. Thus, the amplifier 60e takes in the signal DQ.

The signal bCK in "L" level is input to the OR circuit 112 of the amplifier 60o. Since the signal DRe is in "H" level, the OR circuit 112 continues to output the signal in "H" level.

1.3 Effect According to this Embodiment

The configurations according to this embodiment can provide a semiconductor memory device that can suppress an increase in chip area. This effect will be described in detail.

For example, the DFE technique is known as one of the transmission compensation techniques corresponding to high-speed communication. 4 time-interleave that divides the reception path into four phases with phases shifted by 90° is applied to the DFE circuit corresponding to the DFE technique. The DFE circuit has the circuit configuration corresponding to four reception paths. Therefore, the circuit area and power consumption of the DFE circuit tends to increase.

To the contrary, with the configurations according to this embodiment, the DFE circuit 50 includes two amplifiers 60 corresponding to 2 time-interleave. The amplifier 60 is a LT-SA circuit including the data input terminals DM and bDM, the feedback input terminals DF and bDF, the latch control clock input terminal CL, the reset control clock input terminal CR, the data output terminals Q and bQ, and the latch completion output terminal R.

The amplifier 60 can output, from the terminal R, the reset control clock signal (DRe or Dro) based on the state of the latch circuit DL. In other words, once the logic level of the signal DQ is determined in the latch circuit DL, the amplifier 60 can output the reset control clock signal notifying this. One amplifier 60 can receive, from the terminal CR, the reset control clock signal output by the other amplifier 60. The amplifier 60 can reset the internal latch circuit DL based on the received reset control clock signal. That is, one amplifier 60 can execute the reset operation of the latch circuit DL based on the output data of the other amplifier 60. With this, the DFE circuit 50 can implement DFE with 2 time-interleave applied thereto. By applying 2 time-interleave, the DFE circuit 50 can suppress an increase in circuit area and an increase in power consumption. Accordingly, the semiconductor memory device can suppress an increase in chip area. Further, the semiconductor memory device can suppress an increase in power consumption.

Further, with the configurations according to this embodiment, one amplifier 60 can execute the reset operation of the latch circuit DL based on the output data of the other amplifier 60. Therefore, the speed of the reset operation can be increased as compared to 4 time-interleave in which the reset operation of the latch circuit is executed in synchronization with the clock signal. Therefore, the semiconductor memory device can increase the speed of communication with the memory controller.

Further, with the configurations according to this embodiment, the amplifier 60 receives 1-bit data of the signal DQ from the terminal DM. At this time, one amplifier 60 can receive, via the terminals DF and bDF, feedback of the output signal of the other amplifier 60 (output data corresponding to the bit data received at the immediately preceding timing by the other amplifier 60). With this, the amplifier 60 can make the voltage VREF relatively fluctuate with respect to the signal DQ. Accordingly, erroneous decision of the logic level of the signal DQ can be suppressed.

1.4 Modification of First Embodiment 1.4.1 Configuration of Amplifier

Next, a modification of the first embodiment will be described. In this modification, the configuration of the amplifier different from the first embodiment will be described using FIG. 23. FIG. 23 is a circuit diagram of the amplifier 60e. Differences from the first embodiment will be mainly described below. Note that the amplifier 60e will be described in the following description, but the amplifier 60o has the same configuration as the amplifier 60e.

As shown in FIG. 23, the amplifier 60e includes the PMOS transistors 101 to 104, PMOS transistors 121 to 123, the NMOS transistors 105 to 111, and the XNOR circuit 113. In the amplifier 60e of this modification, the OR circuit 112 of the amplifier 60e described using FIG. 7 of the first embodiment is removed. In addition, the transistors 121, 122, and 123 are added to the amplifier 60e of this modification. The transistors 121, 122, and 123 implement the same function as the OR circuit 112.

The voltage VDD is applied to one end of the transistor 121. The other end of the transistor 121 is coupled to a node ND10. The gate of the transistor 121 is coupled to the terminal CR.

The voltage VDD is applied to one end of the transistor 122. The other end of the transistor 122 is coupled to the node ND10. The gate of the transistor 122 is coupled to the terminal CR.

One end of the transistor 123 is coupled to the node ND5. The other end of the transistor 123 is grounded. The gate of the transistor 123 is coupled to the terminal CR.

In this modification, one end of each of the transistors 101 and 104 is coupled to the node ND10. The remaining configuration is as in FIG. 7 of the first embodiment.

1.4.2 Effect According to Modification of First Embodiment

With the configuration according to this modification, an effect similar to the effect of the first embodiment can be obtained.

Further, with the configuration according to this modification, the amplifier 60 can generate the reset signal of the latch circuit DL without the OR circuit 112 being provided. Since the OR circuit 112 is not arranged between the terminal CL and the transistors 101 and 104, generation of a delay caused by the OR circuit 112 is suppressed, so that the amplifier 60 can operate faster.

2. Second Embodiment

Next, the second embodiment will be described. In the second embodiment, the configurations of a DFE circuit 50 and a latch circuit 52 different from the first embodiment will be described. Differences from the first embodiment will be mainly described below.

2.1 Configurations of DFE Circuit and Latch Circuit

Figure 24:
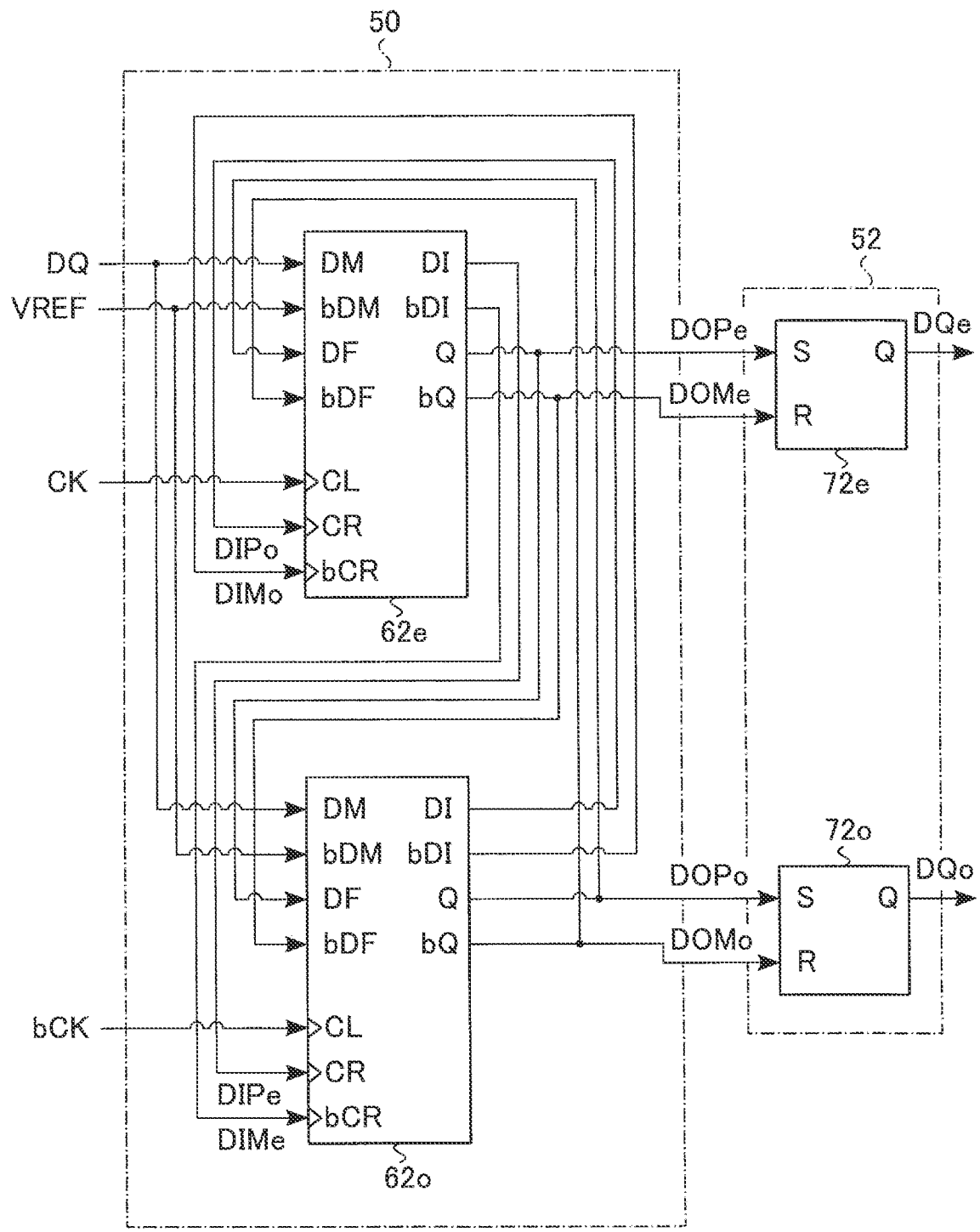
FIG. 24 shows block diagrams of a DFE circuit 50 and a latch circuit 52 included in a semiconductor memory device according to a second embodiment.

First, with reference to FIG. 24, an example of the configurations of the DFE circuit 50 and the latch circuit 52 will be described. FIG. 24 shows a block diagram of the DFE circuit 50 and a block diagram of the latch circuit 52.

As shown in FIG. 24, the DFE circuit 50 includes two amplifiers 62e and 62o. The amplifiers 62e and 62o have the same configuration. As in the first embodiment, the DFE circuit 50 supports 2 time-interleave. For example, the amplifier 62e corresponds to even-numbered bit data of a signal DQ. On the other hand, the amplifier 62o corresponds to odd-numbered bit data of the signal DQ. In the following description, if the description is not limited to either of the amplifiers 62e and 62o, they are referred to as the amplifiers 62.

The amplifier 62 is a double-tail latch-type voltage sense amplifier (DTSA) circuit including data input terminals DM and bDM, feedback input terminals DF and bDF, a latch control clock input terminal CL, reset control clock input terminals CR and bCR, data output terminals Q and bQ, and a latch input signal output terminals DI and bDI.

The signal DQ is input to the terminal DM. A voltage VREF is input to the terminal bDM.

To the terminals DF and bDF of one amplifier 62, the output signals of the other amplifier 62 are input (fed back). For example, if one amplifier 62 is the amplifier 62e, the other amplifier 62 is the amplifier 62o. If one amplifier 62 is the amplifier 62o, the other amplifier 62 is the amplifier 62e. More specifically, for example, if the amplifier 62e receives the kth bit data of the signal DQ, output signals DOPo and DOMo corresponding to the (k−1)th bit data of the signal DQ received by the amplifier 62o at the immediately preceding timing are fed back to the terminals DF and bDF of the amplifier 62e, respectively. The terminals DF and bDF of one amplifier 62 are coupled to the terminals Q and bQ of the other amplifier 62, respectively. More specifically, the signal DOPo is input from the terminal Q of the amplifier 62o to the terminal DF of the amplifier 62e. The signal DOMo is input from the terminal bQ of the amplifier 62o to the terminal bDF of the amplifier 62e. A signal DOPe is input from the terminal Q of the amplifier 62e to the terminal DF of the amplifier 62o. A signal DOMe is input from the terminal bQ of the amplifier 62e to the terminal bDF of the amplifier 62o.

A signal CK is input to the terminal CL of the amplifier 62e. A signal bCK is input to the terminal CL of the amplifier 62o.

To the terminals CR and bCR of one amplifier 62, latch input signals output from the terminals DI and bDI of the other amplifier 62 are input. The latch input signal is a signal input to a latch circuit DL of the amplifier 62. The terminals CR and bCR of one amplifier 62 are coupled to the terminals DI and bDI of the other amplifier 62, respectively. More specifically, the terminals CR and bCR of the amplifier 62e are coupled to the terminals DI and bDI of the amplifier 62o, respectively. The terminals CR and bCR of the amplifier 62o are coupled to the terminals DI and bDI of the amplifier 62e, respectively. Hereinafter, the latch input signals of the amplifier 62o to be input to the terminals CR and bCR of the amplifier 62e are referred to as signals DIPo and DIMo, respectively. Further, the latch input signals of the amplifier 62e to be input to the terminals CR and bCR of the amplifier 62o are referred to as signals DIPe and DIMe, respectively.

The amplifier 62 outputs non-inverted signals of the signal DQ from the terminals Q and bQ. More specifically, if even-numbered bit data in "H" level is input to the terminal DM of the amplifier 62e, the amplifier 62e outputs the signal DOPe in "H" level from the terminal Q, and outputs the signal DOMe in "L" level from the terminal bQ. If even-numbered bit data in "L" level is input to the terminal DM of the amplifier 62e, the amplifier 62e outputs the signal DOPe in "L" level from the terminal Q, and outputs the signal DOMe in "H" level from the terminal bQ. Similarly, if odd-numbered bit data in "H" level is input to the terminal DM of the amplifier 62o, the amplifier 62o outputs the signal DOPo in "H" level from the terminal Q, and outputs the signal DOMo in "L" level from the terminal bQ. If odd-numbered bit data in "L" level is input to the terminal DM of the amplifier 62o, the amplifier 62o outputs the signal DOPo in "L" level from the terminal Q, and outputs the signal DOMo in "H" level from the terminal bQ.

Next, the latch circuit 52 will be described. The latch circuit 52 of this embodiment includes two SR latch circuits 72e and 72o. The SR latch circuits 72e and 72o have the same configuration. In the following description, if the description is not limited to either of the SR latch circuits 72e and 72o, they are referred to as SR latch circuits 72. The SR latch circuit 72e temporarily stores the output signal of the amplifier 62e. The SR latch circuit 72o temporarily stores the output signal of the amplifier 62o. The SR latch circuit 72 includes a signal input terminal S, a reset signal input terminal R, and the output terminal Q. Note that the SR latch circuit 72 may include the inverting output terminal bQ.

If a signal in "H" level is input to the terminal S and a signal in "L" level is input to the terminal R, the SR latch circuit 72 outputs a signal in "H" level from the terminal Q. If a signal in "L" level is input to the terminal S and a signal in "H" level is input to the terminal R, the SR latch circuit 72 outputs a signal in "L" level from the terminal Q. During a period in which the signals in "L" level are input to the terminals S and R, the SR latch circuit 72 maintains the previous output state.

The signal DOPe of the amplifier 62e is input to the terminal S of the SR latch circuit 72e. The signal DOMe of the amplifier 62e is input to the terminal R of the SR latch circuit 72e. The SR latch circuit 72e outputs, from the terminal Q, a signal DQe which is the even-numbered bit data of the signal DQ.

The signal DOPo of the amplifier 62o is input to the terminal S of the SR latch circuit 72o. The signal DOMo of the amplifier 62o is input to the terminal R of the SR latch circuit 72o. The SR latch circuit 72o outputs, from the terminal Q, a signal DQo which is the odd-numbered bit data of the signal DQ.

2.2 Circuit Diagram of DFE Circuit

Figure 25:
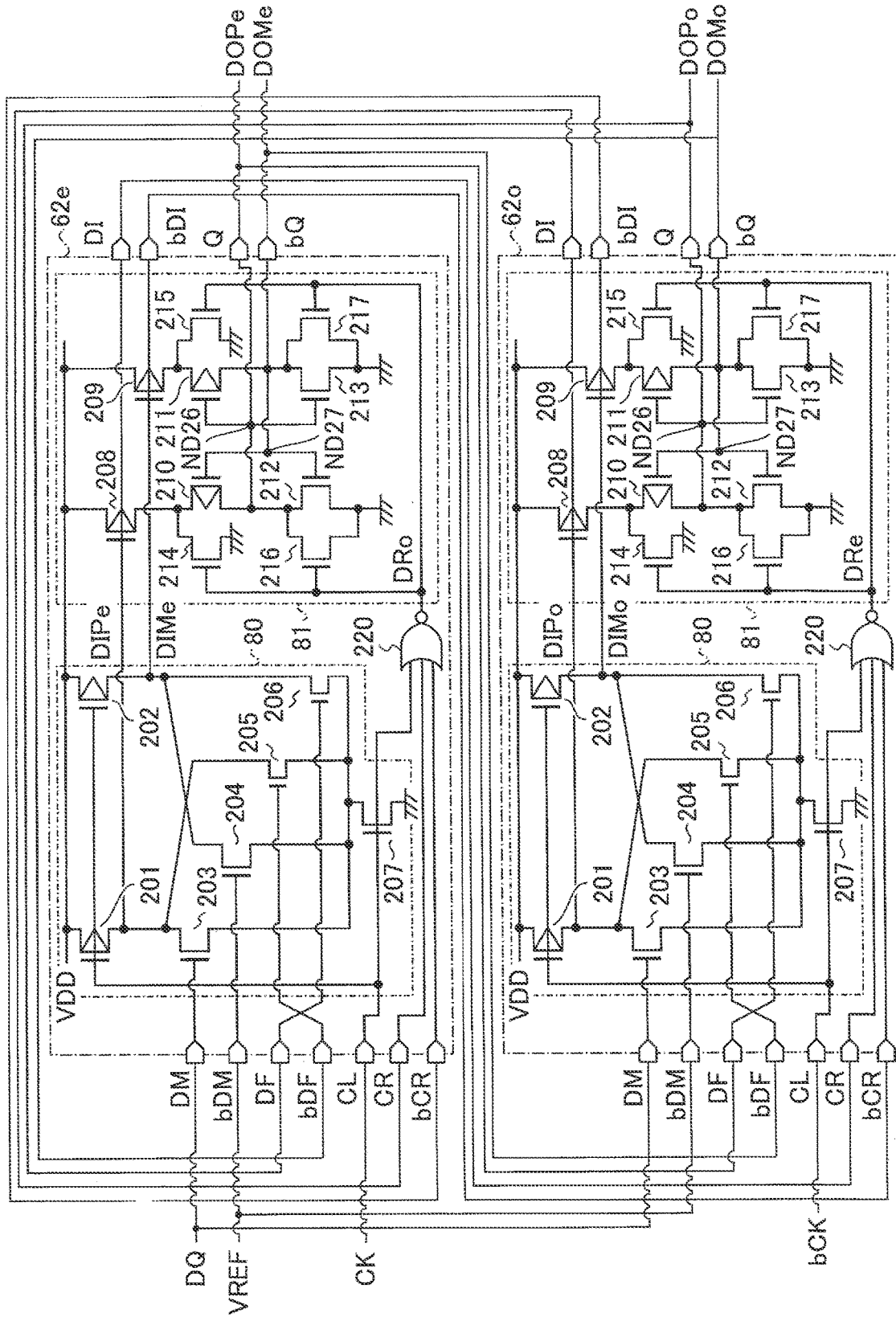
FIG. 25 is a circuit diagram of the DFE circuit 50 included in the semiconductor memory device according to the second embodiment.

Next, an example of a circuit diagram of the DFE circuit 50 will be described with reference to FIGS. 25 and 26. FIG. 25 is a circuit diagram of the DFE circuit 50. FIG. 26 is a circuit diagram of the amplifier 62e.

As shown in FIG. 25, the amplifiers 62e and 62o have the same circuit configuration. A description will be provided below by paying attention to the amplifier 62e.

As shown in FIG. 26, the amplifier 62e includes an input unit 80, a latch unit 81, and a negative OR (NOR) circuit 220.

The input unit 80 compares the voltage value of the signal DQ and the voltage VREF. The input unit 80 transmits, as the result of comparison, the signals DIPe and DIMe to the latch unit 81. The input unit 80 outputs the signals DIPe and DIMe from the terminals DI and bDI, respectively.

The latch unit 81 temporarily stores data based on the signals DIPe and DIMe. The latch unit 81 includes the latch circuit DL. The latch circuit DL is reset based on the output signal of the NOR circuit 220. The latch unit 81 outputs the signals DOPe and DOMe from the terminals Q and bQ, respectively.

Next, the internal configuration of the input unit 80 will be described. The input unit 80 includes PMOS transistors 201 and 202, and NMOS transistors 203 to 207.

A voltage VDD is applied to one end of the transistor 201. The other end of the transistor 201 is coupled to a node ND21. The gate of the transistor 201 is coupled to the terminal CL.

The voltage VDD is applied to one end of the transistor 202. The other end of the transistor 202 is coupled to a node ND22. The gate of the transistor 202 is coupled to the terminal CL.

One end of the transistor 203 is coupled to the node ND21. The other end of the transistor 203 is coupled to a node ND23. The gate of the transistor 203 is coupled to the terminal DM.

One end of the transistor 204 is coupled to the node ND22. The other end of the transistor 204 is coupled to the node ND23. The gate of the transistor 204 is coupled to the terminal bDM.

One end of the transistor 205 is coupled to the node ND21. The other end of the transistor 205 is coupled to the node ND23. The gate of the transistor 205 is coupled to the terminal bDF.

The transistor 205 is coupled in parallel with the transistor 203. The drive capacity of the transistor 205 is lower than the drive capacity of the transistor 203. For example, if the transistors 203 and 205 are in the ON state, the current flowing through the transistor 205 is less than the current flowing through the transistor 203. For example, the transistor 203 has a structure in which a plurality of (for example, ten) transistors each having the same size as the transistor 205 are coupled in parallel.

One end of the transistor 206 is coupled to the node ND22. The other end of the transistor 206 is coupled to the node ND23. The gate of the transistor 206 is coupled to the terminal DF.

The transistor 206 is coupled in parallel with the transistor 204. The drive capacity of the transistor 206 is lower than the drive capacity of the transistor 204. For example, if the transistors 204 and 206 are in the ON state, the current flowing through the transistor 206 is less than the current flowing through the transistor 204. For example, the transistor 204 has a structure in which a plurality of (for example, ten) transistors each having the same size as the transistor 206 are coupled in parallel.

Similar to the transistors 109 and 110 described in the first embodiment, the transistors 205 and 206 play a role of feeding back, to an input signal of one amplifier 62, an output signal of the other amplifier 62. Operations of the transistors 205 and 206 produce an effect similar to the effect produced in a case where the voltage value of the voltage VREF fluctuates with respect to the voltage value of the signal DQ. For example, if the transistor 205 is in the ON state and the transistor 206 is in the OFF state, the voltage VREF drops. If the transistor 205 is in the OFF state and the transistor 206 is in the ON state, the voltage VREF rises.

One end of the transistor 207 is coupled to the node ND23. The other end of the transistor 207 is grounded. The gate of the transistor 207 is coupled to the terminal CL.

The input unit 80 outputs the voltage at the node ND21 from the terminal DI as the signal DIPe, and outputs the voltage at the node ND22 from the terminal bDI as the signal DIMe.

Next, the internal configuration of the latch unit 81 will be described. The latch unit 81 includes PMOS transistors 208 to 211 and NMOS transistors 212 to 217.

The voltage VDD is applied to one end of the transistor 208. The other end of the transistor 208 is coupled to a node ND24. The gate of the transistor 208 is coupled to the node ND21. In other words, the signal DIPe is input to the gate of the transistor 208.

The voltage VDD is applied to one end of the transistor 209. The other end of the transistor 209 is coupled to a node ND25. The gate of the transistor 209 is coupled to the node ND22. In other words, the signal DIMe is input to the gate of the transistor 209.

One end of the transistor 210 is coupled to the node ND24. The other end of the transistor 210 is coupled to a node ND26. The gate of the transistor 210 is coupled to a node ND27.

One end of the transistor 211 is coupled to the node ND25. The other end of the transistor 211 is coupled to the node ND27. The gate of the transistor 211 is coupled to the node ND26.

One end of the transistor 212 is coupled to the node ND26. The other end of the transistor 212 is grounded. The gate of the transistor 212 is coupled to the node ND27.

One end of the transistor 213 is coupled to the node ND27. The other end of the transistor 213 is grounded. The gate of the transistor 213 is coupled to the node ND26.

The transistors 210 to 213 form the latch circuit DL. More specifically, the transistors 210 and 212 form the first inverter. The transistors 211 and 213 form the second inverter. An output of the first inverter and an input of the second inverter (node ND26) are coupled to the terminal Q. An input of the first inverter and an output of the second inverter (node ND27) are coupled to the terminal bQ.

One end of the transistor 214 is coupled to the node ND24. The other end of the transistor 214 is grounded. The gate of the transistor 214 is coupled to the output terminal of the NOR circuit 220.

One end of the transistor 215 is coupled to the node ND25. The other end of the transistor 215 is grounded. The gate of the transistor 215 is coupled to the output terminal of the NOR circuit 220.

One end of the transistor 216 is coupled to the node ND26. The other end of the transistor 216 is grounded. The gate of the transistor 216 is coupled to the output terminal of the NOR circuit 220.

One end of the transistor 217 is coupled to the node ND27. The other end of the transistor 217 is grounded. The gate of the transistor 217 is coupled to the output terminal of the NOR circuit 220.

The transistors 214 to 217 function as a reset circuit of the latch circuit DL. For example, if the output signal of the NOR circuit 220 is set in "H" level, the transistors 214 to 217 are set in the ON state. With this, the nodes ND26 and ND27 are charged to "H" level. That is, the latch circuit DL is set in the reset state.

The NOR circuit 220 includes three input terminals and one output terminal. The three input terminals are coupled to the terminal CL, the terminal CR, and the terminal bCR, respectively. If the signals input to the terminals CL, CR, and bCR are in "L" level, the NOR circuit 220 outputs a signal in "H" level. If at least one of the signals input to the terminals CL, CR, and bCR is in "H" level, the NOR circuit 220 outputs a signal in "L" level. The signal output by the NOR circuit 220 of the amplifier 62e corresponds to the signal DRo in the first embodiment. The signal output by the NOR circuit 220 of the amplifier 62o corresponds to the signal DRe in the first embodiment.

The operation of the amplifier 62e will be described briefly. In the input unit 80 of the amplifier 62e, if the signal CK rises from "L" level to "H" level, the transistors 201 and 202 are set in the OFF state, and the transistor 207 is set in the ON state. In this state, the amplifier 62e takes in the signal DQ. Since the transistors 201 and 202 are in the OFF state, depending on the states of the transistors 203 to 206, a difference occurs between the speed of the voltage drop of the node ND21 dropping from "H" level to "L" level and the speed of the voltage drop of the node ND22 from "H" level to "L" level. For example, if the transistor 203 is in the ON state, the voltage of the node ND21 drops faster than the voltage of the node ND22. On the other hand, if the transistor 203 is in the OFF state, the voltage of the node ND22 drops faster than the voltage of the node ND21. In other words, if the signal DQ is in "H" level, the signal DIPe is made to transition from "H" level to "L" level before the signal DIMe. On the other hand, if the signal DQ is in "L" level, the signal DIMe is made to transition from "H" level to "L" level before the signal DIPe.

If the NOR circuit 220 outputs the signal DRo in "L" level, the transistors 214 to 217 are set in the OFF state in the latch unit 81. In this state, if the signal DQ is in "H" level, the signal DIPe is made to transition to "L" level before the signal DIMe. Then, the transistor 208 is set in the ON state before the transistor 209. Accordingly, in the latch unit 81, the node ND26 is set in "H" level, and the node ND27 is set in "L" level. As a result, the signal DOPe is set in "H" level, and the signal DOMe is set in "L" level. On the other hand, if the signal DQ is in "L" level, the signal DIMe is made to transition to "L" level before the signal DIPe. Then, the transistor 209 is set in the ON state before the transistor 208. Accordingly, in the latch unit 81, the node ND26 is set in "L" level, and the node ND27 is set in "H" level. As a result, the signal DOPe is set in "L" level, and the signal DOMe is set in "H" level.

2.3 Operation Example of DFE Circuit

Figure 27:
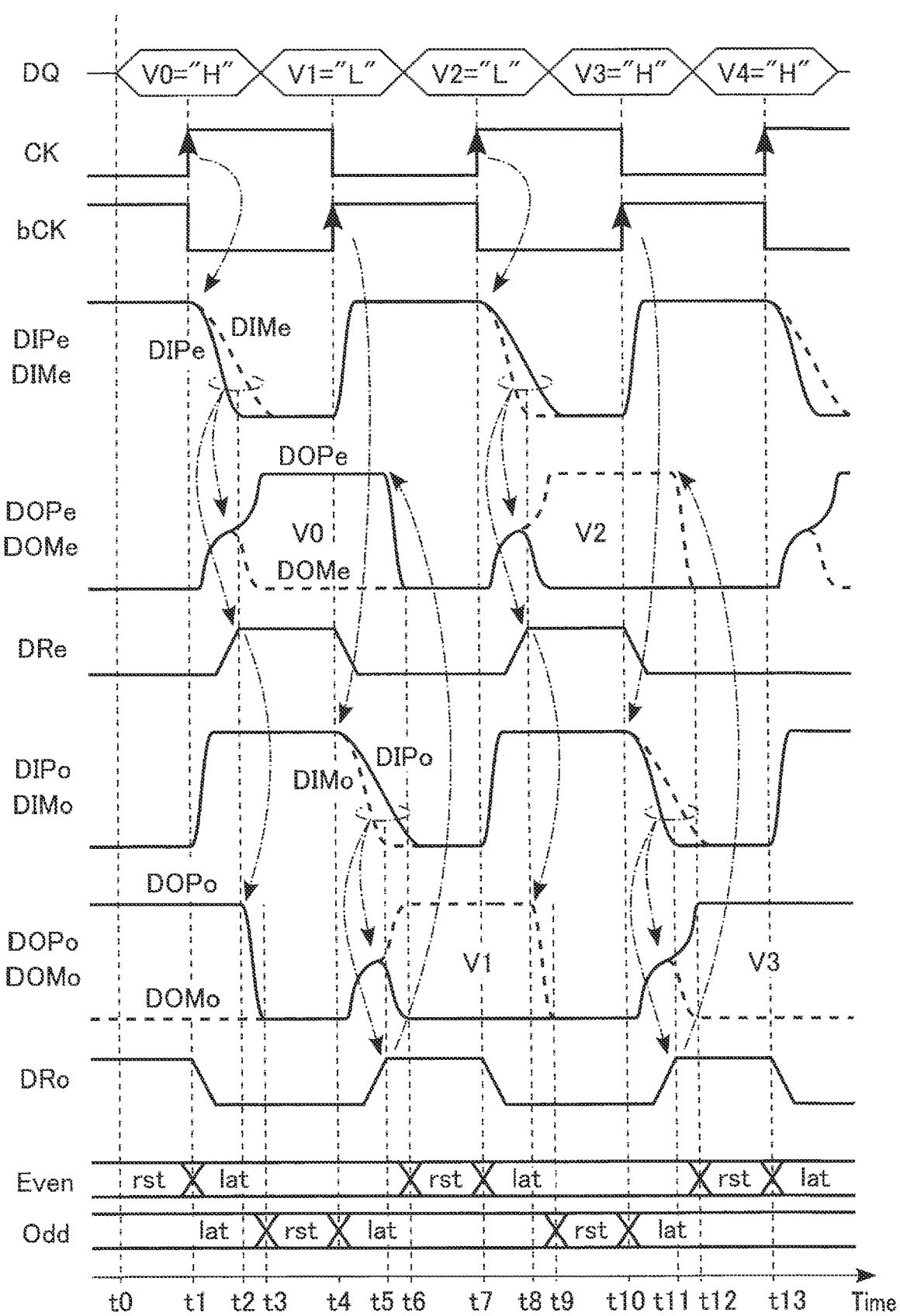
FIG. 27 is a timing chart of various signals in the DFE circuit 50 included in the semiconductor memory device according to the second embodiment.

Next, an example of the operation of the DFE circuit 50 will be described with reference to FIGS. 27, 28, 29, 30, 31, 32, 33, 34, 35, 36, 37, 38, 39, 40, and 41. FIG. 27 is a timing chart of various signals in the DFE circuit 50. FIGS. 28, 29, 30, 31, 32, 33, 34, 35, 36, 37, 38, 39, 40, and 41 are state diagrams of the DFE circuit 50 at respective times in the timing chart shown in FIG. 27. In this example, a case where the input signal DQ is data will be described. Note that in the following description, a description will be provided by paying attention to the parts where the states of the signals and the transistors change at the respective times in the timing chart.

<Time t0>

As shown in FIG. 27, at time t0 before the signal DQ is input, the signal CK is set in "L" level and the signal bCK is set in "H" level. For example, the amplifier 62e outputs the signals DIPe and DIMe in "H" level and signals DOPe and DOMe in "L" level. For example, the amplifier 62o outputs the signals DIPo and DIMo in "L" level, the signal DOPo in "H" level, and the signal DOMo in "L" level.

The signal CK in "L" level and the signals DIPo and DIMo in "L" level are input to the NOR circuit 220 of the amplifier 62e. Accordingly, the NOR circuit 220 of the amplifier 62e outputs the signal DRo in "H" level. With this, the latch circuit DL (reference sign "Even" shown in FIG. 27) of the amplifier 62e is set in the reset state ("rst"). Further, the signal bCK in "H" level and the signals DIPe and DIMe in "H" level are input to the NOR circuit 220 of the amplifier 62o. Accordingly, the NOR circuit 220 of the amplifier 62o outputs the signal DRe in "L" level. With this, the latch circuit DL (reference sign "Odd" shown in FIG. 27) of the amplifier 62e is set in the latch state ("lat").

Figure 28:
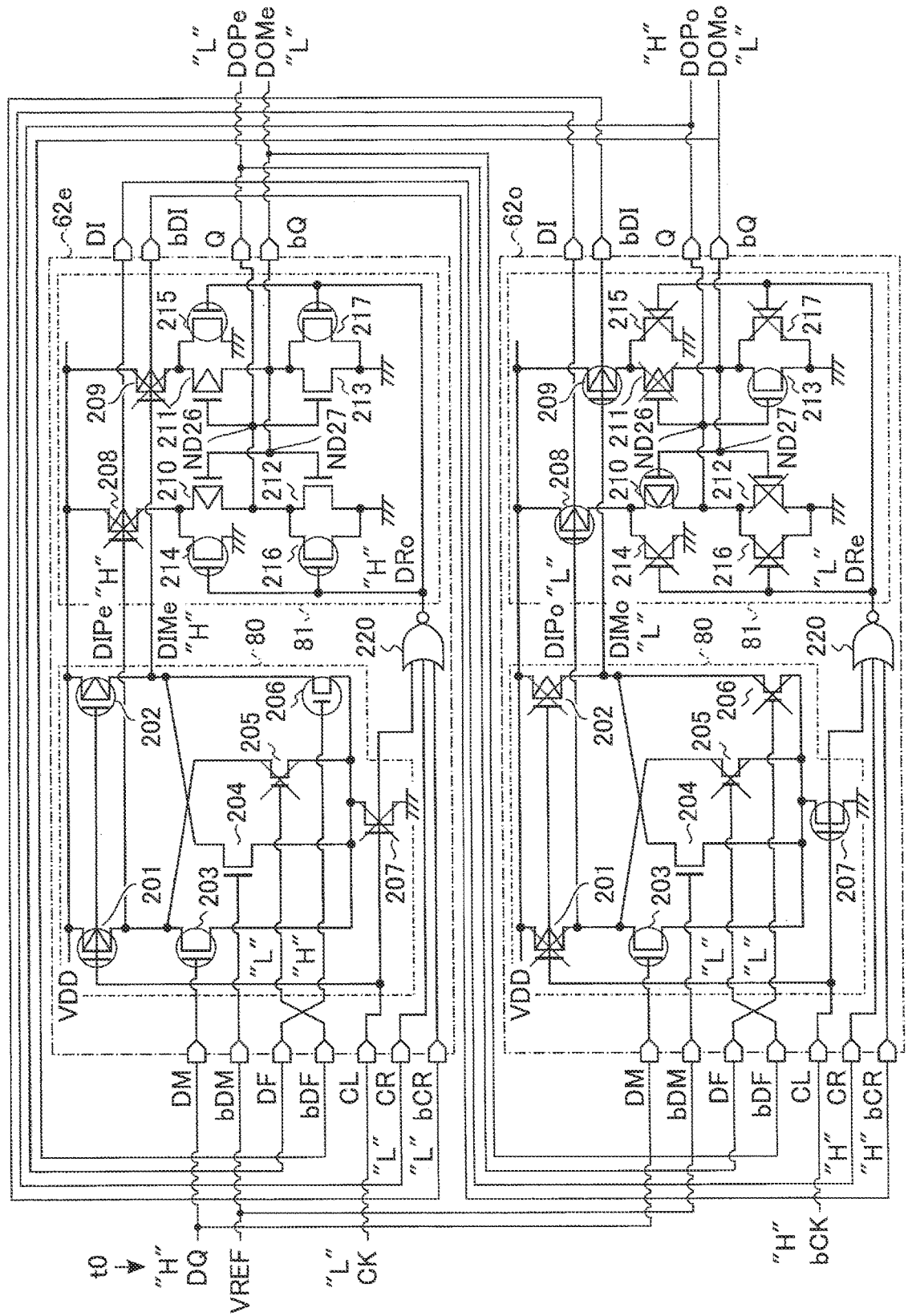
FIG. 28 is a state diagram of the DFE circuit 50 at time t0 in the timing chart shown in FIG. 27.

As shown in FIG. 28, since the signal DQ is in "H" level, the transistors 203 of the amplifiers 62e and 62o are set in the ON state. The transistors 204 of the amplifiers 62e and 62o are set in a relatively weak ON state clamped by the voltage VREF.

The signal DOPo in "H" level is input to the terminal DF of the amplifier 62e. Accordingly, the transistor 206 is set in the ON state. The signal DOMo in "L" level is input to the terminal bDF of the amplifier 62e. Accordingly, the transistor 205 is set in the OFF state. Hence, in the amplifier 62e, the voltage VREF rises. Since the signal CK is in "L" level, the transistors 201 and 202 of the amplifier 62e are set in the ON state, and the transistor 207 is set in the OFF state. Accordingly, the input unit 80 outputs the signals DIPe and DIMe in "H" level from the terminals DI and bDI, respectively. To the NOR circuit 220 of the amplifier 62e, the signal CK in "L" level is input from the terminal CL, the signal DIPo in "L" level is input from the terminal CR, and the signal DIMo in "L" level is input from the terminal bCR. Accordingly, the NOR circuit 220 outputs the signal DRo in "H" level. In the latch unit 81, the transistors 214 to 217 are set in the ON state. With this, the latch unit 81 is set in the reset state. Further, the signals DIPe and DIMe in "H" level are input to the latch unit 81. Accordingly, the transistors 208 and 209 are set in the OFF state. The nodes ND26 and ND27 of the latch unit 81 are discharged. Therefore, the latch unit 81 outputs the signals DOPe and DOMe in "L" level from the terminals Q and bQ, respectively.

The signal DOPe in "L" level is input to the terminal DF of the amplifier 62o. Accordingly, the transistor 206 is set in the OFF state. The signal DOMe in "L" level is input to the terminal bDF of the amplifier 62o. Accordingly, the transistor 205 is set in the OFF state. Since the signal bCK is in "H" level, the transistors 201 and 202 of the amplifier 62o are set in the OFF state, and the transistor 207 is set in the ON state. Accordingly, the input unit 80 outputs the signals DIPo and DIMo in "L" level from the terminals DI and bDI, respectively. To the NOR circuit 220 of the amplifier 62o, the signal bCK in "H" level is input from the terminal CL, the signal DIPe in "H" level is input from the terminal CR, and the signal DIMe in "H" level is input from the terminal bCR. Accordingly, the NOR circuit 220 outputs the signal DRe in "L" level. In the latch unit 81, the transistors 214 to 217 are set in the OFF state. With this, the latch circuit DL of the latch unit 81 is set in the latch state. Further, the signals DIPo and DIMo in "L" level are input to the latch unit 81. Accordingly, the transistors 208 and 209 are set in the ON state. For example, if the signal DQ is in "H" level, the latch unit 81 outputs the signal DOPo in "H" level from the terminal Q, and outputs the signal DOMe in "L" level from the terminal bQ.

<Time t1>

As shown in FIG. 27, for example, assume that even-numbered bit data V0 of the signal DQ is in "H" level. At time t1, the signal CK rises from "L" level to "H" level, and the signal bCK falls from "H" level to "L" level. Based on the rising of the signal CK, the amplifier 62e is set in the latch state ("lat"). Based on the even-numbered bit data V0, the signals DIPe, DIMe, DOPe, and DOMe of the amplifier 62e start to transition. In the amplifier 62o, based on the falling of the signal bCK, the signals DIPo and DIMo are set in "H" level.

Figure 29:
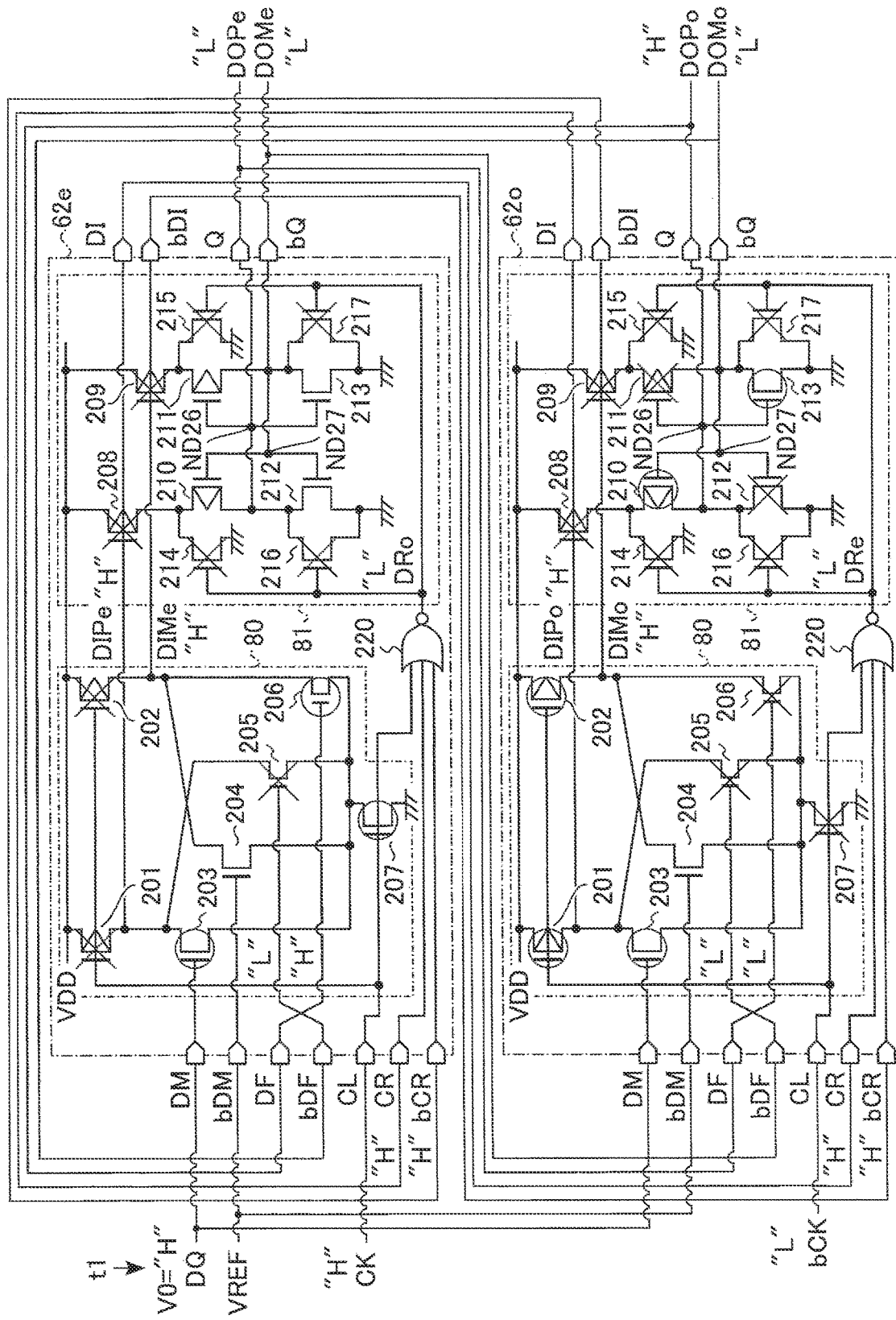
FIG. 29 is a state diagram of the DFE circuit 50 at time t1 in the timing chart shown in FIG. 27.

As shown in FIG. 29, since the even-numbered bit data V0 of the signal DQ is in "H" level, the transistors 203 of the amplifiers 62e and 62o are set in the ON state.

The signal CK in "H" level is input to the amplifier 62e. Accordingly, the transistors 201 and 202 of the amplifier 62e are set in the OFF state, and the transistor 207 is set in the ON state. The signals DIPe and DIMe start to transition from "H" level to "L" level. To the NOR circuit 220 of the amplifier 62e, the signal CK in "H" level is input from the terminal CL, the signal DIPo in "H" level is input from the terminal CR, and the signal DIMo in "H" level is input from the terminal bCR. Accordingly, the NOR circuit 220 outputs the signal DRo in "L" level. In the latch unit 81, the transistors 214 to 217 are set in the OFF state. With this, the latch circuit DL of the latch unit 81 is set in the latch state. Further, the signals DIPe and DIMe in "H" level are input to the latch unit 81. Accordingly, the transistors 208 and 209 are set in the OFF state. Therefore, continuously from time T0, the latch unit 81 outputs the signals DOPe and DOMe in "L" level from the terminals Q and bQ, respectively.

The signal bCK in "L" level is input to the amplifier 62o. Accordingly, the transistors 201 and 202 of the amplifier 62o are set in the ON state, and the transistor 207 is set in the OFF state. The input unit 80 outputs the signals DIPo and DIMo in "H" level. To the NOR circuit 220 of the amplifier 62o, the signal bCK in "L" level is input from the terminal CL, the signal DIPe in "H" level is input from the terminal CR, and the signal DIMe in "H" level is input from the terminal bCR. Therefore, the NOR circuit 220 outputs the signal DRe in "L" level. Further, the signals DIPo and DIMo in "H" level are input to the latch unit 81. Accordingly, the transistors 208 and 209 are set in the OFF state. Since the latch unit 81 maintains the latch state, it outputs the signal DOPo in "H" level from the terminal Q, and outputs the signal DOMo in "L" level from the terminal bQ.

<Time t2>

As shown in FIG. 27, at time t2, based on the voltage difference between the signal DIPe and the signal DIMe of the amplifier 62e, that is, the difference in transition speed from "H" level to "L" level, the logic levels of the signals DOPe and DOMe are determined. In other words, the logic level of the even-numbered bit data V0 is determined. The amplifier 62e outputs the signal DOPe in "H" level and the signal DOMe in "L" level. In the amplifier 62o, the signal DRe is set in "H" level. With this, the reset operation is started in the amplifier 62o.

Figure 30:
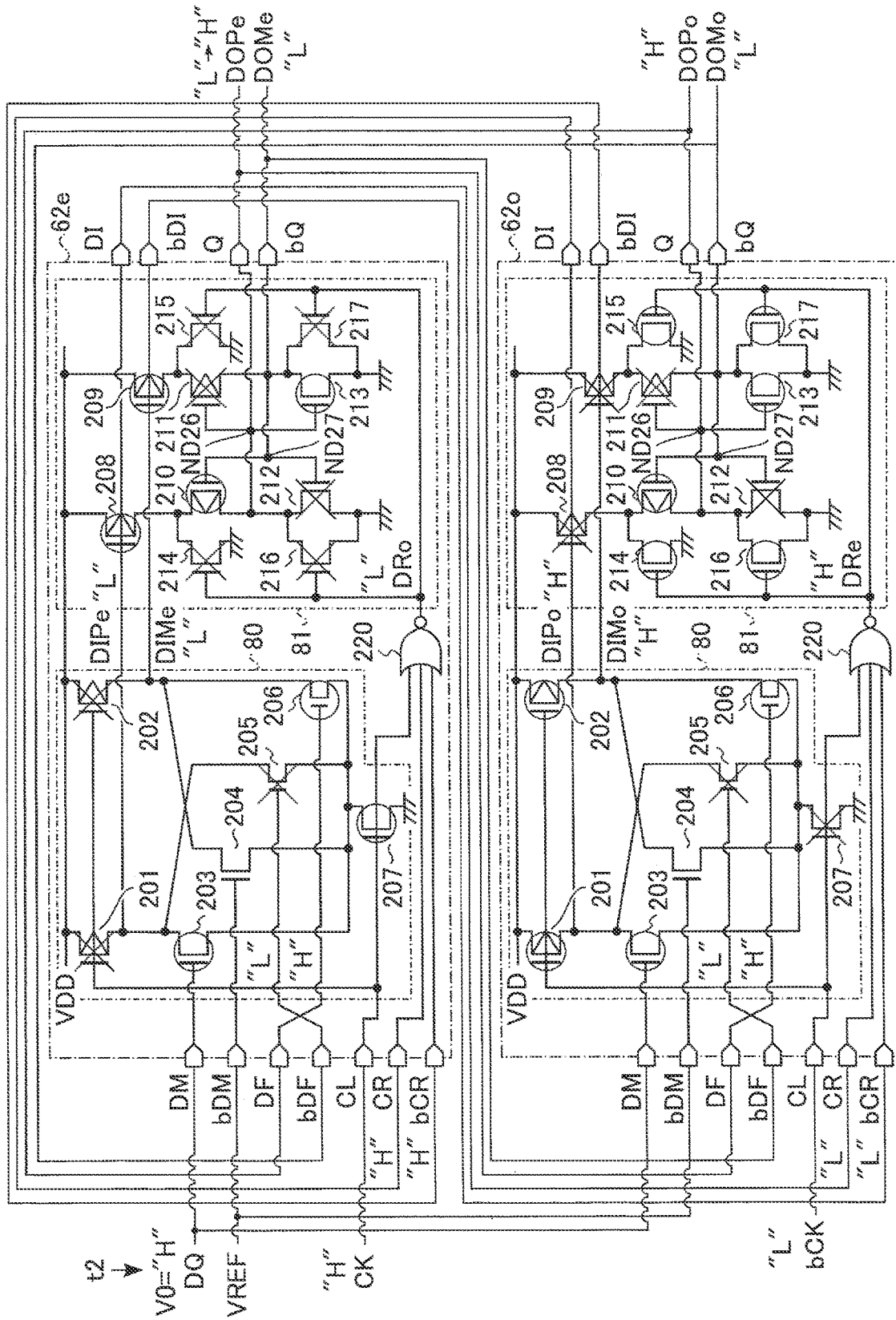
FIG. 30 is a state diagram of the DFE circuit 50 at time t2 in the timing chart shown in FIG. 27.

As shown in FIG. 30, in the amplifier 62e, the signal DIPe is made to transition to "L" level before the signal DIMe.

Therefore, the transistor 208 is set in the ON state before the transistor 209. As a result, in the latch unit 81, the node ND26 is set in "H" level, and the node ND27 is set in "L" level. The signal DOPe is made to transition from "L" level to "H" level, and the signal DOMe is maintained in "L" level. In other words, as a result of taking in the even-numbered bit data V0 in "H" level, the amplifier 62e outputs the signal DOPe in "H" level and the signal DOMe in "L" level.

The result of taking in the even-numbered bit data V0 by the amplifier 62e is fed back to the amplifier 62o. More specifically, the signal DOPe in "H" level is input to the terminal DF of the amplifier 62o. Accordingly, the transistor 206 is set in the ON state. The signal DOMe in "L" level is input to the terminal bDF of the amplifier 62o. Accordingly, the transistor 205 is set in the OFF state. Hence, in the amplifier 62o, the voltage VREF rises. The signals bCK, DIPe, and DIMe in "L" level are input to the NOR circuit 220 of the amplifier 62o. As a result, the NOR circuit 220 of the amplifier 62o outputs the signal DRe in "H" level. In the latch unit 81, the transistors 214 to 217 are set in the ON state. The amplifier 62o starts the reset operation of the latch circuit DL. That is, it is started to discharge the node ND26 and the node ND27. The NOR circuit 220 of the amplifier 62o can output the signal in "H" level before the logic levels of the signals DOPe and DOMe are determined in the amplifier 62e. In other words, the amplifier 62o can start the reset operation before the logic level of the signal DQ is determined in the amplifier 62e. However, at time t2, since the reset operation of the latch circuit DL is incomplete, the signal DOPo is maintained in "H" level, and the signal DOMo is maintained in "L" level.

<Time t3>

As shown in FIG. 27, for example, assume that odd-numbered bit data V1 of the signal DQ is in "L" level. At time t3, in the amplifier 62o, the reset operation of the latch circuit DL is complete, and the latch circuit DL is set in the reset state ("rst"). Therefore, the signals DOPo and DOMo are set in "L" level.

Figure 31:
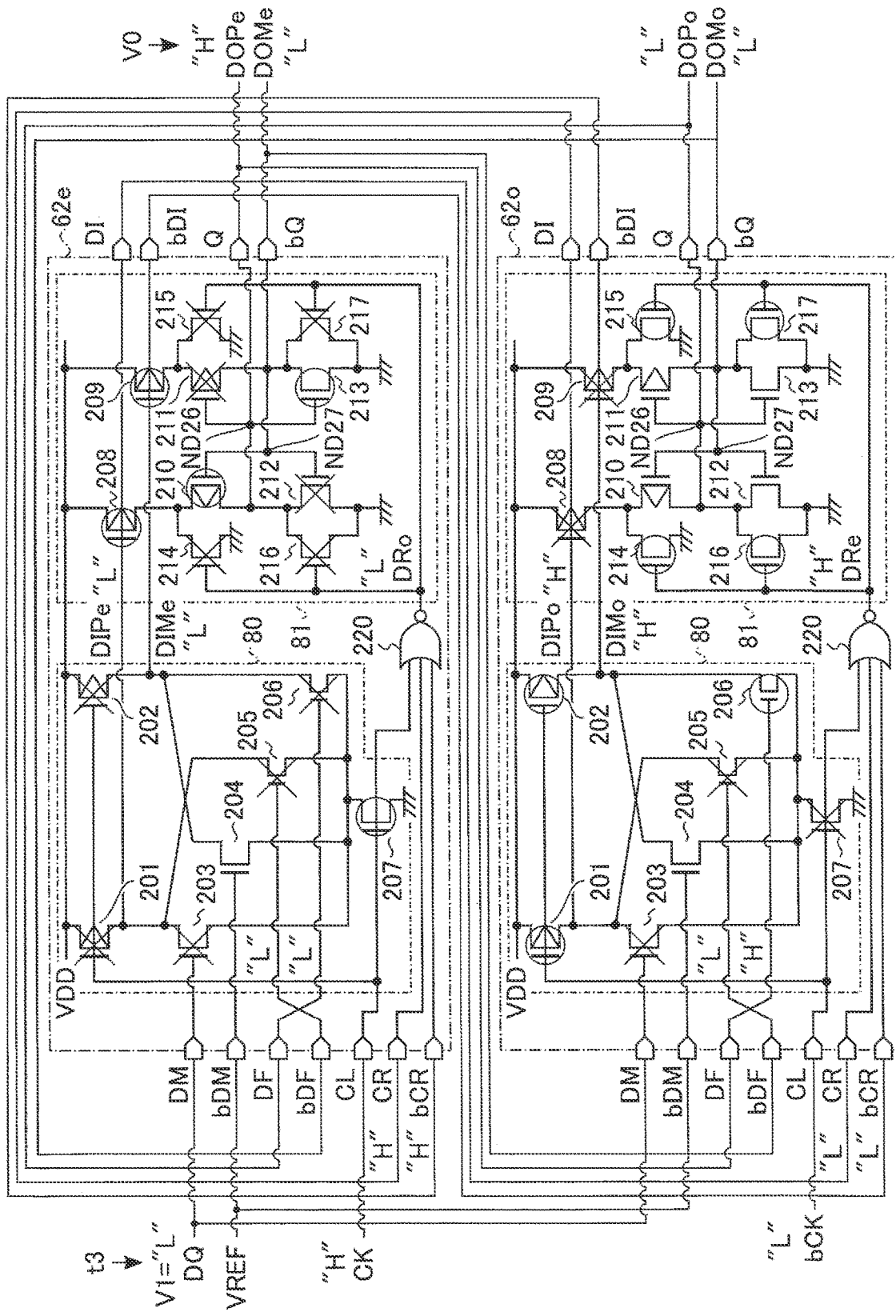
FIG. 31 is a state diagram of the DFE circuit 50 at time t3 in the timing chart shown in FIG. 27.

As shown in FIG. 31, since the odd-numbered bit data V1 of the signal DQ is in "L" level, the transistors 203 of the amplifiers 62e and 62o are set in the OFF state.

In the amplifier 62o, the reset operation of the latch circuit DL is complete, and the node ND26 and the node ND27 are set in "L" level. That is, the amplifier 62o outputs the signals DOPo and DOMo in "L" level.

The signal DOPo in "L" level is input to the terminal DF of the amplifier 62e. Accordingly, the transistor 206 is set in the OFF state. The signal DOMo in "L" level is input to the terminal bDF of the amplifier 62e. Accordingly, the transistor 205 is set in the OFF state. The signals CK, DIPo, and DIMo in "H" level are input to the NOR circuit 220 of the amplifier 62e. The NOR circuit 220 of the amplifier 62e continues to output the signal DRo in "L" level.

<Time t4>

As shown in FIG. 27, at time t4, the signal CK falls from "H" level to "L" level, and the signal bCK rises from "L" level to "H" level. In the amplifier 62e, based on the falling of the signal CK, the signals DIPe and DIMe are set in "H" level. Based on the rising of the signal bCK, the amplifier 62o is set in the latch state ("lat"). Based on the odd-numbered bit data V1, the signals DIPo, DIMo, DOPo, and DOMo of the amplifier 62o start to transition. In the amplifier 62e, based on the falling of the signal CK, the signals DIPe and DIMe are set in "H" level.

Figure 32:
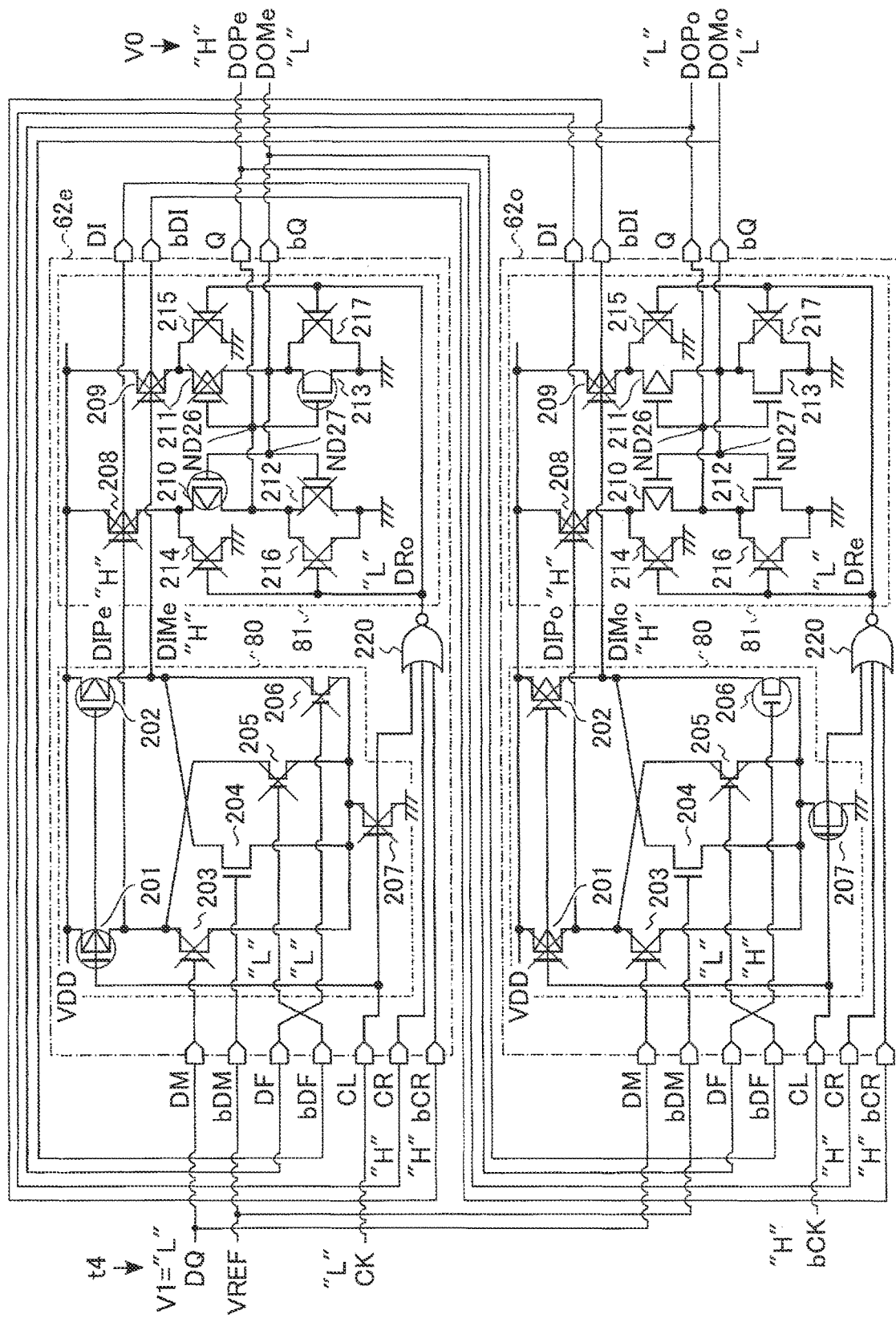
FIG. 32 is a state diagram of the DFE circuit 50 at time t4 in the timing chart shown in FIG. 27.

As shown in FIG. 32, the signal CK in "L" level is input to the amplifier 62e. Accordingly, the transistors 201 and 202 of the amplifier 62e are set in the ON state, and the transistor 207 is set in the OFF state. The input unit 80 outputs the signals DIPe and DIMe in "H" level. The signal CK in "L" level and the signals DIPo and DIMo in "H" level are input to the NOR circuit 220 of the amplifier 62e. Accordingly, the NOR circuit 220 of the amplifier 62e continues to output the signal DRo in "L" level. Further, in the latch unit 81, the signals DIPe and DIMe in "H" level are input. Accordingly, the transistors 208 and 209 are set in the OFF state. Since the latch unit 81 maintains the latch state, it outputs the signal DOPe in "H" level from the terminal Q, and outputs the signal DOMe in "L" level from the terminal bQ.

The signal bCK in "H" level is input to the amplifier 62o. Accordingly, the transistors 201 and 202 of the amplifier 62o are set in the OFF state, and the transistor 207 is set in the ON state. The signals DIPo and DIMo start to transition from "H" level to "L" level. The signals bCK, DIPe, and DIMe in "H" level are input to the NOR circuit 220 of the amplifier 62o. Accordingly, the NOR circuit 220 outputs the signal DRe in "L" level. In the latch unit 81, the transistors 214 to 217 are set in the OFF state. With this, the latch circuit DL of the latch unit 81 is set in the latch state. Further, the signals DIPo an DIMo in "H" level are input to the latch unit 81. Accordingly, the transistors 208 and 209 are set in the OFF state. Therefore, the latch unit 81 continues to output the signals DOPo and DOMo in "L" level from the terminals Q and bQ, respectively.

<Time t5>

As shown in FIG. 27, at time t5, based on the voltage difference between the signal DIPo and the signal DIMo of the amplifier 62o, that is, the difference in transition speed from "H" level to "L" level, the logic levels of the signals DOPo and DOMo are determined. In other words, the logic level of the odd-numbered bit data V1 is determined. The signal DOPo is set in "L" level, and the signal DOMo is set in "H" level. Accordingly, in the amplifier 62e, the signal DRo is set in "H" level. With this, the reset operation is started in the amplifier 62e.

Figure 33:
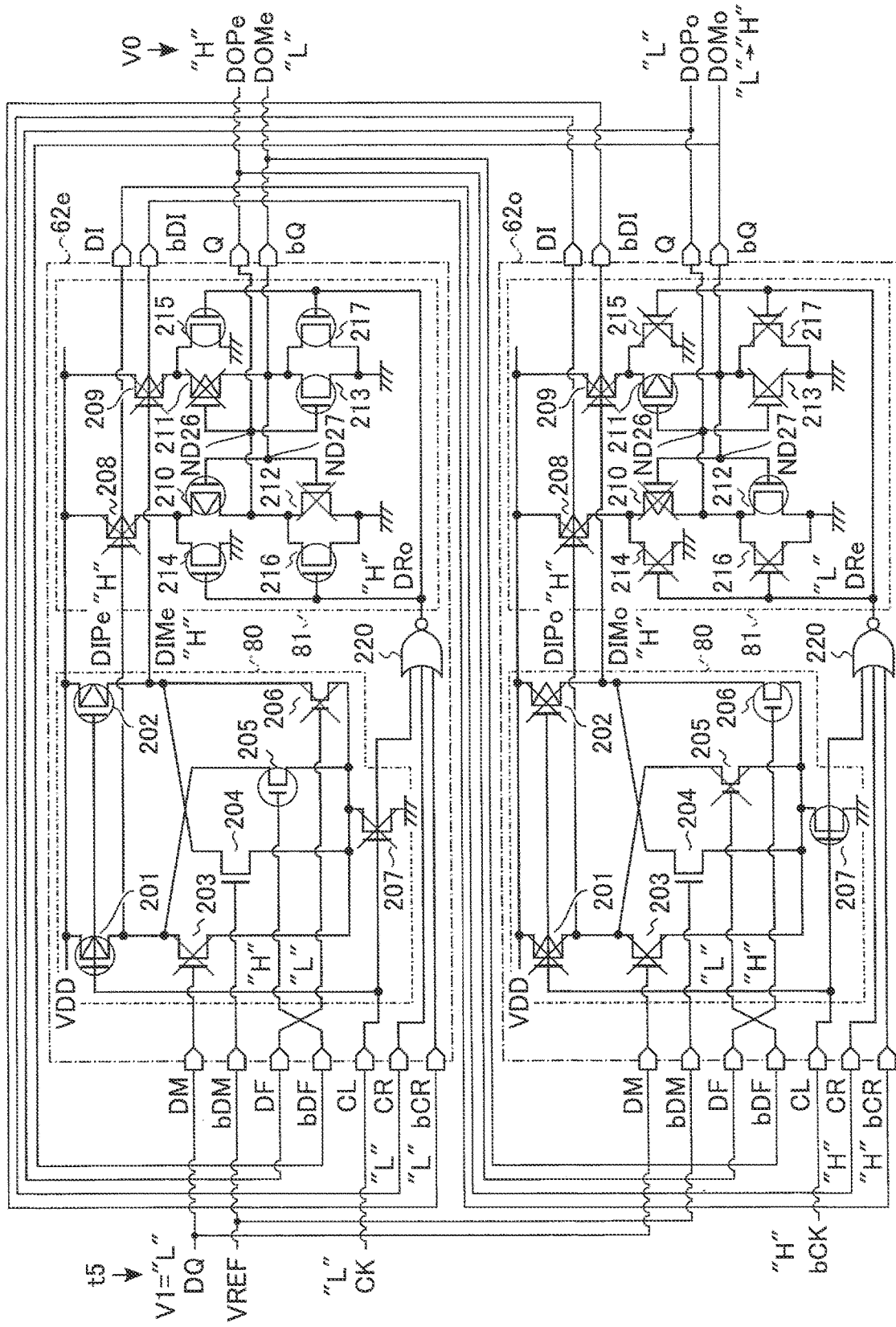
FIG. 33 is a state diagram of the DFE circuit 50 at time t5 in the timing chart shown in FIG. 27.

As shown in FIG. 33, in the amplifier 62o, the signal DIMo is made to transition to "L" level before the signal DIPo. Therefore, the transistor 209 is set in the ON state before the transistor 208. As a result, in the latch unit 81, the node ND26 is set in "L" level, and the node ND27 is set in "H" level. As a result, the signal DOPo is maintained in "L" level, and the signal DOMo is made to transition from "L" level to "H" level. In other words, as a result of taking in the odd-numbered bit data V1 in "L" level, the amplifier 62o outputs the signal DOPo in "L" level and the signal DOMo in "H" level.

The result of taking in the odd-numbered bit data V1 by the amplifier 62o is fed back to the amplifier 62e. More specifically, the signal DOPo in "L" level is input to the terminal DF of the amplifier 62e. Accordingly, the transistor 206 is set in the OFF state. The signal DOMo in "H" level is input to the terminal bDF of the amplifier 62e. Accordingly, the transistor 205 is set in the ON state. Hence, in the amplifier 62e, the voltage VREF drops. The signals CK, DIPo, and DIMo in "L" level are input to the NOR circuit 220 of the amplifier 62e. As a result, the NOR circuit 220 of the amplifier 62e outputs the signal DRo in "H" level. In the latch unit 81, the transistors 214 to 217 are set in the ON state. The amplifier 62e starts the reset operation of the latch circuit DL. That is, the NOR circuit 220 of the amplifier 62e can output the signal in "H" level before the logic levels of the signals DOPo and DOMo are determined in the amplifier 62o. In other words, the amplifier 62e can start the reset operation before the logic level of the signal DQ is determined in the amplifier 62o. However, at time t5, since the reset operation of the latch circuit DL is incomplete, the signal DOPe is maintained in "H" level, and the signal DOMe is maintained in "L" level.

<Time t6>

As shown in FIG. 27, for example, assume that even-numbered bit data V2 of the signal DQ is in "L" level. At time t6, in the amplifier 62e, the reset operation of the latch circuit DL is complete, and the latch circuit DL is set in the reset state ("rst"). Therefore, the signals DOPe and DOMe are set in "L" level.

Figure 34:
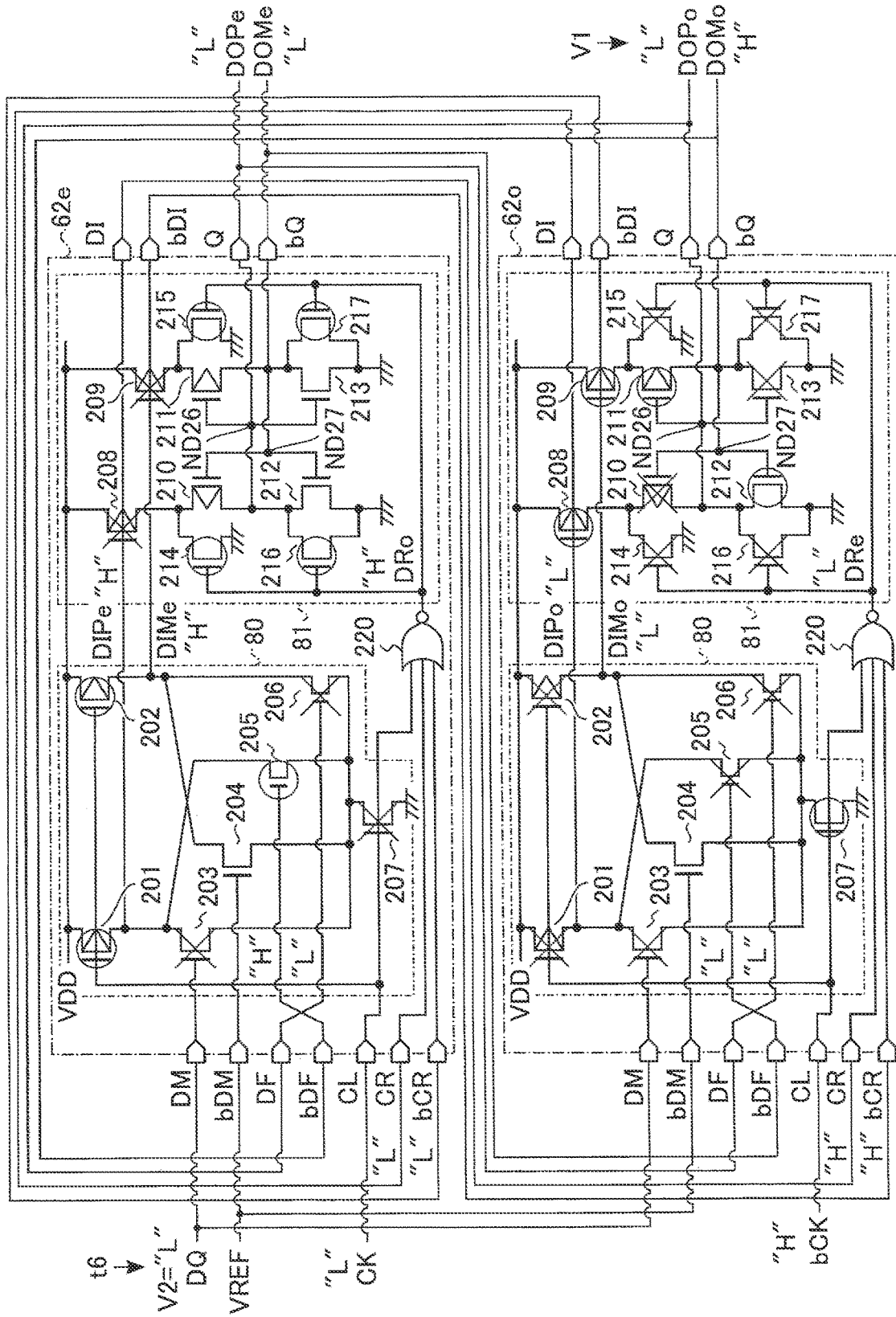
FIG. 34 is a state diagram of the DFE circuit 50 at time t6 in the timing chart shown in FIG. 27.

As shown in FIG. 34, since the even-numbered bit data V2 of the signal DQ is in "L" level, the transistors 203 of the amplifiers 62e and 62o are set in the OFF state.

In the amplifier 62e, the reset operation of the latch circuit DL is complete, and the node ND26 and the node ND27 are set in "L" level. That is, the amplifier 62e outputs the signals DOPe and DOMe in "L" level.

The signal DOPe in "L" level is input to the terminal DF of the amplifier 62o. Accordingly, the transistor 206 is set in the OFF state. The signal DOMe in "L" level is input to the terminal bDF of the amplifier 62o. Accordingly, the transistor 205 is set in the OFF state. The signals bCK, DIPe, and DIMe in "H" level are input to the NOR circuit 220 of the amplifier 62o. The NOR circuit 220 of the amplifier 62o continues to output the signal DRo in "L" level.

<Time t7>

As shown in FIG. 27, at time t7, the signal CK rises from "L" level to "H" level, and the signal bCK falls from "H" level to "L" level. Based on the rising of the signal CK, the amplifier 62e is set in the latch state ("lat"). Based on the even-numbered bit data V2, the signals DIPe, DIMe, DOPe, and DOMe of the amplifier 62e start to transition. In the amplifier 62o, based on the falling of the signal bCK, the signals DIPo and DIMo are set in "H" level.

Figure 35:
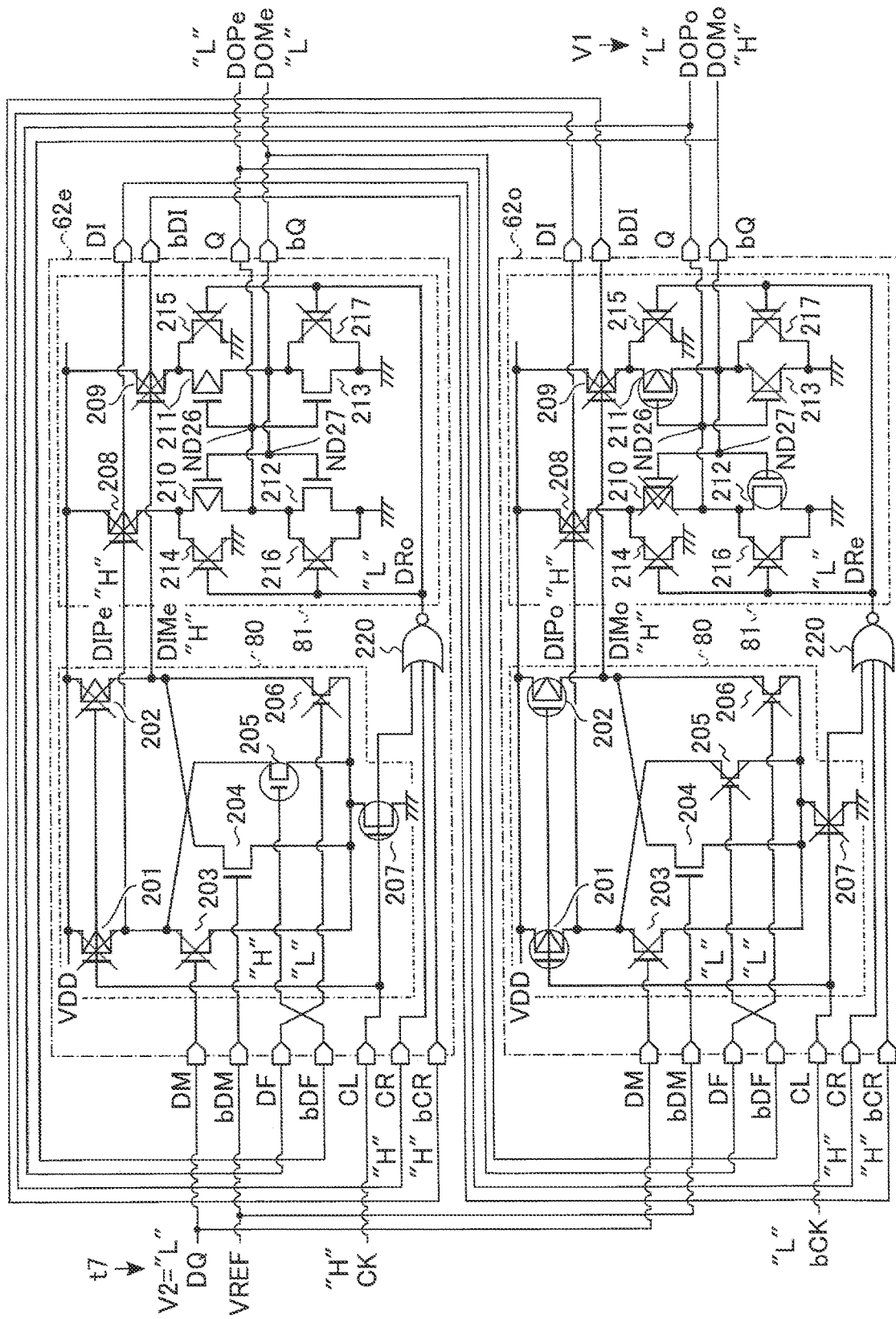
FIG. 35 is a state diagram of the DFE circuit 50 at time t7 in the timing chart shown in FIG. 27.

As shown in FIG. 35, the signal CK in "H" level is input to the amplifier 62e. Accordingly, the transistors 201 and 202 of the amplifier 62e are set in the OFF state, and the transistor 207 is set in the ON state. The signals DIPe and DIMe start to transition from "H" level to "L" level. The signals CK, DIPo, and DIMo in "H" level are input to the NOR circuit 220 of the amplifier 62e. Accordingly, the NOR circuit 220 outputs the signal DRo in "L" level. In the latch unit 81, the transistors 214 to 217 are set in the OFF state. With this, the latch circuit DL of the latch unit 81 is set in the latch state. Further, the signals DIPe and DIMe in "H" level are input to the latch unit 81. Accordingly, the transistors 208 and 209 are set in the OFF state. Continuously from time t6, the latch unit 81 outputs the signal DOPe and DOMe in "L" level from the terminals Q and bQ, respectively.

The signal bCK in "L" level is input to the amplifier 62o. Accordingly, the transistors 201 and 202 of the amplifier 62o are set in the ON state, and the transistor 207 is set in the OFF state. The input unit 80 outputs the signals DIPo and DIMo in "H" level. The signal bCK in "L" level and the signals DIPe and DIMe in "H" level are input to the NOR circuit 220 of the amplifier 62o. Accordingly, the NOR circuit 220 outputs the signal DRe in "L" level. Further, the signals DIPo an DIMo in "H" level are input to the latch unit 81. Accordingly, the transistors 208 and 209 are set in the OFF state. Since the latch unit 81 maintains the latch state, it outputs the signal DOPo in "L" level from the terminal Q, and outputs the signal DOMo in "H" level from the terminal bQ.

<Time t8>

As shown in FIG. 27, at time t8, based on the voltage difference between the signal DIPe and the signal DIMe of the amplifier 62e, that is, the difference in transition speed from "H" level to "L" level, the logic levels of the signals DOPe and DOMe are determined. In other words, the logic level of the even-numbered bit data V2 is determined. The signal DOPe is set in "L" level, and the signal DOMe is set in "H" level. In the amplifier 62o, the signal DRe is set in "H" level. With this, the reset operation is started in the amplifier 62o.

Figure 36:
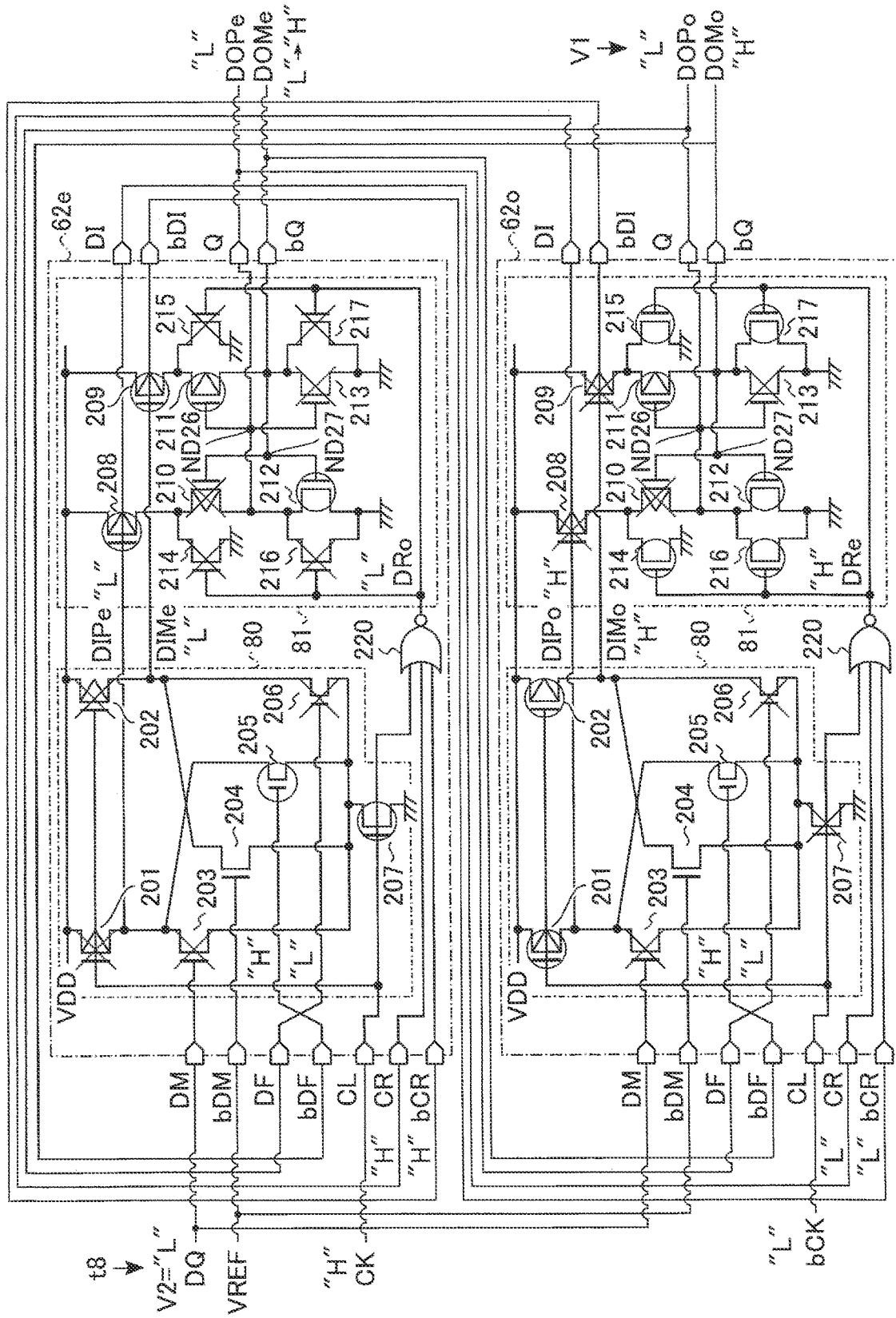
FIG. 36 is a state diagram of the DFE circuit 50 at time t8 in the timing chart shown in FIG. 27.

As shown in FIG. 36, in the amplifier 62e, the signal DIMe is made to transition to "L" level before the signal DIPe. Therefore, the transistor 209 is set in the ON state before the transistor 208. As a result, in the latch unit 81, the node ND26 is set in "L" level, and the node ND27 is set in "H" level. The signal DOPe is maintained in "L" level, and the signal DOMe is made to transition from "L" level to "H" level. In other words, as a result of taking in the even-numbered bit data V2 in "L" level, the amplifier 62e outputs the signal DOPe in "L" level and the signal DOMe in "H" level.

The result of taking in the even-numbered bit data V2 by the amplifier 62e is fed back to the amplifier 62o. More specifically, the signal DOPe in "L" level is input to the terminal DF of the amplifier 62o. Accordingly, the transistor 206 is set in the OFF state. The signal DOMe in "H" level is input to the terminal bDF of the amplifier 62o. Accordingly, the transistor 205 is set in the ON state. Hence, in the amplifier 62o, the voltage VREF drops. The signals bCK, DIPe, and DIMe in "L" level are input to the NOR circuit 220 of the amplifier 62o. As a result, the NOR circuit 220 of the amplifier 62o outputs the signal DRe in "H" level. In the latch unit 81, the transistors 214 to 217 are set in the ON state. The amplifier 62o starts the reset operation of the latch circuit DL. However, at time t8, since the reset operation of the latch circuit DL is incomplete, the signal DOPo is maintained in "L" level, and the signal DOMo is maintained in "H" level. Therefore, in the amplifier 62e, the signal DRo is maintained in "L" level.

<Time t9>

As shown in FIG. 27, for example, assume that odd-numbered bit data V3 of the signal DQ is in "H" level. At time t9, in the amplifier 62o, the reset operation of the latch circuit DL is complete, and the latch circuit DL is set in the reset state ("rst"). Therefore, the signals DOPo and DOMo are set in "L" level.

Figure 37:
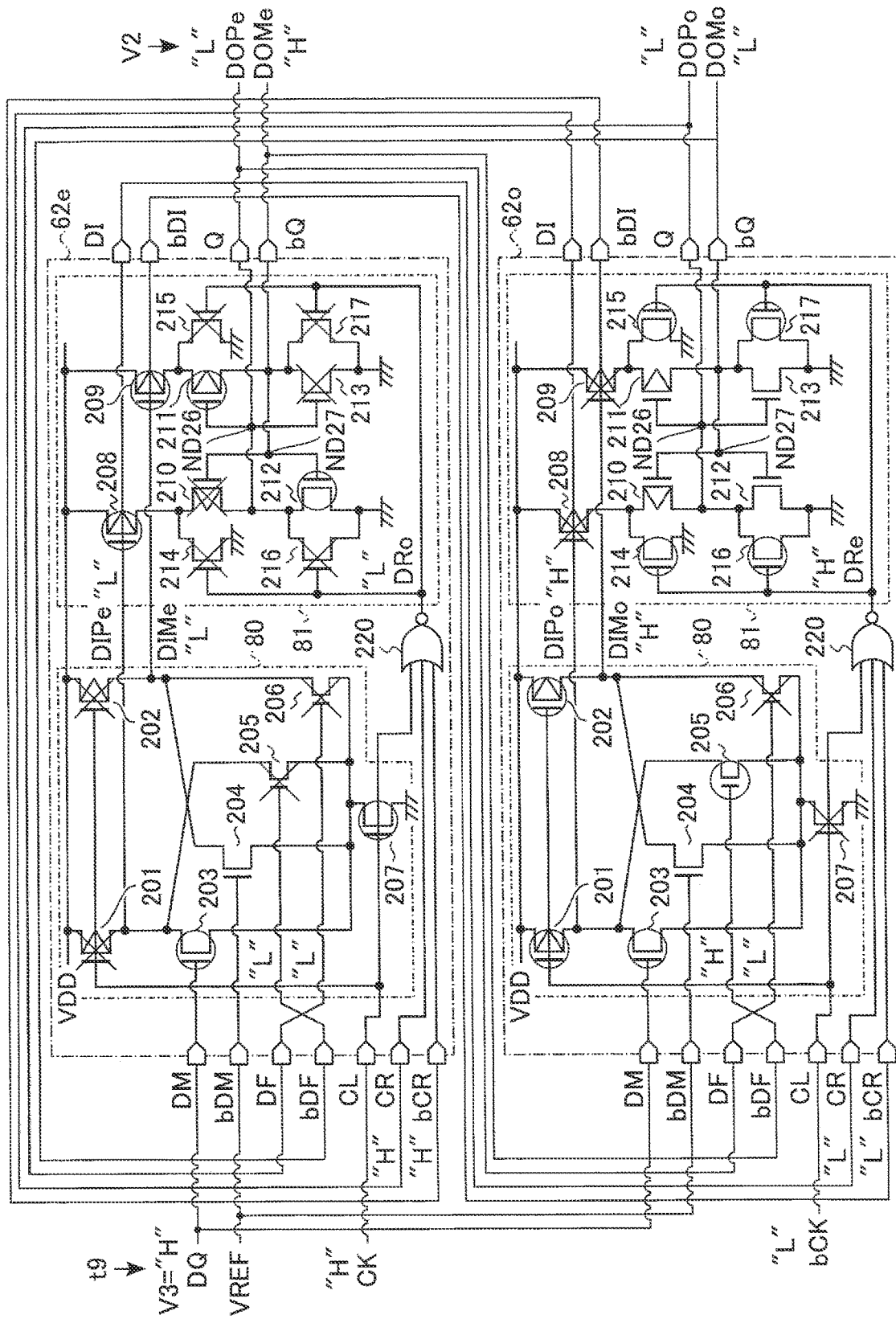
FIG. 37 is a state diagram of the DFE circuit 50 at time t9 in the timing chart shown in FIG. 27.

As shown in FIG. 37, since the odd-numbered bit data V3 of the signal DQ is in "H" level, the transistors 203 of the amplifiers 62e and 62o are set in the ON state.

In the amplifier 62o, the reset operation of the latch circuit DL is complete, and the node ND26 and the node ND27 are set in "L" level. That is, the amplifier 62o outputs the signals DOPo and DOMo in "L" level.

The signal DOPo in "L" level is input to the terminal DF of the amplifier 62e. Accordingly, the transistor 206 is set in the OFF state. The signal DOMo in "L" level is input to the terminal bDF of the amplifier 62e. Accordingly, the transistor 205 is set in the OFF state. The signals CK, DIPo, and DIMo in "H" level are input to the NOR circuit 220 of the amplifier 62e. The NOR circuit 220 of the amplifier 62e continues to output the signal DRo in "L" level.

<Time t10>

As shown in FIG. 27, at time t10, the signal CK falls from "H" level to "L" level, and the signal bCK rises from "L" level to "H" level. In the amplifier 62e, based on the falling of the signal CK, the signals DIPe and DIMe are set in "H" level. Based on the rising of the signal bCK, the amplifier 62o is set in the latch state ("lat"). Based on the odd-numbered bit data V3, the signals DIPo, DIMo, DOPo, and DOMo of the amplifier 62o start to transition. In the amplifier 62e, based on the falling of the signal CK, the signals DIPe and DIMe are set in "H" level.

As shown in FIG. 38, the signal CK in "L" level is input to the amplifier 62e. Accordingly, the transistors 201 and 202 of the amplifier 62e are set in the ON state, and the transistor 207 is set in the OFF state. The input unit 80 outputs the signals DIPe and DIMe in "H" level. The signal CK in "L" level and the signals DIPo and DIMo in "H" level are input to the NOR circuit 220 of the amplifier 62e. Accordingly, the NOR circuit 220 continues to output the signal DRo in "L" level. Further, in the latch unit 81, the signals DIPe and DIMe in "H" level are input. Accordingly, the transistors 208 and 209 are set in the OFF state. Since the latch unit 81 maintains the latch state, it outputs the signal DOPe in "L" level from the terminal Q, and outputs the signal DOMe in "H" level from the terminal bQ.

The signal bCK in "H" level is input to the amplifier 62o. Accordingly, the transistors 201 and 202 of the amplifier 62o are set in the OFF state, and the transistor 207 is set in the ON state. The signals DIPo and DIMo start to transition from "H" level to "L" level. The signals bCK, DIPe, and DIMe in "H" level are input to the NOR circuit 220 of the amplifier 62o. Accordingly, the NOR circuit 220 outputs the signal DRe in "L" level. In the latch unit 81, the transistors 214 to 217 are set in the OFF state. With this, the latch circuit DL of the latch unit 81 is set in the latch state. Further, the signals DIPo an DIMo in "H" level are input to the latch unit 81. Accordingly, the transistors 208 and 209 are set in the OFF state. Therefore, the latch unit 81 continues to output the signals DOPo and DOMo in "L" level from the terminals Q and bQ, respectively.

<Time t11>

As shown in FIG. 27, at time t11, based on the voltage difference between the signal DIPo and the signal DIMo of the amplifier 62o, that is, the difference in transition speed from "H" level to "L" level, the logic levels of the signals DOPo and DOMo are determined. In other words, the logic level of the odd-numbered bit data V3 is determined. The signal DOPo is set in "H" level, and the signal DOMo is set in "L" level. Accordingly, in the amplifier 62e, the signal DRo is set in "L" level. With this, the reset operation is started in the amplifier 62e.

Figure 39:
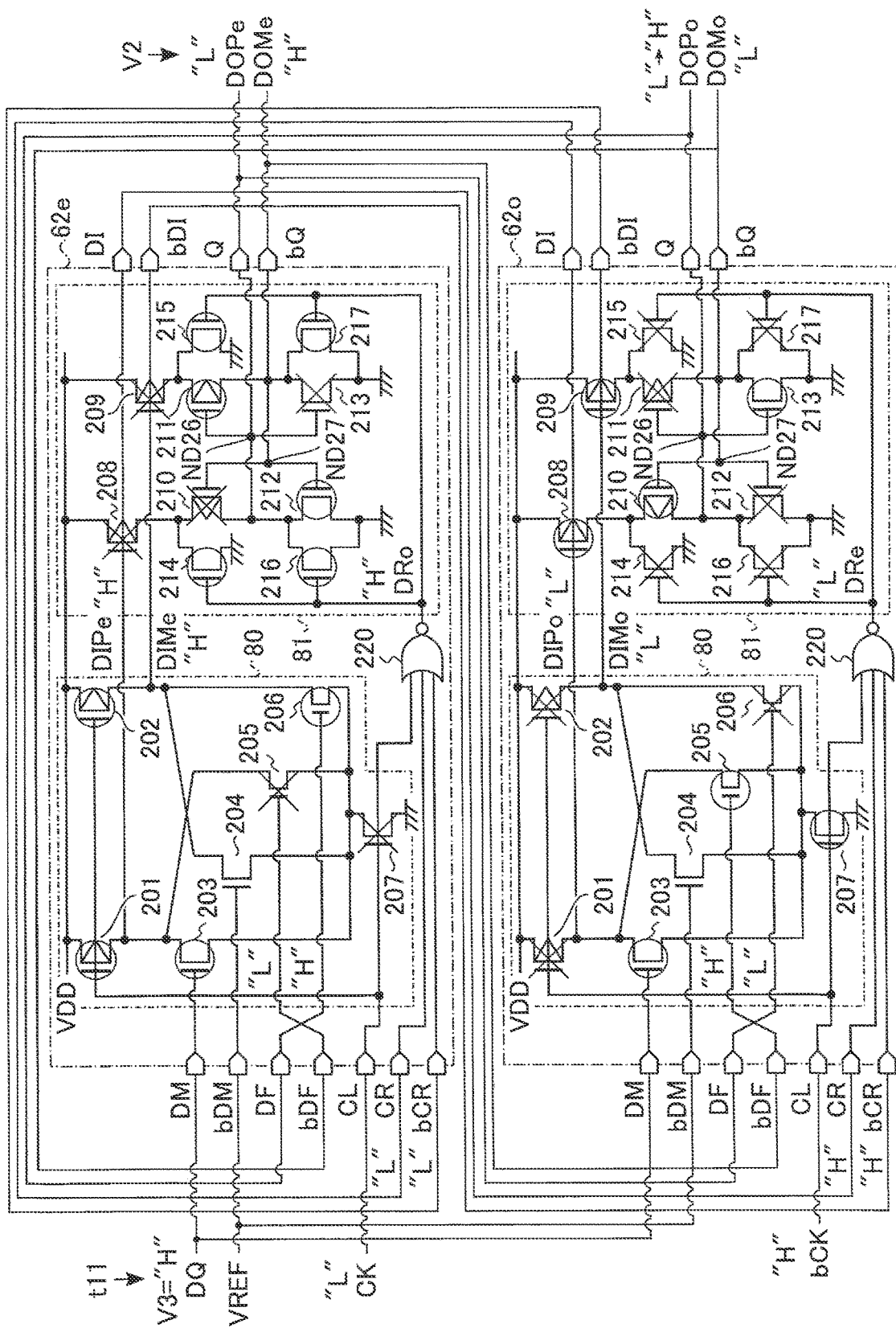
FIG. 39 is a state diagram of the DFE circuit 50 at time t11 in the timing chart shown in FIG. 27.

As shown in FIG. 39, in the amplifier 62o, the signal DIPo is made to transition to "L" level before the signal DIMo. Therefore, the transistor 208 is set in the ON state before the transistor 209. As a result, in the latch unit 81, the node ND26 is set in "H" level, and the node ND27 is set in "L" level. As a result, the signal DOPo is made to transition from "L" level to "H" level, and the signal DOMo is maintained in "L" level. In other words, as a result of taking in the odd-numbered bit data V3 in "H" level, the amplifier 62o outputs the signal DOPo in "H" level and the signal DOMo in "L" level.

The result of taking in the odd-numbered bit data V3 by the amplifier 62o is fed back to the amplifier 62e. More specifically, the signal DOPo in "H" level is input to the terminal DF of the amplifier 62e. Accordingly, the transistor 206 is set in the ON state. The signal DOMo in "L" level is input to the terminal bDF of the amplifier 62e. Accordingly, the transistor 205 is set in the OFF state. Hence, in the amplifier 62e, the voltage VREF rises. The signals CK, DIPo, and DIMo in "L" level are input to the NOR circuit 220 of the amplifier 62e. As a result, the NOR circuit 220 of the amplifier 62e outputs the signal DRo in "H" level. In the latch unit 81, the transistors 214 to 217 are set in the ON state. The amplifier 62e starts the reset operation of the latch circuit DL. However, at time t11, since the reset operation of the latch circuit DL is incomplete, the signal DOPe is maintained in "L" level, and the signal DOMe is maintained in "H" level.

<Time t12>

As shown in FIG. 27, for example, assume that even-numbered bit data V4 of the signal DQ is in "H" level. At time t12, in the amplifier 62e, the reset operation of the latch circuit DL is complete, and the latch circuit DL is set in the reset state ("rst"). Therefore, the signals DOPe and DOMe are set in "L" level.

Figure 40:
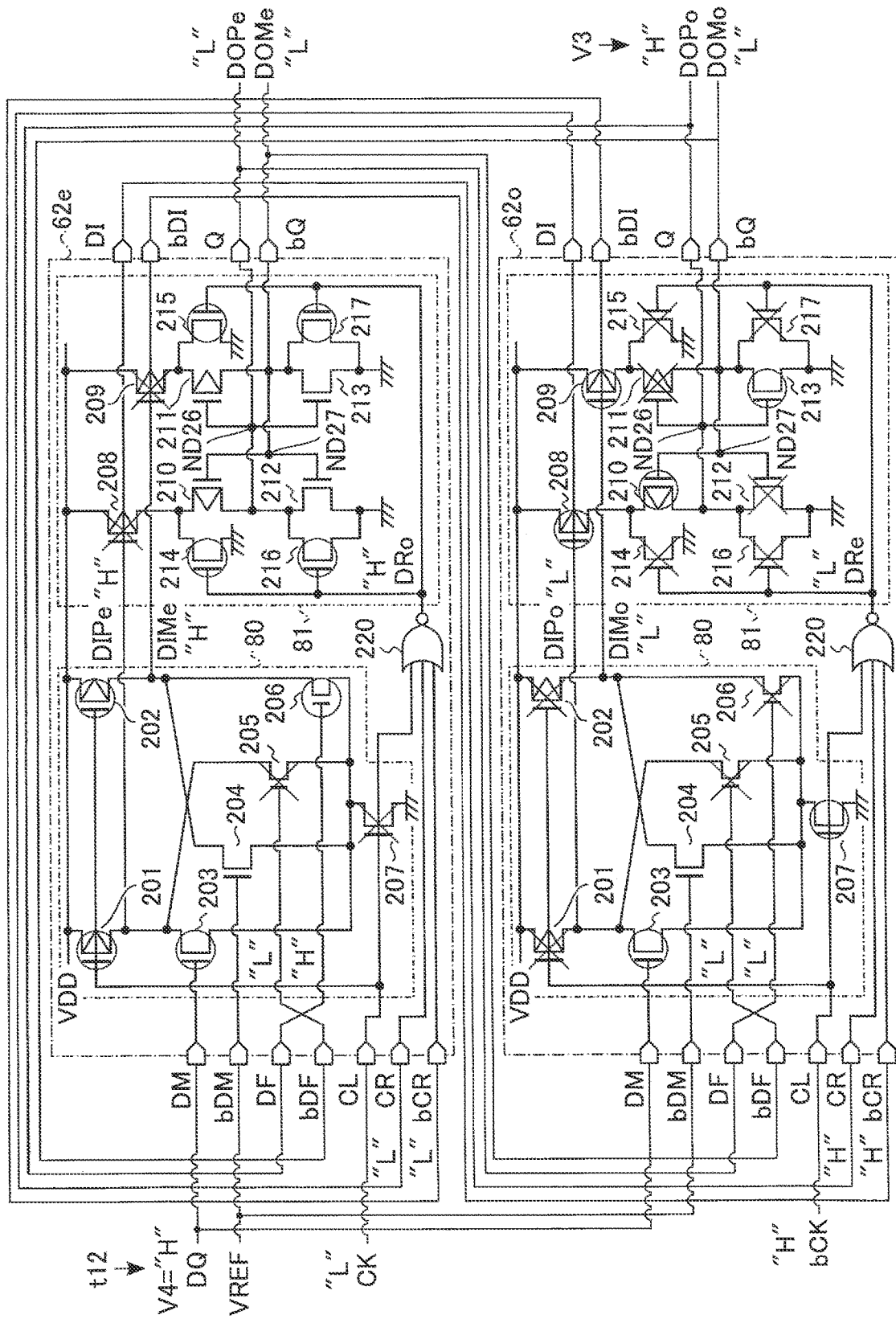
FIG. 40 is a state diagram of the DFE circuit 50 at time t12 in the timing chart shown in FIG. 27.

As shown in FIG. 40, since the even-numbered bit data V4 of the signal DQ is in "H" level, the transistors 203 of the amplifiers 62e and 62o are set in the ON state.

In the amplifier 62e, the reset operation of the latch circuit DL is complete, and the node ND26 and the node ND27 are set in "L" level. That is, the amplifier 62e outputs the signals DOPe and DOMe in "L" level.

The signal DOPe in "L" level is input to the terminal DF of the amplifier 62o. Accordingly, the transistor 206 is set in the OFF state. The signal DOMe in "L" level is input to the terminal bDF of the amplifier 62o. Accordingly, the transistor 205 is set in the OFF state. The signals bCK, DIPe, and DIMe in "H" level are input to the NOR circuit 220 of the amplifier 62o. The NOR circuit 220 of the amplifier 62o continues to output the signal DRe in "L" level.

<Time t13>

As shown in FIG. 27, at time t13, the signal CK rises from "L" level to "H" level, and the signal bCK falls from "H" level to "L" level. Based on the rising of the signal CK, the amplifier 62e is set in the latch state ("lat"). Based on the even-numbered bit data V4, the signals DIPe, DIMe, DOPe, and DOMe of the amplifier 62e start to transition. In the amplifier 62o, based on the falling of the signal bCK, the signals DIPo and DIMo are set in "H" level.

As shown in FIG. 41, the signal CK in "H" level is input to the amplifier 62e. Accordingly, the transistors 201 and 202 of the amplifier 62e are set in the OFF state, and the transistor 207 is set in the ON state. The signals DIPe and DIMe start to transition from "H" level to "L" level. The signals CK, DIPo, and DIMo in "H" level are input to the NOR circuit 220 of the amplifier 62e. Accordingly, the NOR circuit 220 outputs the signal DRo in "L" level. In the latch unit 81, the transistors 214 to 217 are set in the OFF state. With this, the latch circuit DL of the latch unit 81 is set in the latch state. Further, the signals DIPe and DIMe in "H" level are input to the latch unit 81. Accordingly, the transistors 208 and 209 are set in the OFF state. Continuously from time t6, the latch unit 81 outputs the signal DOPe and DOMe in "L" level from the terminals Q and bQ, respectively.

The signal bCK in "L" level is input to the amplifier 62o. Accordingly, the transistors 201 and 202 of the amplifier 62o are set in the ON state, and the transistor 207 is set in the OFF state. The input unit 80 outputs the signals DIPo and DIMo in "H" level. The signal bCK in "L" level and the signals DIPe and DIMe in "H" level are input to the NOR circuit 220 of the amplifier 62o. Accordingly, the NOR circuit 220 outputs the signal DRe in "L" level. Further, the signals DIPo an DIMo in "H" level are input to the latch unit 81. Accordingly, the transistors 208 and 209 are set in the OFF state. Since the latch unit 81 maintains the latch state, it outputs the signal DOPo in "H" level from the terminal Q, and outputs the signal DOMo in "L" level from the terminal bQ.

2.4 Effect According to this Embodiment

With the configurations according to this embodiment, an effect similar to the effect of the first embodiment can be obtained.

Further, with the configurations according to this embodiment, before the logic level of the signal DQ is determined in one of the amplifier 62e and 62o, the reset operation of the latch circuit DL of the other amplifier can be started. Hence, the DFE circuit 50 can further increase the signal reception speed.

2.5 Modifications of Second Embodiment

Next, modifications of the second embodiment will be described. Two examples of the amplifier 62e having the internal configuration different from that of the amplifier 62e described using FIG. 26 of the second embodiment will be described. Note that the description also applies to the amplifier 62o. Differences from the amplifier 62e described using FIG. 26 will be mainly described below.

2.5.1 First Modification

Figure 42:
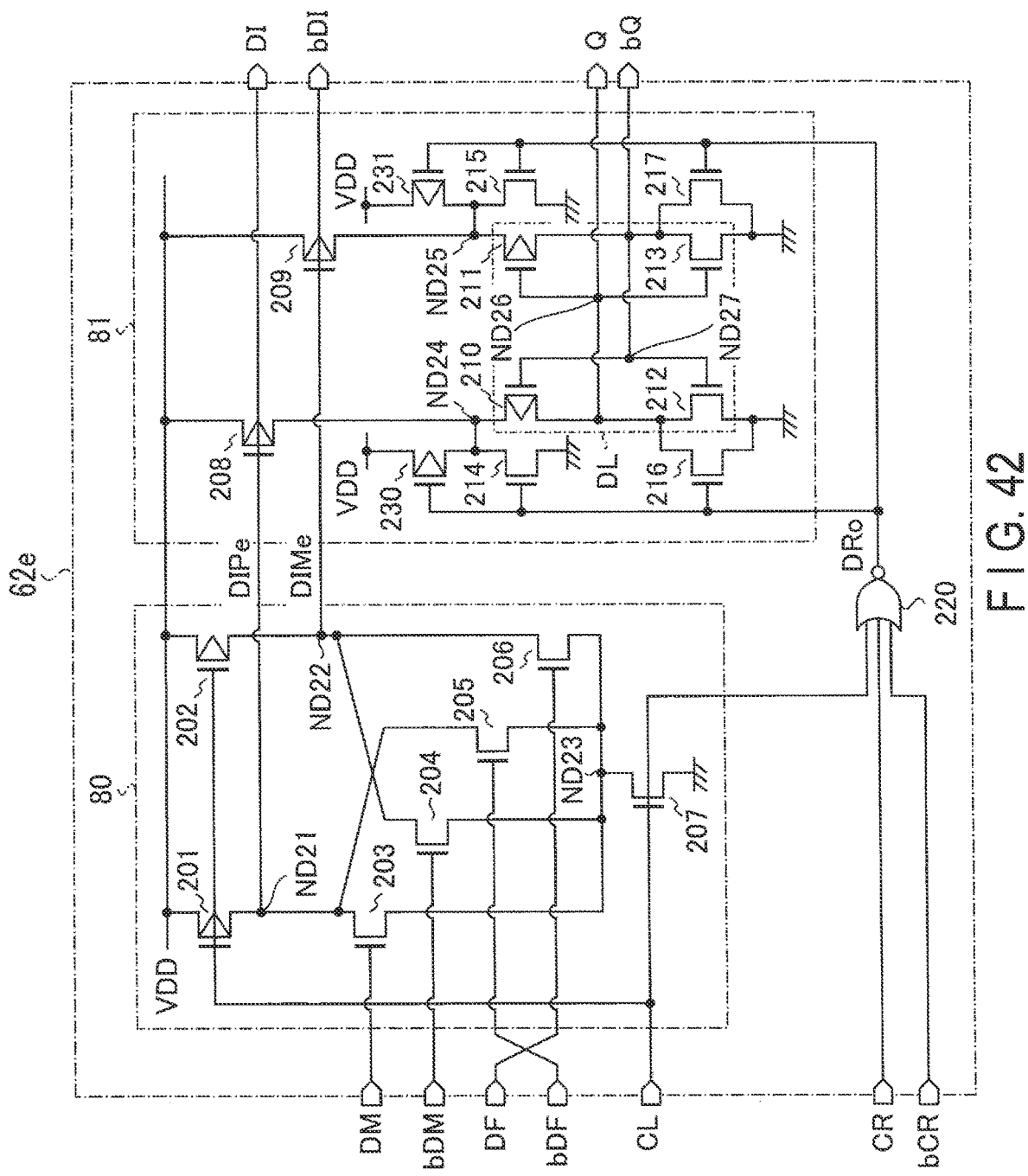
FIG. 42 is a circuit diagram of the amplifier 62e included in the semiconductor memory device according to a first modification of the second embodiment.

First, with reference to FIG. 42, the first modification of the second embodiment will be described. FIG. 42 is a circuit diagram of the amplifier 62e.

As shown in FIG. 42, the amplifier 62e according to this modification includes the input unit 80, the latch unit 81, and the negative OR (NOR) circuit 220 as in the second embodiment.

The internal configuration of the input unit 80 is similar to that in the second embodiment. The signals input to the NOR circuit 220 are similar to those in the second embodiment.

The latch unit 81 of this modification includes the PMOS transistors 208 to 211, PMOS transistors 230 and 231, and the NMOS transistors 212 to 217. That is, the transistors 230 and 231 are added to the latch unit 81 described using FIG. 26.

The voltage VDD is applied to one end of the transistor 230. The other end of the transistor 230 is coupled to the node ND24. The gate of the transistor 230 is coupled to the output terminal of the NOR circuit 220. In other words, the signal DRo is input to the gate of the transistor 230.

The voltage VDD is applied to one end of the transistor 231. The other end of the transistor 231 is coupled to the node ND25. The gate of the transistor 231 is coupled to the output terminal of the NOR circuit 220. In other words, the signal DRo is input to the gate of the transistor 231.

Other transistors in the latch unit 81 are coupled as in the amplifier 62e described using FIG. 26.

2.5.2 Second Modification

Figure 43:
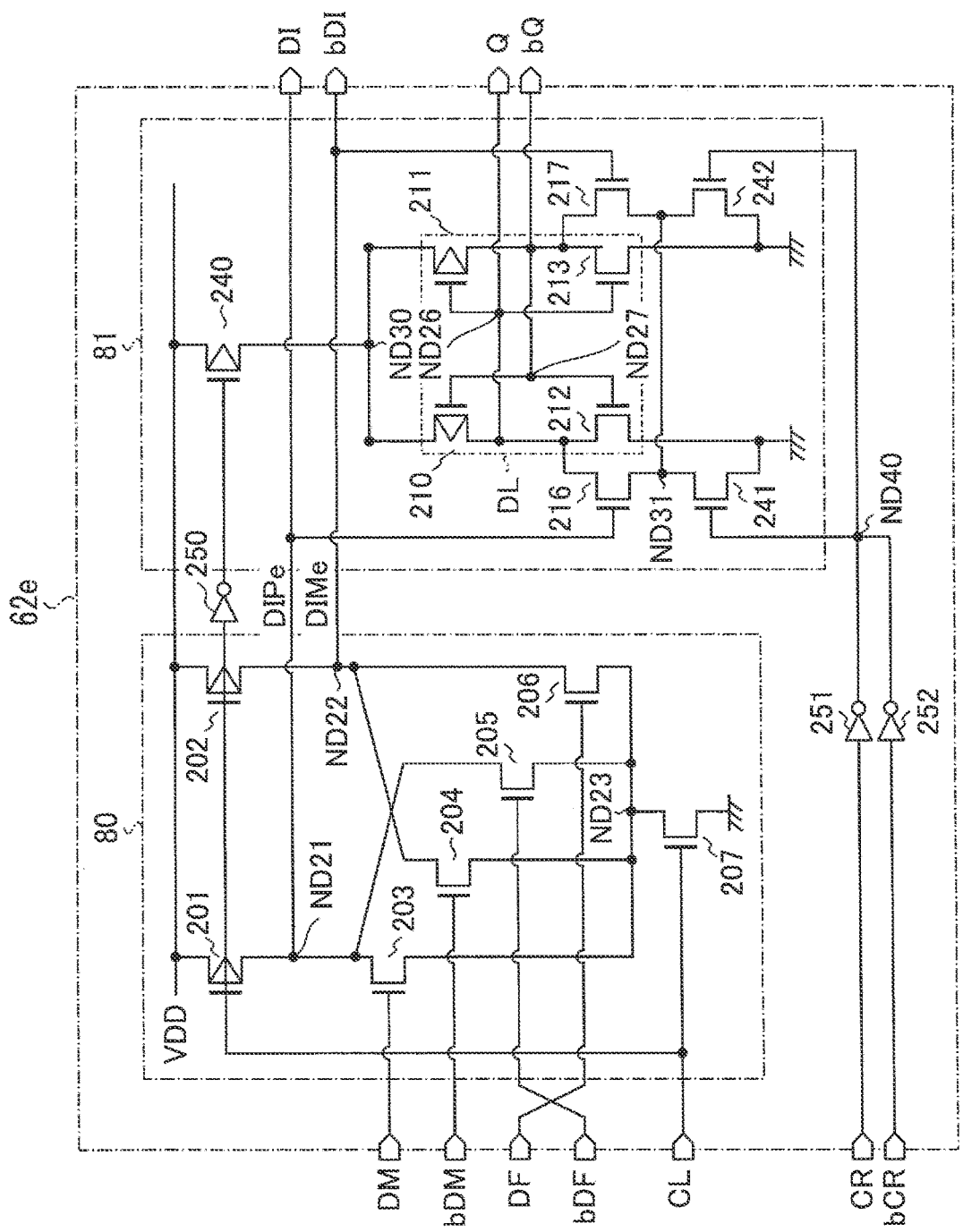
FIG. 43 is a circuit diagram of the amplifier 62e included in the semiconductor memory device according to a second modification of the second embodiment.

Next, with reference to FIG. 43, the second modification of the second embodiment will be described. FIG. 43 is a circuit diagram of the amplifier 62e.

As shown in FIG. 43, the amplifier 62e of this modification includes the input unit 80, the latch unit 81, and inverters 250 to 252.

The internal configuration of the input unit 80 is similar to that in the second embodiment.

The latch unit 81 of this modification includes the PMOS transistors 210 and 211, a PMOS transistor 240, the NMOS transistors 212, 213, 216, and 217, and NMOS transistors 241 and 242.

The voltage VDD is applied to one end of the transistor 240. The other end of the transistor 240 is coupled to a node ND30. The gate of the transistor 240 is coupled to the input terminal of the inverter 250.

One end of the transistor 210 is coupled to the node ND30. The other end of the transistor 210 is coupled to the node ND26. The gate of the transistor 210 is coupled to the node ND27.

One end of the transistor 211 is coupled to the node ND30. The other end of the transistor 211 is coupled to the node ND27. The gate of the transistor 211 is coupled to the node ND26.

One end of the transistor 216 is coupled to the node ND26. The other end of the transistor 216 is coupled to a node ND31. The gate of the transistor 216 is coupled to the node ND21. In other words, the signal DIPe is input to the gate of the transistor 216.

One end of the transistor 217 is coupled to the node ND27. The other end of the transistor 217 is coupled to the node ND31. The gate of the transistor 217 is coupled to the node ND22. In other words, the signal DIMe is input to the gate of the transistor 217.

One end of the transistor 241 is coupled to the node ND31. The other end of the transistor 241 is grounded. The gate of the transistor 241 is coupled to a node ND40.

One end of the transistor 242 is coupled to the node ND31. The other end of the transistor 242 is grounded. The gate of the transistor 242 is coupled to the node ND40.

The input terminal of the inverter 250 is coupled to the terminal CL. The output terminal of the inverter 250 is coupled to the gate of the transistor 240. The inverter 250 outputs an inverted signal of the signal CK (the signal bCK in the case of the amplifier 62*o*).

The input terminal of the inverter 251 is coupled to the terminal CR. The output terminal of the inverter 251 is coupled to the node ND40. The inverter 251 outputs an inverted signal of the signal DIPo (the signal DIPe in the case of the amplifier 62*o*).

The input terminal of the inverter 252 is coupled to the terminal bCR. The output terminal of the inverter 252 is coupled to the node ND40. The inverter 252 outputs an inverted signal of the signal DIMo (the signal DIMe in the case of the amplifier 62*o*).

2.5.3 Effect of Modifications of Second Embodiment

With the configurations according to the first modification and the second modification of the second embodiment, an effect similar to the effect of the second embodiment can be obtained.

Further, with the configuration according to the first modification of the second embodiment, the amplifier 62 includes the transistors 230 and 231. While the signal DRo is in "H" level, that is, while the latch circuit DL is in the latch state, the transistors 230 and 231 supply the voltage VDD to the latch circuit DL. With this, for example, even if the transistors 208 and 209 are in the OFF state, the voltage VDD is supplied to the latch circuit DL. Hence, the stability of data retention in the latch circuit DL improves.

Further, with the configuration according to the second modification of the second embodiment, the amplifier 62 includes the transistor 240. With this, the latch circuit DL can operate in synchronization with the signal CK.

3. Third Embodiment

Next, the third embodiment will be described. In the third embodiment, the configuration of a DFE circuit 50 different from the first embodiment will be described. Differences from the first embodiment will be mainly described below.

3.1 Configurations 3.1.1 Overall Configuration of DFE Circuit

Next, with reference to FIG. 44, an example of the overall configuration of the DFE circuit 50 will be described. FIG. 44 is a block diagram of the DFE circuit 50. In this embodiment, a case where Loop Unrolling is applied to the DFE circuit 50 will be described. For example, the DFE circuit 50 described in each of the first embodiment and the second embodiment feeds back the output signal corresponding to the bit data of the signal DQ input at the immediately preceding timing to the input of the bit data at the next timing. Thus, the DFE circuit 50 implements an effect similar to the effect produced in a case where the voltage value of the voltage VREF relatively fluctuates with respect to the voltage value of the signal DQ. To the contrary, the DFE circuit of this embodiment includes two systems with respect to one bit data, that is, a reception unit that receives a signal DQ with a voltage VREF relatively risen in advance, and a reception unit that receives the signal DQ with the voltage VREF relatively dropped in advance. The DFE circuit 50 selects either of the two systems based on the output signal corresponding to the bit data of the signal DQ input at the immediately preceding timing, thereby compensating the signal DQ.

As shown in FIG. 44, the DFE circuit 50 includes four reception units 91*e*1, 91*e*2, 91*o*1, and 91*o*2, two multiplexers (MUX) 92*e* and 92*o*, and two amplifiers 93*e* and 93*o*. In the following description, if the description is not limited to either of the reception units 91*e*1, 91*e*2, 91*o*1, and 91*o*2, they are referred to as the reception units 91. If the description is not limited to either of the multiplexers 92*e* and 92*o*, they are referred to as the multiplexers 92. If the description is not limited to either of the amplifiers 93*e* and 93*o*, they are referred to as the amplifiers 93.

The reception unit 91*e*1 and the reception unit 91*e*2 receive even-numbered bit data of the signal DQ. For example, the reception unit 91*e*1 receives the signal DQ with the voltage VREF relatively risen with respect to the signal DQ. The reception unit 91*e*2 receives the signal DQ with the voltage VREF relatively dropped with respect to the signal DQ. Even-numbered bit data of the signal DQ and the voltage VREF are input to the reception units 91*e*1 and 91*e*2. As a result of taking in the signal DQ, the reception unit 91*e*1 transmits signals DSPe1 and DSMe1 to the multiplexer 92*e*. As a result of taking in the signal DQ, the reception unit 91*e*2 transmits signals DSPe2 and DSMe2 to the multiplexer 92*e*.

The reception unit 91*o*1 and the reception unit 91*o*2 receive odd-numbered bit data of the signal DQ. For example, the reception unit 91*o*1 receives the signal DQ with the voltage VREF relatively risen with respect to the signal DQ. The reception unit 91*o*2 receives the signal DQ with the voltage VREF relatively dropped with respect to the signal DQ. Odd-numbered bit data of the signal DQ and the voltage VREF are input to the reception units 91*o*1 and 91*o*2. As a result of taking in the signal DQ, the reception unit 91*o*1 transmits signals DSPo1 and DSMo1 to the multiplexer 92*o*. As a result of taking in the signal DQ, the reception unit 91*o*2 transmits signals DSPo2 and DSMo2 to the multiplexer 92*o*.

The multiplexer 92*e* selects either of the reception units 91*e*1 and 91*e*2 based on output signals DOPo and DOMo of the amplifier 93*o*. The multiplexer 92*e* outputs signals DMPe and DMMe. More specifically, for example, if the signal DOPo is in "L" level, the multiplexer 92*e* outputs, as the signals DMPe and DMMe, the signals DSPe1 and DSMe1 input from the reception unit 91*e*1. If the signal DOPo is in "H" level, the multiplexer 92*e* outputs, as the signals DMPe and DMMe, the signals DSPe2 and DSMe2 input from the reception unit 91*e*2. In other words, if the bit data of the signal DQ at the immediately preceding timing is in "H" level, the multiplexer 92*e* selects the signals DSPe1 and DSMe1 corresponding to the signal DQ taken in with the voltage VREF relatively risen. If the bit data of the signal DQ at the immediately preceding timing is in "L" level, the multiplexer 92*e* selects the signals DSPe2 and DSMe2 corresponding to the signal DQ taken in with the voltage VREF relatively dropped.

The multiplexer 92*o* selects either of the reception units 91*o*1 and 91*o*2 based on the output signals DOPe and DOMe of the amplifier 93*e*. The multiplexer 92*o* outputs signals DMPo and DMMo. More specifically, for example, if the signal DOPe is in "L" level, the multiplexer 92*o* outputs, as the signals DMPo and DMMo, the signals DSPo1 and DSMo1 input from the reception unit 91*o*1. If the signal DOPe is in "H" level, the multiplexer 92*o* outputs, as the signals DMPo and DMMo, the signals DSPo2 and DSMo2 input from the reception unit 91*o*2. In other words, if the bit data of the signal DQ at the immediately preceding timing is in "H" level, the multiplexer 92*o* selects the signals DSPo1 and DSMo1 corresponding to the signal DQ taken in with the reference voltage VREF relatively risen. If the bit data of the signal DQ at the immediately preceding timing is in "L" level, the multiplexer 92*o* selects the signals DSPo2 and DSMo2 corresponding to the signal DQ taken in with the reference voltage VREF relatively dropped.

The amplifier 93 is a LT-SA circuit including data input terminals D and bD, a latch control clock input terminal CL, a reset control clock input terminal CR, data output terminals Q and bQ, and a latch completion output terminal R. The amplifier 93 outputs an inverted signal of the input signal. The amplifier 93*e* and the amplifier 93*o* have the same configuration.

The signal DMPe is input to the terminal D of the amplifier 93*e* from the multiplexer 92*e*. The signal DMMe is input to the terminal bD of the amplifier 93*e* from the multiplexer 92*e*.

A signal CK is input to the terminal CL of the multiplexer 93*e*.

A reset control clock signal is input to the terminal CR of the amplifier 93*e* from the terminal R of the amplifier 93*o*.

If the signal DMPe in "H" level is input to the terminal D and the signal DMMe in "L" level is input to the terminal bD, the amplifier 93*e* outputs the signal DOPe in "L" level from the terminal Q and outputs the signal DOMe in "H" level from the terminal bQ. Further, if the signal DMPe in "L" level is input to the terminal D and the signal DMMe in "H" level is input to the terminal bD, the amplifier 93*e* outputs the signal DOPe in "H" level from the terminal Q and outputs the signal DOMe in "L" level from the terminal bQ.

The amplifier 93*e* outputs a reset control clock signal DRe from the terminal R. More specifically, for example, in the amplifier 93*e*, if the logic levels of the signals DOPe and DOMe are the same, the signal DRe is set in "H" level. On the other hand, if the logic levels of the signals DOPe and DOMe are different from each other, the signal DRe is set in "L" level.

The signal DMPo is input to the terminal D of the amplifier 93*o* from the multiplexer 92*o*. The signal DMMo is input to the terminal bD of the amplifier 93*o* from the multiplexer 92*o*.

A signal bCK is input to the terminal CL of the multiplexer 93*o*.

A reset control clock signal output from the terminal R of the amplifier 93*e* is input to the terminal CR of the amplifier 93*o*.

If the signal DMPo in "H" level is input to the terminal D and the signal DMMo in "L" level is input to the terminal bD, the amplifier 93*o* outputs the signal DOPo in "L" level from the terminal Q and outputs the signal DOMo in "H" level from the terminal bQ. Further, if the signal DMPo in "L" level is input to the terminal D and the signal DMMo in "H" level is input to the terminal bD, the amplifier 93*o* outputs the signal DOPo in "H" level from the terminal Q and outputs the signal DOMo in "L" level from the terminal bQ.

The amplifier 93*o* outputs a reset control clock signal DRo from the terminal R. More specifically, for example, in the amplifier 93*o*, if the logic levels of the signals DOPo and DOMo are the same, the signal DRo is set in "H" level. On the other hand, if the logic levels of the signals DOPo and DOMo are different from each other, the signal DRo is set in "L" level.

3.1.2 Configurations of Reception Units

Continuing reference to FIG. 44, an example of the internal configurations of the reception units 91*e*1, 91*e*2, 91*o*1, and 91*o*2 will be described.

First, the reception unit 91*e*1 will be described. The reception unit 91*e*1 includes adders 94*e*1 and 95*e*1, an amplifier 96*e*1, and a bSR latch circuit 97*e*1.

The adder 94*e*1 outputs a signal VDPe1 of a voltage value obtained by subtracting a predetermined feedback coefficient "a" from the voltage value of the signal DQ. The feedback coefficient "a" is a value smaller than the voltage value of the voltage VREF.

The adder 95*e*1 outputs a signal VDMe1 of a voltage value obtained by subtracting a feedback coefficient "−α" from the voltage value of the voltage VREF, that is, obtained by adding the feedback coefficient "α" to the voltage value of the voltage VREF.

The amplifier 96*e*1 is an LT-SA circuit. The amplifier 96*e*1 includes the data input terminals D and bD, the latch control clock input terminal CL, and the data output terminals Q and bQ. The amplifier 96*e*1 outputs an inverted signal of the input signal.

The signal VDPe1 is input to the terminal D of the amplifier 96*e*1 from the adder 94*e*1. The signal VDMe1 is input to the terminal bD of the amplifier 96*e*1 from the adder 95*e*1.

The signal CK is input to the terminal CL of the amplifier 96*e*1.

The amplifier 96*e*1 outputs a signal DOPe1 from the terminal Q. The amplifier 96*e*1 outputs a signal DOMe1 from the terminal bQ.

The bSR latch circuit 97*e*1 temporarily stores the signal DOPe1 and the signal DOMe1. The bSR latch circuit 97*e*1 includes a signal input terminal bS, a reset signal input terminal bR, and the output terminals Q and bQ.

The terminal bS of the bSR latch circuit 97*e*1 is coupled to the terminal Q of the amplifier 96*e*1. The signal DOPe1 is input to the terminal bS of the bSR latch circuit 97*e*1.

The terminal bR of the bSR latch circuit 97*e*1 is coupled to the terminal bQ of the amplifier 96*e*1. The signal DOMe1 is input to the terminal bR of the bSR latch circuit 97*e*1.

The terminals Q and bQ of the bSR latch circuit 97*e*1 are coupled to different input terminals of the multiplexer 92*e*, respectively. The bSR latch circuit 97*e*1 outputs the signal DOPe1 from the terminal Q. The bSR latch circuit 97*e*1 outputs the signal DOMe1 from the terminal bQ.

Next, the reception unit 91e2 will be described. The reception unit 91e2 includes adders 94e2 and 95e2, an amplifier 96e2, and a bSR latch circuit 97e2.

The adder 94e2 outputs a signal VDPe2 of a voltage value obtained by subtracting the feedback coefficient "−α" from the voltage value of the signal DQ.

The adder 95e2 outputs a signal VDMe2 of a voltage value obtained by subtracting the feedback coefficient "α" from the voltage value of the voltage VREF.

The amplifier 96e2 is an LT-SA circuit. The configuration of the amplifier 96e2 is similar to that of the amplifier 96e1.

The signal VDPe2 is input to the terminal D of the amplifier 96e2 from the adder 94e2. The signal VDMe2 is input to the terminal bD of the amplifier 96e2 from the adder 95e2.

The signal CK is input to the terminal CL of the amplifier 96e2.

The amplifier 96e2 outputs a signal DOPe2 from the terminal Q. The amplifier 96e2 outputs a signal DOMe2 from the terminal bQ.

The bSR latch circuit 97e2 temporarily stores the signal DOPe2 and the signal DOMe2. The configuration of the bSR latch circuit 97e2 is similar to that of the bSR latch circuit 97e1.

The terminal bS of the bSR latch circuit 97e2 is coupled to the terminal Q of the amplifier 96e2. The signal DOPe2 is input to the terminal bS of the bSR latch circuit 97e2.

The terminal bR of the bSR latch circuit 97e2 is coupled to the terminal bQ of the amplifier 96e2. The signal DOMe2 is input to the terminal bR of the bSR latch circuit 97e2.

The terminals Q and bQ of the bSR latch circuit 97e2 are coupled to different input terminals of the multiplexer 92e, respectively. The bSR latch circuit 97e2 outputs the signal DSPe2 from the terminal Q. The bSR latch circuit 97e2 outputs the signal DSMe2 from the terminal bQ.

Next, the reception unit 91o1 will be described. The reception unit 91o1 includes adders 94o1 and 95o1, an amplifier 96o1, and a bSR latch circuit 97o1.

The adder 94o1 outputs a signal VDPo1 of a voltage value obtained by subtracting the feedback coefficient "α" from the voltage value of the signal DQ.

The adder 95o1 outputs a signal VDMo1 of a voltage value obtained by subtracting the feedback coefficient "−α" from the voltage value of the voltage VREF.

The amplifier 96o1 is an LT-SA circuit. The configuration of the amplifier 96o1 is similar to that of the amplifier 96e1.

The signal VDPo1 is input to the terminal D of the amplifier 96o1 from the adder 94o1. The signal VDMo1 is input to the terminal bD of the amplifier 96o1 from the adder 95o1.

The signal bCK is input to the terminal CL of the amplifier 96o1.

The amplifier 96o1 outputs a signal DOPo1 from the terminal Q. The amplifier 96o1 outputs a signal DOMo1 from the terminal bQ.

The bSR latch circuit 97o1 temporarily stores the signal DOPo1 and the signal DOMo1. The configuration of the bSR latch circuit 97o1 is similar to that of the bSR latch circuit 97e1.

The terminal bS of the bSR latch circuit 97o1 is coupled to the terminal Q of the amplifier 96o1. The signal DOPo1 is input to the terminal bS of the bSR latch circuit 97o1.

The terminal bR of the bSR latch circuit 97o1 is coupled to the terminal bQ of the amplifier 96o1. The signal DOMo1 is input to the terminal bR of the bSR latch circuit 97o1.

The terminals Q and bQ of the bSR latch circuit 97o1 are coupled to different input terminals of the multiplexer 92o, respectively. The bSR latch circuit 97o1 outputs the signal DOPo1 from the terminal Q. The bSR latch circuit 97o1 outputs the signal DOMo1 from the terminal bQ.

Next, the reception unit 91o2 will be described. The reception unit 91o2 includes adders 94o2 and 95o2, an amplifier 96o2, and a bSR latch circuit 97o2.

The adder 94o2 outputs a signal VDPo2 of a voltage value obtained by subtracting the feedback coefficient "−α" from the voltage value of the signal DQ.

The adder 95o2 outputs a signal VDMo2 of a voltage value obtained by subtracting the feedback coefficient "α" from the voltage value of the voltage VREF.

The amplifier 96o2 is an LT-SA circuit. The configuration of the amplifier 96o2 is similar to that of the amplifier 96o1.

The signal VDPo2 is input to the terminal D of the amplifier 96o2 from the adder 94o2. The signal VDMo2 is input to the terminal bD of the amplifier 96o2 from the adder 95o2.

The signal bCK is input to the terminal CL of the amplifier 96o2.

The amplifier 96o2 outputs a signal DOPo2 from the terminal Q. The amplifier 96o2 outputs a signal DOMo2 from the terminal bQ.

The bSR latch circuit 97o2 temporarily stores the signal DOPo2 and the signal DOMo2. The configuration of the bSR latch circuit 97o2 is similar to that of the bSR latch circuit 97e2.

The terminal bS of the bSR latch circuit 97o2 is coupled to the terminal Q of the amplifier 96o2. The signal DOPo2 is input to the terminal bS of the bSR latch circuit 97o2.

The terminal bR of the bSR latch circuit 97o2 is coupled to the terminal bQ of the amplifier 96o2. The signal DOMo2 is input to the terminal bR of the bSR latch circuit 97o2.

The terminals Q and bQ of the bSR latch circuit 97o2 are coupled to different input terminals of the multiplexer 92o, respectively. The bSR latch circuit 97o2 outputs the signal DSPo2 from the terminal Q. The bSR latch circuit 97o2 outputs the signal DSMo2 from the terminal bQ.

3.1.3 Circuit Configuration of Amplifier 96e1

Next, with reference to FIG. 45, an example of the circuit configuration of the amplifier 96e1 will be described. FIG. 45 is a circuit diagram of the amplifier 96e1. Note that the circuit configurations of the amplifiers 96e2, 96o1, and 96o2 are similar to the circuit configuration of the amplifier 96e1. In the following description, if the description is not limited to either of the amplifiers 96e1, 96e2, 96o1, and 96o2, they are referred to as the amplifiers 96.

As shown in FIG. 45, the amplifier 96e1 includes PMOS transistors 301 to 304 and NMOS transistors 305 to 309.

A voltage VDD is applied to one end of the transistor 301. The other end of the transistor 301 is coupled to a node ND51. The gate of the transistor 301 is coupled to the terminal CL.

The voltage VDD is applied to one end of the transistor 302. The other end of the transistor 302 is coupled to the node ND51. The gate of the transistor 302 is coupled to a node ND52.

The voltage VDD is applied to one end of the transistor 303. The other end of the transistor 303 is coupled to the node ND52. The gate of the transistor 303 is coupled to the node ND51.

The voltage VDD is applied to one end of the transistor 304. The other end of the transistor 304 is coupled to the node ND52. The gate of the transistor 304 is coupled to the terminal CL.

One end of the transistor 305 is coupled to the node ND51. The other end of the transistor 305 is coupled to one end of the transistor 307. The gate of the transistor 305 is coupled to the node ND52.

One end of the transistor 306 is coupled to the node ND52. The other end of the transistor 306 is coupled to one end of the transistor 308. The gate of the transistor 306 is coupled to the node ND51.

The transistors 302, 303, 305, and 306 form a latch circuit DL. More specifically, the transistors 302 and 305 form the first inverter. The transistors 303 and 306 form the second inverter. An output of the first inverter and an input of the second inverter (node ND51) are coupled to the terminal Q. An input of the first inverter and an output of the second inverter (node ND52) are coupled to the terminal bQ.

The other end of the transistor 307 is coupled to a node ND53. The gate of the transistor 307 is coupled to the terminal D.

The other end of the transistor 308 is coupled to the node ND53. The gate of the transistor 308 is coupled to the terminal bD.

One end of the transistor 309 is coupled to the node ND53. The other end of the transistor 309 is grounded. The gate of the transistor 309 is coupled to the terminal CL.

The operation of the amplifier 96e1 will be described briefly. While the signal CK in "L" level is input to the terminal CL, the amplifier 96e1 is set in a reset state. More specifically, the transistors 301 and 304 are set in the ON state, and the transistor 309 is set in the OFF state. Accordingly, the voltage in "H" level is applied to the nodes ND51 and ND52. Therefore, the amplifier 96e1 outputs the signals DOPe1 and DOMe1 in "H" level from the terminal Q and the terminal bQ, respectively. At the timing at which the signal CK rises from "L" level to "H" level, the amplifier 96e1 stores, in the latch circuit DL, the result of taking in the signal VDPe1. Based on the result stored in the latch circuit DL, the logic levels of the signals DOPe1 and DOMe1 are determined. At the timing at which the signal CK falls from "H" level to "L" level, the amplifier 96e1 is set in the reset state.

3.1.4 Circuit Configuration of Amplifier 93e

Figure 46:
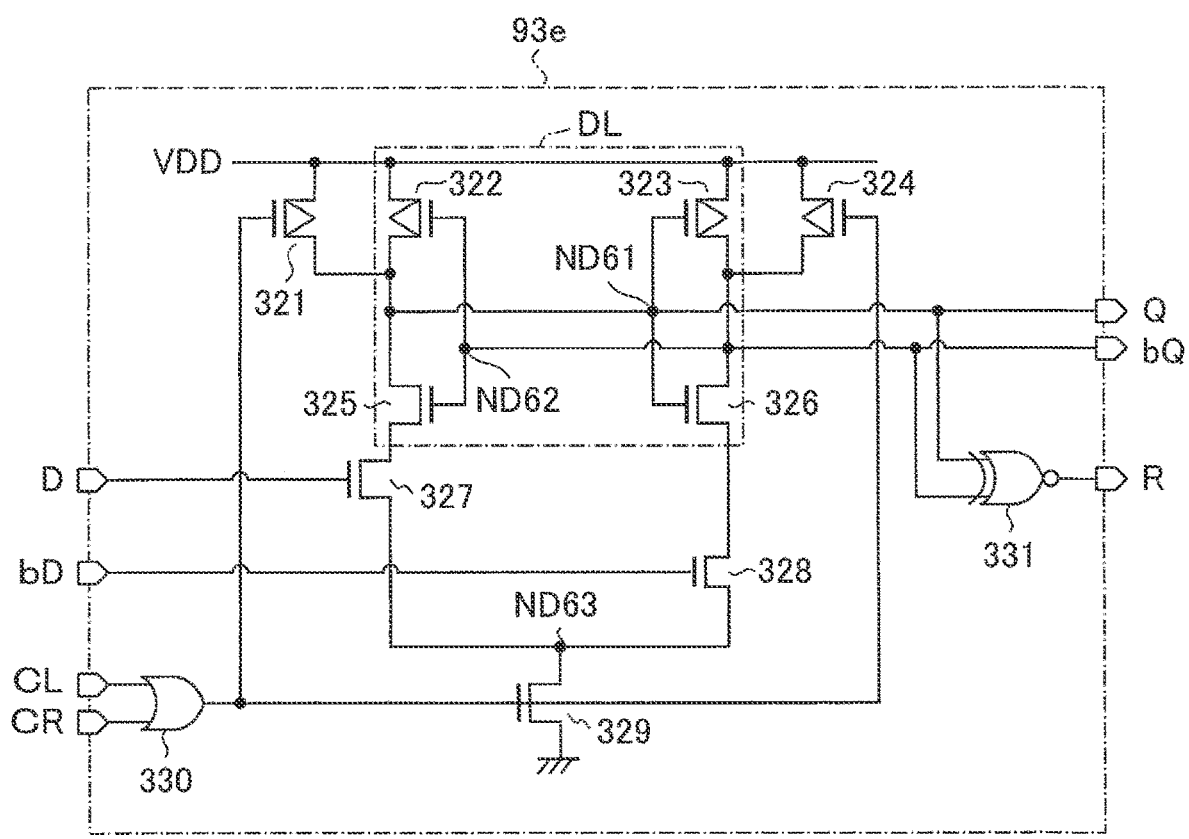
FIG. 46 is a circuit diagram of an amplifier 93e included in the semiconductor memory device according to the third embodiment.

Next, with reference to FIG. 46, an example of the circuit configuration of the amplifier 93e will be described. FIG. 46 is a circuit diagram of the amplifier 93e. Note that the circuit configuration of the amplifier 93o is similar to the circuit configuration of the amplifier 93e.

As shown in FIG. 46, the amplifier 93e includes PMOS transistors 321 to 324, NMOS transistors 325 to 329, an OR circuit 330, and an XNOR circuit 331.

The voltage VDD is applied to one end of the transistor 321. The other end of the transistor 321 is coupled to a node ND61. The gate of the transistor 321 is coupled to the output terminal of the OR circuit 330.

The voltage VDD is applied to one end of the transistor 322. The other end of the transistor 322 is coupled to the node ND61. The gate of the transistor 322 is coupled to a node ND62.

The voltage VDD is applied to one end of the transistor 323. The other end of the transistor 323 is coupled to the node ND62. The gate of the transistor 323 is coupled to the node ND61.

The voltage VDD is applied to one end of the transistor 324. The other end of the transistor 324 is coupled to the node ND62. The gate of the transistor 324 is coupled to the output terminal of the OR circuit 330.

One end of the transistor 325 is coupled to the node ND61. The other end of the transistor 325 is coupled to one end of the transistor 327. The gate of the transistor 325 is coupled to the node ND62.

One end of the transistor 326 is coupled to the node ND62. The other end of the transistor 326 is coupled to one end of the transistor 328. The gate of the transistor 326 is coupled to the node ND61.

The transistors 322, 323, 325, and 326 form the latch circuit DL. More specifically, the transistors 322 and 325 form the first inverter. The transistors 323 and 326 form the second inverter. An output of the first inverter and an input of the second inverter (node ND61) are coupled to the terminal Q. An input of the first inverter and an output of the second inverter (node ND62) are coupled to the terminal bQ.

The other end of the transistor 327 is coupled to a node ND63. The gate of the transistor 327 is coupled to the terminal D.

The other end of the transistor 328 is coupled to the node ND63. The gate of the transistor 328 is coupled to the terminal bD.

One end of the transistor 329 is coupled to the node ND63. The other end of the transistor 329 is grounded. The gate of the transistor 329 is coupled to the output terminal of the OR circuit 330.

Two input terminals of the OR circuit 330 are coupled to the terminal CL and the terminal CR, respectively. If at least one of the clock signal input from the terminal CL and the reset control clock signal input from the terminal CR is in "H" level, the OR circuit 330 outputs a signal in "H" level.

Two input terminals of the XNOR circuit 331 are coupled to the node ND61 (terminal Q) and the node ND62 (terminal bQ), respectively. If one of the node ND61 and the node ND62 is in "H" level and the other is in "L" level, the XNOR circuit 331 outputs a signal in "L" level. In other words, if the logic level of the taken-in signal has been determined in the latch circuit DL, the XNOR circuit 331 outputs a signal in "L" level.

The operation of the amplifier 93e will be described briefly. While the OR circuit 330 outputs the signal in "L" level, the amplifier 93e is set in the reset state. More specifically, the transistors 321 and 324 are set in the ON state, and the transistor 329 is set in the OFF state. With this, a voltage in "H" level is applied to the nodes ND61 and ND62. Accordingly, the amplifier 93e outputs the signals DOPe and DOMe in "H" level from the terminals Q and the terminal bQ, respectively. At the timing at which the output signal of the OR circuit 330 rises from "L" level to "H" level, the amplifier 93e stores, in the latch circuit DL, the result of taking in the signal VDPe1. Based on the result stored in the latch circuit DL, the logic levels of the signals DOPe and DOMe are determined. While one of the signals DOPe and DOMe is in "H" level and the other is in "L" level, the XNOR circuit 331 outputs a signal in "L" level. Then, at the timing at which the signal CK falls from "H" level to "L" level, the amplifier 93e is set in the reset state.

3.2 Operation Example of DFE Circuit

Figure 47:
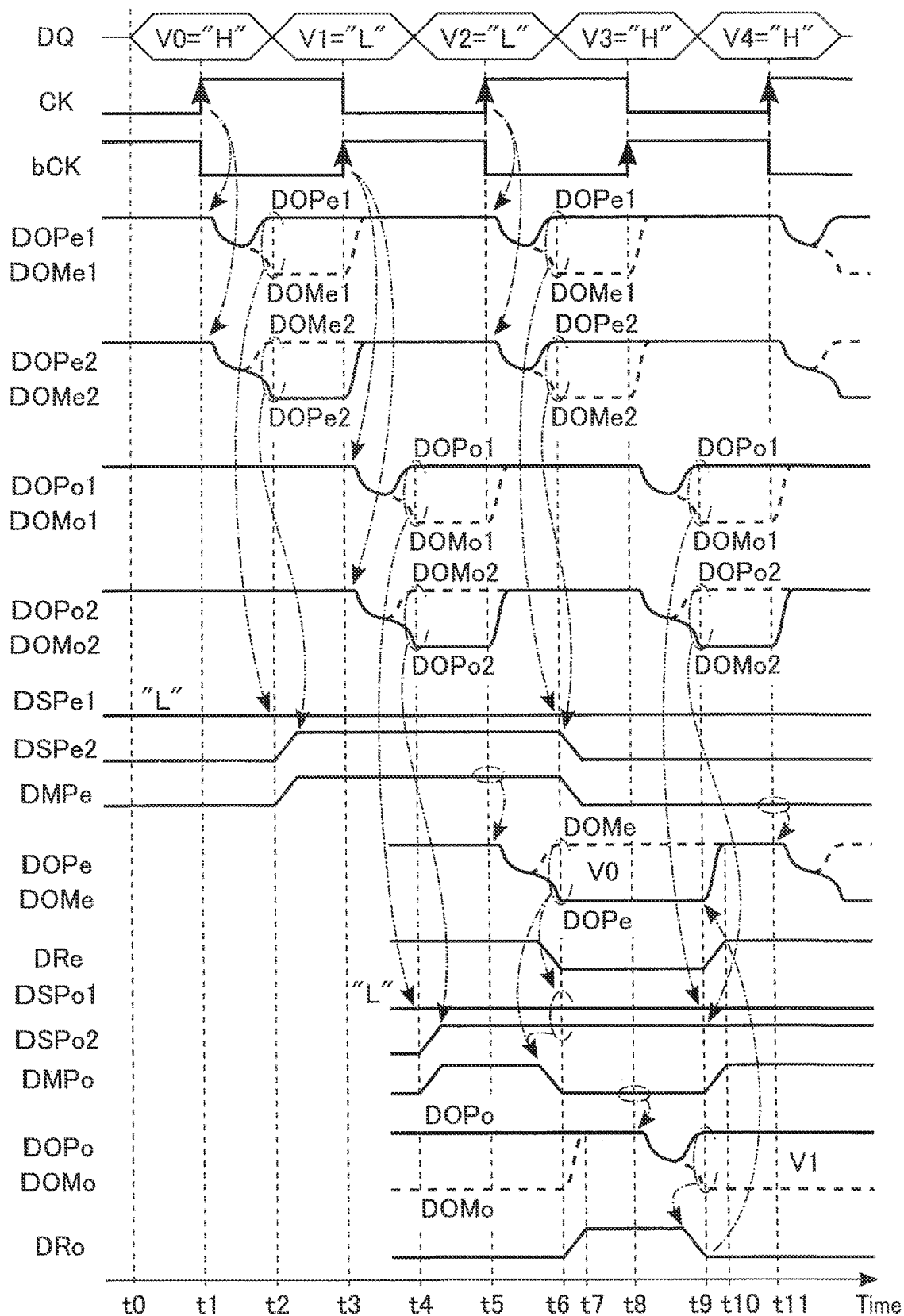
FIG. 47 is a timing chart of various signals in the DFE circuit 50 included in the semiconductor memory device according to the third embodiment.

Next, an example of the operation of the DFE circuit 50 will be described with reference to FIG. 47. FIG. 47 is a timing chart of various signals in the DFE circuit 50.

<Time t0>

As shown in FIG. 47, at time t0 before the signal DQ is input, the signal CK is set in "L" level and the signal bCK is set in "H" level.

Since the amplifier 96e1 is in the reset state, the signals DOPe1 and DOMe1 in "H" level are output. Since the amplifier 96e2 is in the reset state, the signals DOPe2 and DOMe2 in "H" level are output. Since the amplifier 96o1 is in the reset state, the signals DOPo1 and DOMo1 in "H" level are output. Since the amplifier 96o2 is in the reset state, the signals DOPo2 and DOMo2 in "H" level are output.

The bSR circuit 97e1 outputs the signal DOPe1 in "L" level. The bSR circuit 97e2 outputs the signal DSPe2 in "L" level.

Since the signal DQ is in "L" level, the multiplexer 92e selects the reception unit 91e2 (bSR latch circuit 97e2). The multiplexer 92e outputs the DMPe in "L" level.

<Time t1>

For example, assume that even-numbered bit data V0 of the signal DQ is in "H" level. At time t1, the signal CK rises from "L" level to "H" level, and the signal bCK falls from "H" level to "L" level.

Based on the rising of the signal CK, the latch circuit DL of each of the amplifiers 96e1 and 96e2 takes in the even-numbered bit data V0 in "H" level. Based on the even-numbered bit data V0, the signals DOPe1, DOMe1, DOPe2, and DOPe2 start to transition.

<Time t2>

At time t2, the logic level of the latch circuit DL of each of the amplifiers 96e1 and 96e2 is determined. As a result, for example, the amplifier 96e1 outputs the signal DOPe1 in "H" level and the signal DOMe1 in "L" level. Further, for example, the amplifier 96e2 outputs the signal DOPe2 in "L" level and the signal DOMe2 in "H" level. If the signal DQ is not in the full swing state, due to the voltage difference from the voltage VREF, the signal DOPe1 and the signal DOPe2 can have different logic levels. The signal DOPe1 and the signal DOPe2 may have the same logic level.

Based on the signal DOPe1 in "H" level and the signal DOMe1 in "L" level, the bSR latch circuit 97e1 outputs the signal DOPe1 in "L" level and the signal DOMe1 in "H" level. Based on the signal DOPe2 in "L" level and the signal DOMe2 in "H" level, the bSR latch circuit 97e2 outputs the signal DSPe2 in "H" level and the signal DSMe2 in "L" level.

The multiplexer 92e selects the reception unit 91e2 (bSR latch circuit 97e2), and outputs the signal DMPe in "H" level and the signal DMMe in "L" level.

<Time t3>

For example, assume that odd-numbered bit data V1 of the signal DQ is in "L" level. At time t3, the signal CK falls from "H" level to "L" level, and the signal bCK rises from "L" level to "H" level.

Based on the falling of the signal CK, the amplifiers 96e1 and 96e2 are set in the reset state. The amplifier 96e1 outputs the signals DOPe1 and DOMe1 in "H" level. The amplifier 96e2 outputs the signals DOPe2 and DOMe2 in "H" level.

Based on the rising of the signal bCK, the amplifiers 96o1 and 96o2 take in the odd-numbered bit data V1 in "L" level. Based on the odd-numbered bit data V1, the signals DOPo1, DOMo1, DOPo2, and DOMo2 start to transition.

<Time t4>

At time t4, the logic level of the latch circuit DL of each of the amplifiers 96o1 and 96o2 is determined. As a result, for example, the amplifier 96o1 outputs the signal DOPo1 in "H" level and the signal DOMo1 in "L" level. Further, for example, the amplifier 96o2 outputs the signal DOPo2 in "L" level and the signal DOMo2 in "H" level.

Based on the signal DOPo1 in "H" level and the signal DOMo1 in "L" level, the bSR latch circuit 97o1 outputs the signal DOPo1 in "L" level and the signal DOMo1 in "H" level. Based on the signal DOPo2 in "L" level and the signal DOMo2 in "H" level, the bSR latch circuit 97o2 outputs the signal DSPo2 in "H" level and the signal DSMo2 in "L" level.

The multiplexer 92o selects the reception unit 91o2 (bSR latch circuit 97o2), and outputs the signal DMPo in "H" level and the signal DMMo in "L" level.

<Time t5>

For example, assume that even-numbered bit data V2 of the signal DQ is in "L" level. At time t5, the signal CK rises from "L" level to "H" level, and the signal bCK falls from "H" level to "L" level.

Based on the rising of the signal CK, the latch circuit DL of each of the amplifiers 96e1 and 96e2 takes in the even-numbered bit data V2 in "L" level. Based on the even-numbered bit data V2, the signals DOPe1, DOMe1, DOPe2, and DOMe2 start to transition.

Based on the falling of the signal bCK, the amplifiers 96o1 and 96o2 are set in the reset state. The amplifier 96o1 outputs the signals DOPo1 and DOMo1 in "H" level. The amplifier 96o2 outputs the signals DOPo2 and DOMo2 in "H" level.

Based on the rising of the signal CK, the amplifier 93e takes in the signal DMPe in "H" level and the signal DMMe in "L" level. Based on the signals DMPe and DMMe, the signals DOPe and DOMe start to transition.

<Time t6>

At time t6, the logic level of the latch circuit DL of each of the amplifiers 96e1 and 96e2 is determined. As a result, for example, the amplifier 96e1 outputs the signal DOPe1 in "H" level and the signal DOMe1 in "L" level. Further, for example, the amplifier 96e2 outputs the signal DOPe2 in "H" level and the signal DOMe2 in "L" level.

Based on the signal DOPe1 in "H" level and the signal DOMe1 in "L" level, the bSR latch circuit 97e1 outputs the signal DOPe1 in "L" level and the signal DOMe1 in "H" level. Based on the signal DOPe2 in "H" level and the signal DOMe2 in "L" level, the bSR latch circuit 97e2 outputs the signal DSPe2 in "L" level and the signal DSMe2 in "H" level.

The multiplexer 92e selects the reception unit 91e2 (bSR latch circuit 97e2), and outputs the signal DMPe in "L" level and the signal DMMe in "H" level.

The logic level of the latch circuit DL of the amplifier 93e is determined. In other words, the logic level of the even-numbered bit data V0 of the signal DQ is determined. As a result, for example, the amplifier 93e outputs the signal DOPe in "L" level and the signal DOMe in "H" level. Further, the amplifier 93e outputs the signal DRe in "L" level.

Based on the signal DOPe in "L" level and the signal DOMe in "H" level, the multiplexer 92o selects the reception unit 91o1. The multiplexer 92o outputs the signal DMPo in "L" level and the signal DMMo in "H" level.

The signals bCK and DRe in "L" level are input to the amplifier 93o. Therefore, the reset operation of the latch circuit DL is started in the amplifier 93o.

<Time t7>

At time t7, the reset operation of the amplifier 93o is complete, and the latch circuit DL is set in the reset state. As a result, the amplifier 93o outputs the signals DOPo and DOMo in "H" level. The amplifier 93o outputs the signal DRo in "H" level.

<Time t8>

Assume that odd-numbered bit data V3 of the signal DQ is in "H" level. At time t8, the signal CK falls from "H" level to "L" level, and the signal bCK rises from "L" level to "H" level.

Based on the falling of the signal CK, the amplifiers 96e1 and 96e2 are set in the reset state. The amplifier 96e1 outputs the signals DOPe1 and DOMe1 in "H" level. The amplifier 96e2 outputs the signals DOPe2 and DOMe2 in "H" level.

Based on the rising of the signal bCK, the amplifiers 96o1 and 96o2 take in the odd-numbered bit data V3 in "H" level. Based on the odd-numbered bit data V3, the signals DOPo1, DOMo1, DOPo2, and DOMo2 start to transition.

Based on the rising of the signal bCK, the amplifier 93o takes in the signal DMPo in "L" level and the signal DMMo in "H" level. Based on the signals DMPo and DMMo, the signals DOPo and DOMo start to transition.

<Time t9>

At time t9, the logic level of the latch circuit DL of each of the amplifiers 96o1 and 96o2 is determined. As a result, for example, the amplifier 96o1 outputs the signal DOPo1 in "H" level and the signal DOMo1 in "L" level. Further, for example, the amplifier 96o2 outputs the signal DOPo2 in "L" level and the signal DOMo2 in "H" level.

Based on the signal DOPo1 in "H" level and the signal DOMo1 in "L" level, the bSR latch circuit 97o1 outputs the signal DOPo1 in "L" level and the signal DOMo1 in "H" level. Based on the signal DOPo2 in "L" level and the signal DOMo2 in "H" level, the bSR latch circuit 97o2 outputs the signal DSPo2 in "H" level and the signal DSMo2 in "L" level.

The logic level of the latch circuit DL of the amplifier 93o is determined. In other words, the logic level of the odd-numbered bit data V1 of the signal DQ is determined. As a result, for example, the amplifier 93o outputs the signal DOPo in "H" level and the signal DOMo in "L" level. Further, the amplifier 93o outputs the signal DRo in "L" level.

The signals CK and DRo in "L" level are input to the amplifier 93e. Accordingly, the reset operation of the latch circuit DL is started in the amplifier 93e.

<Time t10>

At time t10, the reset operation of the amplifier 93e is complete, and the latch circuit DL is set in the reset state. As a result, the amplifier 93e outputs the signals DOPe and DOMe in "H" level. The amplifier 93e outputs the signal DRe in "H" level.

The multiplexer 92o selects the reception unit 91o2, and outputs the signal DMPo in "H" level and the signal DMMo in "L" level.

<Time t11>

Assume that even-numbered bit data V4 of the signal DQ is in "H" level. At time t11, the signal CK rises from "L" level to "H" level, and the signal bCK falls from "H" level to "L" level.

Based on the rising of the signal CK, the latch circuit DL of each of the amplifiers 96e1 and 96e2 takes in the even-numbered bit data V4 in "H" level. Based on the even-numbered bit data V4, the signals DOPe1, DOMe1, DOPe2, and DOMe2 start to transition.

Based on the falling of the signal bCK, the amplifiers 96o1 and 96o2 are set in the reset state. The amplifier 96o1 outputs the signals DOPo1 and DOMo1 in "H" level. The amplifier 96o2 outputs the signals DOPo2 and DOMo2 in "H" level.

Based on the rising of the signal CK, the amplifier 93e takes in the signal DMPe in "L" level and the signal DMMe in "H" level. Based on the signals DMPe and DMMe, the signals DOPe and DOMe start to transition.

3.3 Effect According to This Embodiment

With the configurations according to this embodiment, an effect similar to the effect of the first embodiment can be obtained.

Further, with the configurations according to this embodiment, the feedback operation of the output signal to the input signal can be omitted. Hence, the DFE circuit 50 can further increase the signal reception speed.

4. Modifications and the Like

According to above embodiment, a semiconductor memory device includes: a nonvolatile memory cell (MC); a first circuit (60e) including a first latch circuit (DL), and configured to receive first bit data (V0) of an input signal (DQ) based on a first clock signal (CK), store, in the first latch circuit, first data (DOPe) based on a result of comparison between the first bit data and a reference voltage (VREF), and output a first signal (DRe) based on the first data; and a second circuit (60o) including a second latch circuit (DL), and configured to receive second bit data (V1) of the input signal based on a second clock signal (bCK) obtained by inverting the first clock signal, store, in the second latch circuit, second data (DOPo) based on a result of comparison between the second bit data and the reference voltage, and output a second signal (DRo) based on the second data. The first circuit is configured to receive the second data and the second signal and set the first latch circuit in a reset state based on the second signal. The second circuit is configured to receive the first data and the first signal, compare the second bit data and the reference voltage based on the first data, and set the second latch circuit in a reset state based on the first signal.

By applying the above-described embodiments, a semiconductor memory device that can suppress an increase in chip area can be provided.

For example, in the third embodiment, a DTSA circuit can be applied to the amplifier 93 or the amplifier 96.

Further, for example, in FIG. 7 of the first embodiment described above, the case has been described in which the input terminals DM, bDM, DF, and bDF of the amplifier 60 are coupled to the gates of the NMOS transistors, respectively, but the circuit configuration of the amplifier 60 is not limited to this. For example, the amplifier 60 may have a circuit configuration in which the input terminals DM, bDM, DF, and bDF are coupled to the PMOS transistors, respectively. That is, the differential amplification unit in the amplifier 60 may be formed by the PMOS transistors. This also applies to the other amplifiers 62, 93, and 96.

Further, for example, in the embodiments described above, the memory interface circuit 16 may have the configuration similar to the configuration of the input circuit 41.

Further, "coupling" in the embodiments described above includes indirect coupling intervening something else, for example, a transistor, a resistor, or the like.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit

What is claimed is:

1. A semiconductor memory device comprising:
a nonvolatile memory cell;
a first circuit including:
   a first latch circuit;
   a first reset circuit configured to reset data stored in the first latch circuit; and
   a first control signal output circuit configured to output a first control signal upon completion of latch of data at the first latch circuit,
a second circuit including:
   a second latch circuit;
   a second reset circuit configured to reset data stored in the second latch circuit; and
   a second control signal output circuit configured to output a second control signal upon completion of latch of data at the second latch circuit,
wherein:
the first circuit is configured to (i) receive a first bit data of an input signal based on a first clock signal, (ii) store, in the first latch circuit, a first data based on a result of a comparison between the first bit data and a reference voltage, and (iii) output the first control signal based on the first data,
the second circuit is configured to (i) receive a second bit data of the input signal based on a second clock signal obtained by inverting the first clock signal, (ii) store, in the second latch circuit, a second data based on a result of a comparison between the second bit data and the reference voltage, and (iii) output the second control signal based on the second data,
the first circuit is configured to receive the second data and the second control signal and set the first latch circuit in a first reset state based on the second control signal,
the second circuit is configured to receive the first data and the first control signal, compare the second bit data and the reference voltage based on the first data, and set the second latch circuit in a second reset state based on the first control signal,
the first reset circuit resets the data stored in the first latch circuit in response to the second control signal, and
the second reset circuit resets the data stored in the second latch circuit in response to the first control signal.

2. The device according to claim 1, wherein when the second data is stored in the second latch circuit, the first latch circuit is set in the first reset state.

3. The device according to claim 1, wherein a logic level of the first control signal is different between a state in which the first latch circuit stores the first data and the first reset state.

4. The device according to claim 1, wherein the first data is inverted data of the first bit data.

5. The device according to claim 1, wherein:
the first circuit is configured to store the first data in the first latch circuit based on a timing of rising of the first clock signal, and
the second circuit is configured to store the second data in the second latch circuit based on a timing of rising of the second clock signal.

6. A semiconductor memory device comprising:
a nonvolatile memory cell;
a first circuit including:
   a first latch circuit;
   a first reset circuit configured to reset data stored in the first latch circuit; and
   a first control signal output circuit configured to output a first control signal upon completion of latch of data at the first latch circuit; and
a second circuit including:
   a second latch circuit;
   a second reset circuit configured to reset data stored in the second latch circuit; and
   a second control signal output circuit configured to output a second control signal upon completion of latch of data at the second latch circuit,
wherein:
the first circuit is configured to receive a first bit data of an input signal based on a first clock signal and, based on a result of a comparison between the first bit data and a reference voltage, store a first data in the first latch circuit and output a first control signal,
the second circuit is configured to receive a second bit data of the input signal based on a second clock signal obtained by inverting the first clock signal and, based on a result of a comparison between the second bit data and the reference voltage, store a second data in the second latch circuit and output a second control signal,
the first circuit is configured to receive the second data and the second control signal and set the first latch circuit in a first reset state based on the second control signal,
the second circuit is configured to receive the first data and the first control signal, compare the second bit data and the reference voltage based on the first data, and set the second latch circuit in a second reset state based on the first control signal,
the first reset circuit resets the data stored in the first latch circuit in response to the second control signal, and
the second reset circuit resets the data stored in the second latch circuit in response to the first control signal.

7. The device according to claim 6, wherein when the second bit data and the reference voltage are compared in the second circuit, the first latch circuit is set in the first reset state.

8. The device according to claim 6, wherein the first latch circuit is configured to hold one of a high logic level and a low logic level based on a change of a voltage value of a signal corresponding to the result of the comparison between the first bit data and the reference voltage.

9. The device according to claim 6, wherein the first data is non-inverted data of the first bit data.

10. The device according to claim 6, wherein:
the first circuit is configured to store the first data in the first latch circuit based on a timing of rising of the first clock signal, and
the second circuit is configured to store the second data in the second latch circuit based on a timing of rising of the second clock signal.

* * * * *